United States Patent
Hosokawa et al.

(10) Patent No.: US 8,259,871 B2
(45) Date of Patent: Sep. 4, 2012

(54) RECEPTION DEVICE, TRANSMISSION DEVICE, AND ADAPTIVE TRANSMISSION RATE CONTROL METHOD

(75) Inventors: Shuya Hosokawa, Osaka (JP); Yosuke Ukita, Osaka (JP); Kazuhiro Ando, Osaka (JP); Hiroshi Hayashino, Hyogo (JP); Hironori Nakae, Osaka (JP); Naotake Yamamoto, Osaka (JP); Kazuhiro Ohta, Hyogo (JP)

(73) Assignee: Panasonic Corporation, Osaka (JP)

( * ) Notice: Subject to any disclaimer, the term of this patent is extended or adjusted under 35 U.S.C. 154(b) by 131 days.

(21) Appl. No.: 12/668,922

(22) PCT Filed: Jul. 17, 2008

(86) PCT No.: PCT/JP2008/001914
§ 371 (c)(1),
(2), (4) Date: Apr. 2, 2010

(87) PCT Pub. No.: WO2009/011126
PCT Pub. Date: Jan. 22, 2009

(65) Prior Publication Data
US 2010/0183087 A1  Jul. 22, 2010

(30) Foreign Application Priority Data

Jul. 18, 2007 (JP) ................................. 2007-186623
Dec. 18, 2007 (JP) ................................. 2007-325552

(51) Int. Cl.
*H04L 27/06* (2006.01)
*H03D 1/00* (2006.01)
(52) U.S. Cl. ........ 375/341; 375/267; 375/299; 375/316; 375/347

(58) Field of Classification Search .................. 375/341, 375/316, 267, 299, 347
See application file for complete search history.

(56) References Cited

U.S. PATENT DOCUMENTS

| 6,829,470 | B2  | 12/2004 | Kogiantis et al. |
| 7,280,840 | B2* | 10/2007 | Murakami et al. ............ 455/522 |
| 7,599,420 | B2* | 10/2009 | Forenza et al. ............... 375/141 |
| 7,634,017 | B2* | 12/2009 | Sawai ........................... 375/267 |
| 2003/0190898 | A1 | 10/2003 | Kogiantis et al. |

(Continued)

FOREIGN PATENT DOCUMENTS

JP  2004-7548  1/2004

(Continued)

OTHER PUBLICATIONS

International Search Report issued Oct. 28, 2008 in International (PCT) Application No. PCT/JP2008/001914.

*Primary Examiner* — Ted Wang
(74) *Attorney, Agent, or Firm* — Wenderoth, Lind & Ponack, L.L.P.

(57) ABSTRACT

In a receiver, a channel estimation unit estimates channel characteristics of each channel, and a weight generation unit generates a weight matrix used in equalization processing by an equalizer in accordance with the estimated values of channel characteristics for each channel as estimated by the channel estimation unit. Furthermore, a likelihood calculation unit calculates a likelihood indicating a degree of certainty for each transmission stream using the weight matrix generated by the weight generation unit, and an adaptive control unit determines a transmission rate appropriate for transmission of a signal from a transmitter to the receiver in accordance with the likelihood of each transmission stream calculated by the likelihood calculation unit, notifying the transmitter of the determined transmission rate.

17 Claims, 47 Drawing Sheets

| U.S. PATENT DOCUMENTS | | | | FOREIGN PATENT DOCUMENTS | | |
|---|---|---|---|---|---|---|
| 2005/0286618 A1 | 2/2005 | Chol et al. | | JP | 2005-244598 | 9/2005 |
| 2006/0087998 A1 | 4/2006 | Saito et al. | | JP | 2006-14066 | 1/2006 |
| 2006/0139201 A1 | 6/2006 | Nagata et al. | | WO | 2004/114609 | 12/2004 |
| 2006/0171353 A1 | 8/2006 | Nagata et al. | | WO | 2006/098387 | 9/2006 |
| 2006/0209874 A1 | 9/2006 | Nagata | | | | |
| 2009/0052560 A1 | 2/2009 | She et al. | | | | |

* cited by examiner

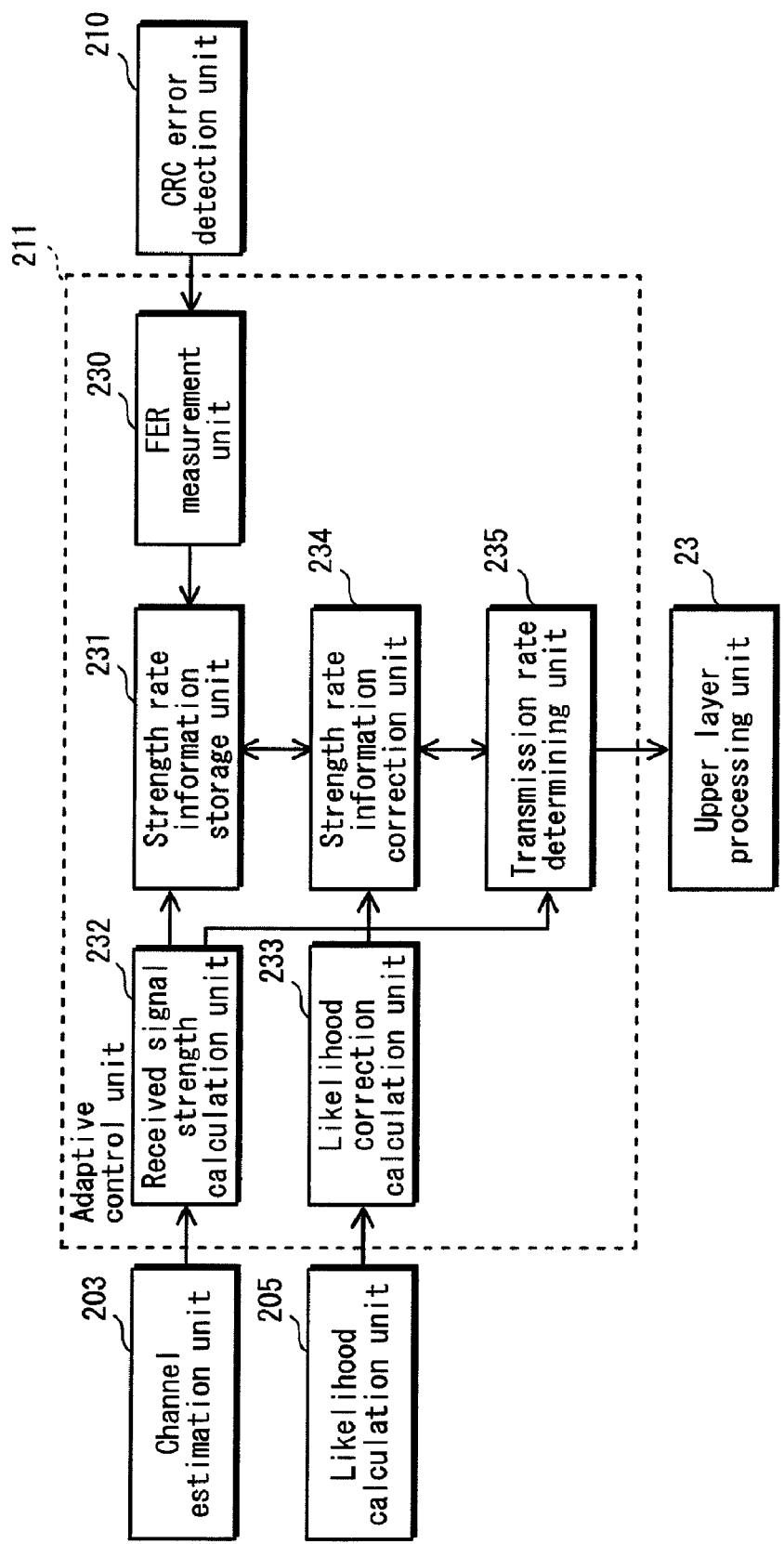

FIG. 15

| Modulation method | Coding rate | Transmission rate [Mbps] |
|---|---|---|
| BPSK | 1/2 | 13 |
| QPSK | 1/2 | 26 |
| QPSK | 3/4 | 39 |
| 16QAM | 1/2 | 52 |
| 16QAM | 3/4 | 78 |
| 64QAM | 2/3 | 104 |
| 64QAM | 3/4 | 117 |
| 64QAM | 5/6 | 130 |

| Modulation method | Coding rate | Transmission rate [Mbps] (2 streams) | |
|---|---|---|---|
| | | GI: 800 ns | GI: 400 ns |
| BPSK | 1/2 | 13 | 14.4 |
| QPSK | 1/2 | 26 | 28.9 |
| QPSK | 3/4 | 39 | 43.3 |
| 16QAM | 1/2 | 52 | 57.8 |
| 16QAM | 3/4 | 78 | 86.7 |
| 64QAM | 2/3 | 104 | 115.6 |
| 64QAM | 3/4 | 117 | 130.0 |
| 64QAM | 5/6 | 130 | 144.4 |

| Modulation method | Coding rate | Transmission rate [Mbps] | |
|---|---|---|---|
| | | 1 stream | 2 streams |
| BPSK | 1/2 | 6.5 | 13 |
| QPSK | 1/2 | 13 | 26 |
| QPSK | 3/4 | 19.5 | 39 |
| 16QAM | 1/2 | 26 | 52 |
| 16QAM | 3/4 | 39 | 78 |
| 64QAM | 2/3 | 52 | 104 |
| 64QAM | 3/4 | 58.5 | 117 |
| 64QAM | 5/6 | 65 | 130 |

| Modulation method | Coding rate | Transmission rate [Mbps] | |
|---|---|---|---|
| | | 20MHz | 40MHz |
| BPSK | 1/2 | 13 | 27 |
| QPSK | 1/2 | 26 | 54 |
| QPSK | 3/4 | 39 | 81 |
| 16QAM | 1/2 | 52 | 108 |
| 16QAM | 3/4 | 78 | 162 |
| 64QAM | 2/3 | 104 | 216 |
| 64QAM | 3/4 | 117 | 243 |
| 64QAM | 5/6 | 130 | 270 |

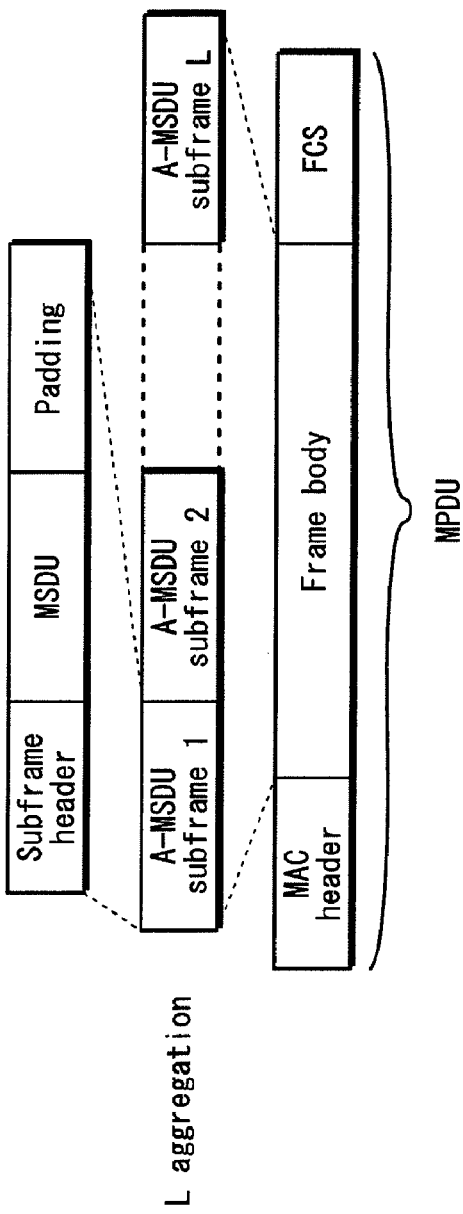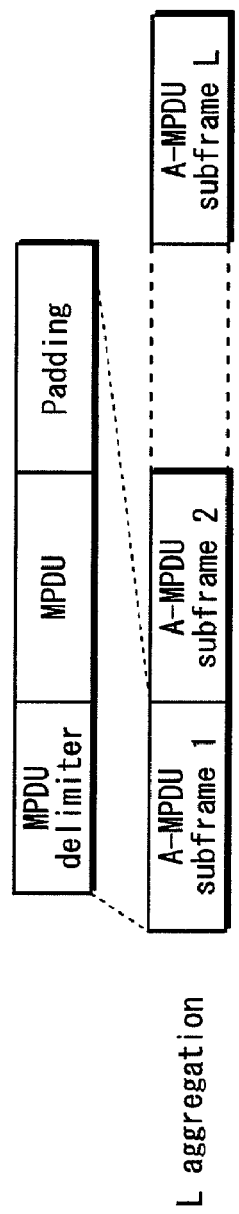

FIG. 34

| Modulation method | Coding rate | Transmission rate [Mbps] | MAC throughput [Mbps] | | | |
|---|---|---|---|---|---|---|
| | | | Aggregation number: 1 | Aggregation number: 2 | Aggregation number: 4 | Aggregation number: 8 |
| BPSK | 1/2 | 13 | 10 | 11 | 12.1 | 12.4 |
| QPSK | 1/2 | 26 | 19 | 22 | 23 | 24 |
| QPSK | 3/4 | 39 | 26 | 31 | 34 | 36 |
| 16QAM | 1/2 | 52 | 31 | 39 | 44 | 47 |
| 16QAM | 3/4 | 78 | 40 | 53 | 62 | 68 |
| 64QAM | 2/3 | 104 | 47 | 64 | 79 | 88 |
| 64QAM | 3/4 | 117 | 49 | 69 | 86 | 98 |
| 64QAM | 5/6 | 130 | 52 | 73 | 93 | 107 |

RECEPTION DEVICE, TRANSMISSION DEVICE, AND ADAPTIVE TRANSMISSION RATE CONTROL METHOD

TECHNICAL FIELD

The present invention relates to adaptive modulation technology for controlling an appropriate transmission rate in accordance with the channel state.

BACKGROUND ART

Conventional adaptive modulation technology realizes fast and stable high-quality wireless transmission over a limited frequency bandwidth. Adaptive modulation technology adaptively controls the transmission rate determined by a transmission signal's modulation method, coding rate, etc., in accordance with the channel state, this channel state changing as the surrounding environment changes due to the passage of time or the wireless communication device's movement (see, for example, Patent Literature 1). For example, QPSK (Quadrature Phase Shift Keying), which has a low rate, is used for the modulation method when the channel state is poor, and 16 QAM (Quadrature Amplitude Modulation) or 64 QAM, which have a high rate, is used when the channel state is good. For the coding rate, when the channel state is poor, coding that has a strong error correction capability and a low coding rate is used, and when the channel state is good, coding that has a weak error correction capability and a high coding rate is used.

In recent years, development of wireless communication systems that take advantage of special multiplexing technology, using a plurality of antennas as a means for realizing next-generation high-speed, high-capacity communication, has progressed. The related technology is called the MIMO (Multiple Input Multiple Output) method, and by increasing the amount of multiplexing (the number of transmission streams), it is possible to increase communication capacity without increasing the frequency bandwidth.

In wireless communication using a single antenna, determining the transmission rate used in wireless communication from a transmitter to a receiver in accordance with the received signal strength level in the receiver makes the transmission rate an appropriate rate for the channel state. The transmission quality under the MIMO method, however, depends not only on the received signal strength level, but also on a channel matrix whose elements are estimated values of the channel characteristics for each channel. This is because, for the equalization processing under the MIMO method, it is necessary to separate the transmission streams.

For this reason, just because the received signal strength level under the MIMO method is high does not necessarily mean that separation of the original transmission streams can be carried out accurately. Therefore, when adaptive modulation technology is applied under the MIMO method, even if the transmission rate used in wireless communication from a transmitter to a receiver is determined in accordance with the received signal strength level, it is not necessarily true that the transmission rate is an appropriate rate for the channel state.

To determine the transmission rate used in wireless communication from a transmitter to a receiver, adaptive modulation technology that performs error detection using CRC (Cyclic Redundancy Check) for each transmission stream and determines the transmission rate used in wireless communication from a transmitter to a receiver based on the results of error detection has been proposed (see, for example, Patent Literature 2). An overview of this technology is now provided using FIG. 50.

In the transmitter 1000, each of the CRC bit adding units $1001_1$-$1001_N$ adds a CRC bit sequence to the information bit sequence input in each unit. Next, in accordance with the coding rate and modulation method indicated by the receiver 2000, each of the coders/mappers $1002_1$-$1002_N$ performs coding processing and modulation processing on the information bit sequence to which the CRC bit sequence was added. The transmission signal for the plurality of transmission streams is then transmitted from each of the antennas $1003_1$-$1003_N$.

In the receiver 2000, the channel estimation unit 2002 estimates each channel's SINR (Signal to Interference and Noise Power Ratio) from a signal received by each of the antennas $2001_1$-$2001_K$. The detection unit 2003 then divides and combines, from the received signal, the transmission signal for the plurality of transmission streams, based on the estimated SINR value for each channel as estimated by the channel estimation unit 2002. Next, the demappers/decoders $2004_1$-$2004_N$ each perform demodulation processing and decoding processing on the transmission signal input from the detection unit 2003, and the CRC error detection units $2005_1$-$2005_N$ each perform CRC error detection on the input bit sequence. Furthermore, the transmission rate determining unit 2006 determines the coding rate, modulation method, etc. to be used for wireless communication from the transmitter 1000 to the receiver 2000 for subsequent transmissions based on the estimated SINR value for each channel and on the results of CRC error detection for each transmission stream. The transmission rate determining unit 2006 then notifies the transmitter 1000 of the determined coding rate, modulation method, etc.

[Citation List]

Patent Literature 1: Japanese Patent Application Publication No. 2005-244598

Patent Literature 2: Japanese Patent Application Publication No. 2006-14066

SUMMARY OF INVENTION

Technical Problem

In order to control adaptively the coding rate, modulation method, etc. used in wireless communication from a transceiver to a receiver, the above-mentioned technology presumes that a CRC bit sequence is added to each transmission stream and that the receiver can perform CRC error detection for each transmission stream.

Under the MIMO method, however, some transmitters and receivers are not configured to add a CRC bit sequence to each transmission stream, and the above-mentioned technology cannot be applied to these transmitters and receivers.

Therefore, it is an object of the present invention to provide a reception device and transmission device capable of determining a transmission rate appropriate for the channel state for wireless communication from a transmitter to a receiver, regardless of the method for adding a CRC bit sequence, and to provide an adaptive transmission rate control method used in the reception device and transmission device.

Solution to Problem

The above-described object is fulfilled by a reception device, an embodiment of the present invention, for wireless communication with a transmission device that transmits one or more signals associated with transmission streams in accordance with a notified transmission rate, the reception device comprising: a channel estimation unit operable to estimate channel characteristics of each channel in accordance with one or more training signals included in signals received by each of a plurality of antennas; a likelihood calculation unit operable to calculate a likelihood indicating a degree of certainty of a code corresponding to each of the transmission streams transmitted by the transmission device, in accordance with estimated values of channel characteristics for each channel as estimated by the channel estimation unit; and an adaptive control unit operable to (i) determine a transmission rate to notify to the transmission device in accordance with the likelihood calculated by the likelihood calculation unit and (ii) notify the transmission device of the transmission rate thus determined.

ADVANTAGEOUS EFFECTS OF INVENTION

A reception device with the above-described structure calculates likelihood for the transmission stream from the estimated values of channel characteristics for each channel and then uses the calculated likelihood to determine the transmission rate to notify to the transmission device. Therefore, the above-described reception device is able to determine a transmission rate that reflects the channel characteristics of each channel regardless of the CRC bit adding mechanism, making it possible to communicate wirelessly from the transmission device to the reception device with a transmission rate appropriate for the channel state.

BRIEF DESCRIPTION OF DRAWINGS

FIG. 4 is a block diagram of the adaptive control unit 211 in FIG. 3.

FIG. 15 shows an example of a modulation method and coding rate corresponding to a transmission rate.

FIG. 33A shows the frame configuration of an A-MSDU.

FIG. 33B shows the frame configuration of an A-MPDU.

FIG. 34 shows an example of the throughput of the MAC layer level corresponding to a set comprising a transmission rate and a frame aggregation number.

REFERENCE SIGNS LIST

Figure 1:
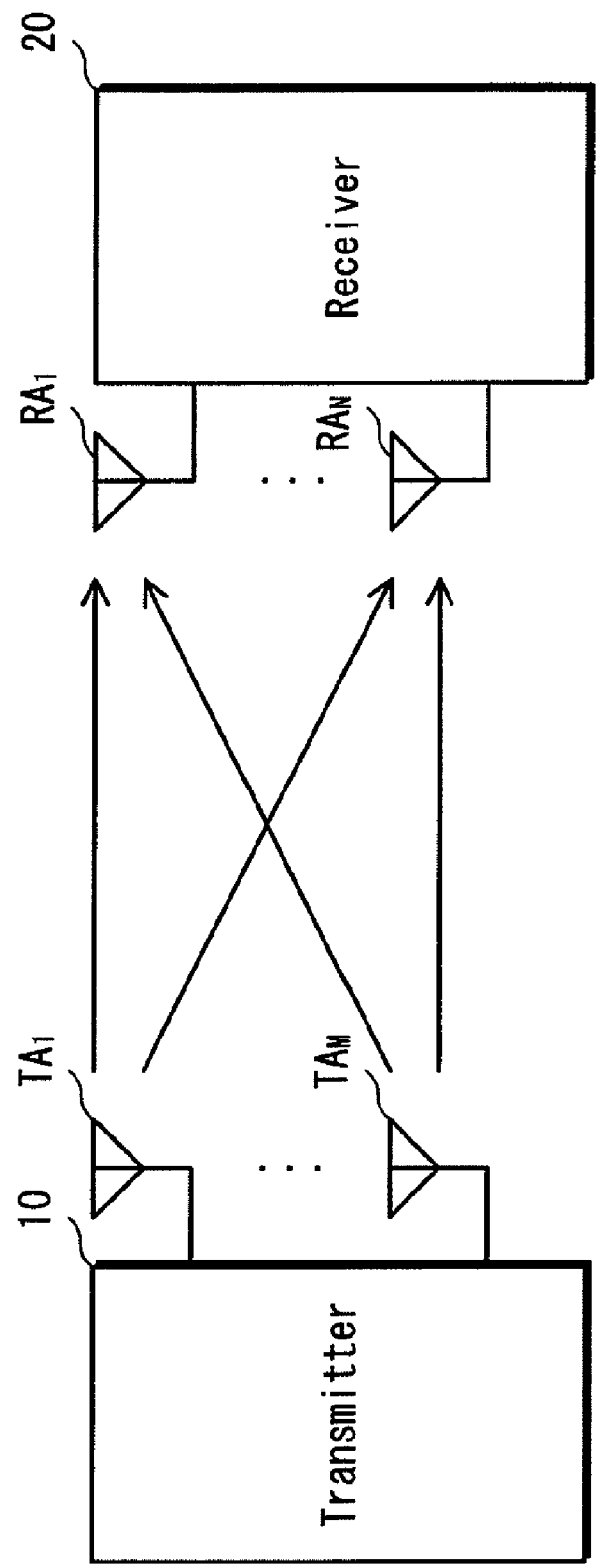
FIG. 1 is a system configuration diagram of the MIMO transmission system in Embodiment 1.

10 Transmitter
101 Adaptive control unit
102 MAC header adding unit
103 CRC bit adding unit
104 Coding unit
105 Code separation unit
$106_1$-$106_M$ Modulation units
$107_1$-$107_M$ PILOT generation units
$108_1$-$108_M$ IFFT units
$109_1$-$109_M$ GI insertion units
$TA_1$-$TA_M$ Antennas
20 Receiver
$RA_1$-$RA_M$ Antennas
$201_1$-$201_N$ GI removal units
$202_1$-$202_N$ FFT units
203 Channel estimation unit
204 Weight generation unit
205 Likelihood calculation unit
206 Equalization unit
$207_1$-$207_M$ Demodulation units
208 Code combination unit
209 Decoding unit
210 CRC error detection unit
211 Adaptive control unit

DESCRIPTION OF EMBODIMENTS

A first reception device, an embodiment of the present invention, for wireless communication with a transmission device that transmits one or more signals associated with transmission streams in accordance with a notified transmission rate, comprises: a channel estimation unit operable to estimate channel characteristics of each channel in accordance with one or more training signals included in signals received by each of a plurality of antennas; a likelihood calculation unit operable to calculate a likelihood indicating a degree of certainty of a code corresponding to each of the transmission streams transmitted by the transmission device, in accordance with estimated values of channel characteristics for each channel as estimated by the channel estimation unit; and an adaptive control unit operable to (i) determine a transmission rate to notify to the transmission device in accordance with the likelihood calculated by the likelihood calculation unit and (ii) notify the transmission device of the transmission rate thus determined.

A first reception device with the above-described structure calculates likelihood for the transmission stream from the estimated values of channel characteristics for each channel and then uses the calculated likelihood to determine the transmission rate to notify to the transmission device. Therefore, the above-described reception device is able to determine a transmission rate that reflects the channel characteristics of each channel regardless of the CRC bit adding mechanism, making it possible to communicate wirelessly from the transmission device to the reception device with a transmission rate appropriate for the channel state.

A second reception device, an embodiment of the present invention, further comprises in addition to the structure of the first reception device, when a channel matrix having as elements the estimated values of channel characteristics for each channel as estimated by the channel estimation unit is expressed as H, and a likelihood matrix having as diagonal elements likelihoods corresponding to each transmission stream is expressed as k, a weight generation unit operable to generate a weight matrix W by substituting the channel matrix H into $(H^H H)^{-1} H^H$, wherein the likelihood calculation unit calculates a likelihood matrix k by substituting the weight matrix W generated by the weight generation unit into Equation 1.

$$k = 1/\sqrt{WW^H} \quad \text{Equation 1}$$

The above-described structure provides one concrete example of calculating the likelihood of the transmission stream from the estimated values of the channel characteristics for each channel.

A third reception device, an embodiment of the present invention, further comprises in addition to the structure of the first reception device, when a channel matrix having as elements the estimated values of channel characteristics for each channel as estimated by the channel estimation unit is expressed as H, a likelihood matrix having as diagonal elements likelihoods corresponding to each transmission stream is expressed as k, and an identity matrix is expressed as I, an undesirable signal measurement unit operable to calculate a covariance matrix $R_{UU}$ for an undesirable signal matrix U having undesirable signals received by each of the antennas as elements; and a weight generation unit operable to generate a weight matrix W by substituting the channel matrix H and the covariance matrix $R_{UU}$ calculated by the undesirable signal measurement unit into $H^H(HH^H + R_{UU})^{-1}$, wherein the likelihood calculation unit calculates the likelihood matrix k by substituting the channel matrix H and the weight matrix W generated by the weight generation unit into Equation 2.

$$k = 1/\sqrt{I - WH} \quad \text{Equation 2}$$

By calculating the likelihood of the transmission stream taking undesirable signals into consideration, the above-described structure makes it possible to determine a transmission rate appropriate for the channel state of each channel in an environment where undesirable signals exist.

In a fourth reception device, an embodiment of the present invention, in addition to the structure of the first reception device, the adaptive control unit includes a storage subunit storing strength rate information indicating a transmission rate for a received signal strength; a likelihood correction calculation subunit operable to calculate, in accordance with the likelihood calculated by the likelihood calculation unit, a likelihood correction value for correcting the strength rate information; a correction subunit operable to correct, in accordance with the likelihood correction value calculated by the likelihood correction calculation subunit, the strength rate information stored by the storage subunit; a received signal strength calculation subunit operable to calculate received signal strength in accordance with estimated values of channel characteristics for each channel as estimated by the channel estimation unit; and a transmission rate determining subunit operable to (i) determine, by referring to strength rate information corrected by the correction subunit, the transmission rate to notify to the transmission device in accordance with the received signal strength calculated by the received signal strength calculation subunit, and (ii) notify the transmission device of the transmission rate thus determined.

With the above-described structure, it is possible to provide a mechanism for determining the transmission rate using the likelihood of the transmission stream.

In a fifth reception device, an embodiment of the present invention, in addition to the structure of the first reception device, the adaptive control unit includes a storage subunit storing strength rate information indicating a transmission rate for a received signal strength; a received signal strength calculation subunit operable to calculate a received signal strength in accordance with estimated values of channel characteristics for each channel as estimated by the channel estimation unit; a likelihood correction calculation subunit operable to calculate, in accordance with the likelihood calculated by the likelihood calculation unit, a likelihood correction value for correcting the received signal strength; a correction subunit operable to correct, in accordance with the likelihood correction value calculated by the likelihood correction calculation subunit, the received signal strength calculated by the received signal strength calculation subunit; and a transmission rate determining subunit operable to (i) determine, by referring to strength rate information stored by the storage subunit, the transmission rate to notify to the transmission device in accordance with the received signal strength corrected by the correction subunit, and (ii) notify the transmission device of the transmission rate thus determined.

With the above-described structure, it is possible to provide a mechanism for determining the transmission rate using the likelihood of the transmission stream.

In a sixth reception device, an embodiment of the present invention, in addition to the structure of the first reception device, a signal is transmitted in accordance with a notified frame aggregation number, and the adaptive control unit further (i) determines the frame aggregation number to notify to the transmission device in accordance with the likelihood calculated by the likelihood calculation unit and (ii) notifies the transmission device of the frame aggregation number thus determined.

With the above-described structure, not only a transmission rate but also a frame aggregation number that are appropriate for the channel state of each channel are determined, and it is possible to perform wireless communication from the transmission device to the reception device with a transmission rate and a frame aggregation number which are appropriate for the channel state.

In a seventh reception device, an embodiment of the present invention, in addition to the structure of the first reception device, the adaptive control unit includes a likelihood storage subunit storing likelihood error rate information indicating frame error rates for likelihoods for each transmission rate in a plurality of transmission rates; a likelihood FER estimation subunit operable, by referring to the likelihood error rate information stored by the likelihood storage subunit, to estimate a frame error rate for each transmission rate in accordance with the likelihood calculated by the likelihood calculation unit; and a transmission rate determining subunit operable to (i) determine the transmission rate to notify to the transmission device to be a transmission rate with a highest speed among transmission rates having a frame error rate, as estimated by the likelihood FER estimation unit, equal to or less than a predetermined value and (ii) notify the transmission device of the transmission rate thus determined.

With the above-described structure, it is possible to provide a mechanism for determining the transmission rate using the likelihood of the transmission stream.

In an eighth reception device, an embodiment of the present invention, in addition to the structure of the first reception device, the adaptive control unit includes a likelihood storage subunit storing likelihood error rate information indicating frame error rates for likelihoods for each transmission rate in a plurality of transmission rates; a likelihood FER estimation subunit operable, by referring to the likelihood error rate information stored by the likelihood storage subunit, to estimate a frame error rate for each transmission rate in accordance with the likelihood calculated by the likelihood calculation unit; a throughput calculation subunit operable, for each transmission rate, to calculate throughput in accordance with the frame error rate estimated by the likelihood FER estimation subunit; and a transmission rate determining subunit operable to (i) determine the transmission rate to notify to the transmission device to be a transmission rate with a highest throughput calculated by the throughput calculation unit and (ii) notify the transmission device of the transmission rate thus determined.

With the above-described structure, it is possible to provide a mechanism for determining the transmission rate using the likelihood of the transmission stream.

In a ninth reception device, an embodiment of the present invention, in addition to the structure of the eighth reception device, the adaptive control unit further includes a likelihood estimation subunit operable to estimate a likelihood, used by the likelihood FER estimation subunit, for a different number of transmission streams than a number of transmission streams currently being used for transmission of a signal by the transmission device, in accordance with the likelihood calculated by the likelihood calculation unit.

With the above-described structure, it is possible to determine a transmission rate appropriate for the channel state of each channel, including the numbers of transmission streams other than the number of transmission streams currently being used for wireless communication from the transmission device to the reception device.

In a tenth reception device, an embodiment of the present invention, in addition to the structure of the eighth reception device, the adaptive control unit further includes a likelihood estimation subunit operable to estimate a likelihood, used by the likelihood FER estimation subunit, for a different bandwidth than a bandwidth currently being used for transmission of a signal by the transmission device, in accordance with the likelihood calculated by the likelihood calculation unit.

With the above-described structure, it is possible to determine a transmission rate appropriate for the channel state of each channel, including the bandwidths other than the bandwidth currently being used for wireless communication from the transmission device to the reception device.

In an eleventh reception device, an embodiment of the present invention, in addition to the structure of the eighth reception device, the adaptive control unit further includes: a strength storage subunit storing strength error rate information indicating frame error rates for received signal strengths for each transmission rate in a plurality of transmission rates; a received signal strength calculation subunit operable to calculate a received signal strength in accordance with estimated values of channel characteristics for each channel as estimated by the channel estimation unit; a strength FER estimation subunit operable to estimate, by referring to the strength error rate information stored by the strength storage subunit, a frame error rate for each transmission rate in accordance with the received signal strength calculated by the received signal strength calculation subunit; and an FER determining unit operable to determine, for each transmission rate, a frame error rate used by the throughput calculation subunit in calculating throughput, in accordance with the frame error rate estimated by the likelihood FER estimation subunit and the frame error rates estimated by the strength FER estimation subunit.

With the above-described structure, it is possible to determine a transmission rate appropriate for the channel state in a variety of environments by determining the frame error rate used in calculation of throughput from the frame error rate obtained in accordance with likelihood and the frame error rate obtained in accordance with the received signal power.

In a twelfth reception device, an embodiment of the present invention, in addition to the structure of the eleventh reception device, the FER determining unit determines a frame error rate with a largest value among the frame error rate estimated by the likelihood FER estimation subunit and frame error rates estimated by the strength FER estimation subunit to be the frame error rate used by the throughput calculation subunit in calculating throughput.

With the above-described structure, by using the largest estimated value for the frame error rate, it is possible to inhibit the occurrence of circumstances in which the transmission rate notified to the transmission device exceeds the transmission rate permissible by the channel state.

A thirteenth reception device, an embodiment of the present invention, in addition to the structure of the first reception device, further comprises an equalization unit operable to perform equalization processing to estimate a transmission signal in each transmission stream from a signal received by each of the antennas, in accordance with estimated values of channel characteristics for each channel as estimated by the channel estimation unit; a demodulation unit operable to (i) demodulate the transmission signal in each transmission stream obtained as a result of equalization processing by the equalization unit and (ii) output a code; a code combination unit operable to (i) combine codes for each transmission stream output by the demodulation unit and (ii) output a combined code; a decoding unit operable to decode the combined code output by the code combination unit in accordance with the likelihood calculated by the likelihood calculation unit; and an error detection unit operable to perform error detection on a bit sequence obtained as a result of decoding by the decoding unit, wherein the adaptive control unit determines the transmission rate to notify to the transmission device in accordance with the likelihood calculated by the likelihood calculation unit and results of error detection by the error detection unit.

With the above-described structure, even if there are changes over time in the channel state, environmental changes at the location of the transmission device, or environmental changes at the location of the reception device, it is possible to determine an appropriate transmission rate in accordance with changes in the channel state.

In a fourteenth reception device, an embodiment of the present invention, in addition to the structure of the first reception device, the adaptive control unit determines the transmission rate to notify to the transmission device for each transmission stream.

With the above-described structure, it is possible to determine a transmission rate appropriate for the channel state for each channel in each transmission stream.

A first transmission device, an embodiment of the present invention, for transmitting a signal to a reception device, comprises: a receiving unit operable to (i) estimate channel characteristics of each channel in accordance with one or more training signals included in signals received by each of a plurality of antennas, (ii) calculate a likelihood indicating a degree of certainty of a code corresponding to each transmission stream in accordance with estimated values of channel characteristics for each channel, and (iii) receive a signal from the reception device, which determines a transmission rate based on the calculated likelihood, the signal containing the transmission rate; and a transmission unit operable, upon the next wireless communication to the reception device, to transmit a signal with one or more transmission streams in accordance with the transmission rate included in the signal received by the receiving unit.

In a first transmission device with the above-described structure, a reception device calculates likelihood for the transmission stream from the estimated values of channel characteristics for each channel and uses the likelihood value to determine the transmission rate. The first transmission device receives notification of this determined transmission rate and communicates wirelessly to the reception device according to the transmission rate of which it was notified. Therefore, regardless of the CRC bit sequence adding mechanism, it is possible for the first transmission device to communicate wirelessly to the reception device at a transmission rate appropriate for the channel state of each channel.

A first adaptive transmission rate control method, an embodiment of the present invention, used in a reception device for wireless communication with a transmission device that transmits one or more signals associated with transmission streams in accordance with a notified transmission rate, comprises the steps of: estimating channel characteristics of each channel in accordance with one or more training signals included in signals received by each of a plurality of antennas; calculating a likelihood indicating a degree of certainty of a code corresponding to each of the transmission streams transmitted by the transmission device, in accordance with estimated values of channel characteristics for each channel as estimated by the channel estimation step; and (i) determining a transmission rate to notify to the transmission device in accordance with the likelihood calculated by the likelihood calculation step and (ii) notifying the transmission device of the transmission rate thus determined.

With the above-described first adaptive transmission rate control method, a reception device calculates likelihood for the transmission stream from the estimated values of channel characteristics for each channel and then uses the likelihood value to determine the transmission rate to notify to the transmission device. Therefore, the above-described first adaptive transmission rate control method is able to determine a transmission rate that reflects the channel characteristics of each channel regardless of the CRC bit adding mechanism, making it possible to communicate wirelessly from the transmission device to the reception device with a transmission rate appropriate for the channel state.

A second adaptive transmission rate control method, an embodiment of the present invention, used in a transmission device for transmitting a signal to a reception device, comprises the steps of: (i) estimating channel characteristics of each channel in accordance with one or more training signals included in signals received by each of a plurality of antennas, (ii) calculating a likelihood indicating a degree of certainty of a code corresponding to each transmission stream in accordance with estimated values of channel characteristics for each channel, and (iii) receiving a signal from the reception device, which determines a transmission rate based on the calculated likelihood, the signal containing the transmission rate; and upon the next wireless communication to the reception device, transmitting a signal with one or more transmission streams in accordance with the transmission rate included in the signal received by the receiving step.

With the above-described second adaptive transmission rate control method, a reception device calculates likelihood for the transmission stream from the estimated values of channel characteristics for each channel and then uses the likelihood value to determine the transmission rate. The transmission device receives notification of this determined transmission rate and communicates wirelessly to the reception device according to the transmission rate of which it was notified. Therefore, regardless of the CRC bit sequence adding mechanism, it is possible for the transmission device to communicate wirelessly to the reception device at a transmission rate appropriate for the channel state of each channel.

The embodiments of the present invention are now explained with reference to the attached drawings.

For ease of explanation, however, in each embodiment, the two wireless transmission apparatus carrying out wireless communication are described only in the case when a first wireless transmission apparatus transmits a signal to a second wireless transmission apparatus, whereby the second wireless transmission apparatus determines the appropriate transmission rate for transmission of a signal from the first wireless transmission apparatus to the second wireless transmission apparatus and notifies the first wireless transmission apparatus of the determined transmission rate.

Additionally, the second wireless transmission apparatus uses one antenna to transmit signals, and the first wireless transmission apparatus uses one antenna to receive signals.

Furthermore, the wireless transmission apparatus that receives notification of the transmission rate and transmits a signal in accordance with the notified transmission rate is referred to as the "transmitter," and the wireless transmission apparatus that determines, from the received signal, the appropriate transmission rate for wireless transmission between itself and another transmission apparatus and that notifies the other transmission apparatus of the determined transmission rate is referred to as the "receiver."

Note that the transmission rate is also referred to as MCS (Modulation and Coding Scheme), and the factors in determining the transmission rate include the modulation method, coding rate, number of transmission streams, bandwidth, guard interval length, etc. in the physical layer.

In Embodiment 8, however, the receiver determines the frame aggregation number in addition to the transmission rate, and notifies the transmitter of both the transmission rate and the frame aggregation number. The transmitter sends wireless transmissions to the receiver in accordance with the notified transmission rate and frame aggregation number.

Embodiment 1

The following is an explanation of Embodiment 1 in the present invention, with reference to the attached drawings. Note that in Embodiments 1 and 2, the modulation method, coding rate, number of transmission streams, bandwidth, and guard interval length are listed as factors for adaptively controlling the transmission rate, but factors can be chosen freely. For example, only the modulation method and coding rate may be used.

<Configuration of MIMO Transmission System>

The MIMO transmission system in the present embodiment is now explained with reference to FIG. 1, which is a system configuration diagram of the MIMO transmission system in the present embodiment.

The MIMO transmission system shown in FIG. 1 includes a transmitter 10 provided with M antennas $TA_1$-$TA_M$ (M being an integer equal to or greater than two) and a receiver 20 provided with N antennas $RA_1$-$RA_N$ (N being an integer equal to or greater than two). Note that, normally, the receiver 20 provided with N antennas $RA_d$-$RA_N$ is capable of performing separation of the transmission streams and other functions when the number of transmission streams is equal to or less than N.

The transmitter 10 transmits signals over one transmission stream or a plurality of transmission streams in accordance with the transmission rate notified by the receiver 20 during previous wireless transmission between the transmitter 10 and the receiver 20. The one transmission stream or plurality of transmission streams transmitted by the transmitter 10 are propagated over the transmission channel and received by the receiver 20.

The receiver 20 determines the appropriate transmission rate for wireless communication from the transmitter 10 to the receiver 20 using the N transmission signals received by the N antennas $RA_1$-$RA_N$. The receiver 20 then notifies the transmitter 10 of the determined transmission rate. When the transmitter 10 next transmits signals to the receiver 20, it does so over one transmission stream or a plurality of transmission streams in accordance with the transmission rate of which it was just notified by the receiver 20.

<Transmitter 10>

Figure 2:
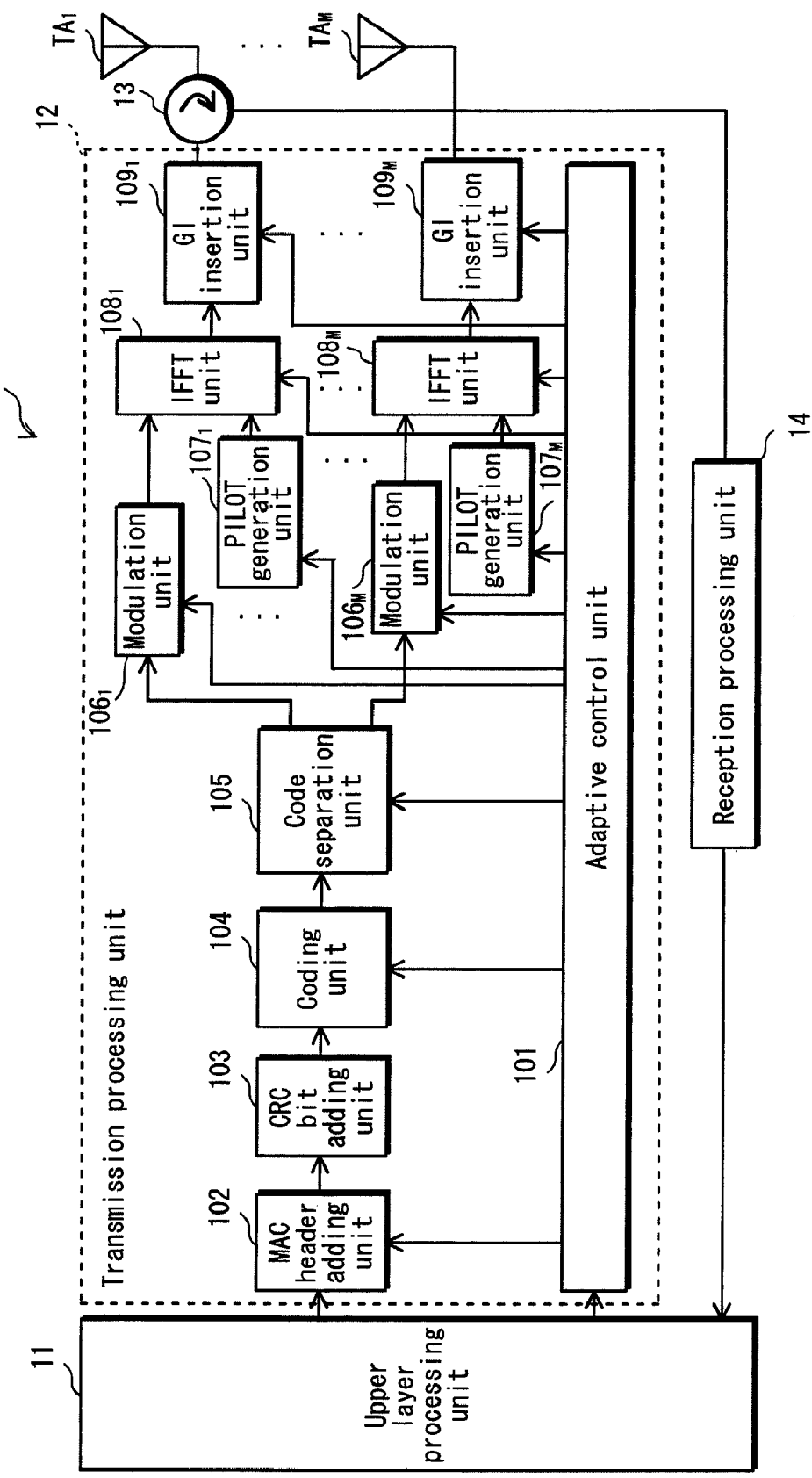
FIG. 2 is a configuration diagram of the transmitter 10 in FIG. 1.

The following is an explanation of the transmitter 10 in FIG. 1 with reference to FIG. 2, which is a configuration diagram of the transmitter 10 in FIG. 1.

The transmitter 10 includes an upper layer processing unit 11, a transmission processing unit 12, a circulator 13, M antennas $TA_1$-$TA_M$, and a reception processing unit 14.

The upper layer processing unit 11, for example, generates a bit sequence associated with information data (hereinafter "information bit sequence") and outputs the generated information bit sequence to the MAC header adding unit 102 (described below) in the transmission processing unit 12. The upper layer processing unit 11 also analyzes the information bit sequence input from the reception processing unit 14 and identifies the transmission rate notified by the receiver 20, outputting the identified transmission rate to the adaptive control unit 101 in the transmission processing unit 120.

The antenna $TA_1$ is connected via the circulator 13 to the GI insertion unit $109_1$ (described below) in the transmission processing unit 12 and to the reception processing unit 14, and the antennas $TA_2$-$TA_M$ are each connected to a corresponding unit in the GI insertion units $109_2$-$109_M$ (described below) in the transmission processing unit 12. The circulator 13 outputs the transmission signal input from the GI insertion unit $109_1$ in the transmission processing unit 12 to the antenna $TA_1$ and outputs the received signal input from the antenna $TA_1$ to the reception processing unit 14.

The transmission processing unit 12 performs predetermined processing on the information bit sequence input from the upper layer processing unit 11 in accordance with the transmission rate input from the upper layer processing unit 11. Details are provided below.

The received signal, received by the antenna $TA_1$, is input into the reception processing unit 14. The reception processing unit 14 obtains an information bit sequence from the received signal by performing demodulation processing and decoding processing on the received signal that was input and then outputs the obtained information bit sequence to the upper layer processing unit 11. Note that the transmission rate appropriate for the channel state as determined by the receiver 20 may be included in the information bit sequence output from the reception processing unit 14 to the upper layer processing unit 11.

[Transmission Processing Unit 12]

The transmission processing unit 12, as shown in FIG. 2, includes an adaptive control unit 101, a MAC header adding unit 102, a CRC bit adding unit 103, a coding unit 104, a code separation unit 105, modulation units $106_1$-$106_M$, PILOT generation units $107_1$-$107_M$, IFFT units $108_1$-$108_M$, and GI insertion units $109_1$-$109_M$.

In accordance with the transmission rate input from the upper layer processing unit 11, the adaptive control unit 101 sets the coding rate in the coding unit 104, sets the number of transmission streams in the code separation unit 105, sets the modulation method in the modulation units $106_1$-$106_M$, sets the bandwidth in the IFFT units $108_1$-$108_M$, and sets the guard interval length in the GI insertion units $109_1$-$109_M$. The adaptive control unit 101 also notifies the PILOT generation units $107_1$-$107_M$ of the transmission rate, number of transmission streams, etc. In the present embodiment, however, the adaptive control unit 101 sets a predetermined frame aggregation number in the MAC header adding unit 102.

In accordance with the frame aggregation number set by the adaptive control unit 101, the MAC header adding unit 102 aggregates the frames constructed by the information bit sequence input from the upper layer processing unit 11 and adds a bit sequence corresponding to a MAC (Media Access Control) header to the information bit sequence after frames are aggregated. The MAC header adding unit 102 then outputs the bit sequence obtained by adding a MAC header to the information bit sequence (hereinafter "MAC added information bit sequence") to the CRC bit adding unit 103.

Based on the contents of the MAC added information bit sequence input from the MAC header adding unit 102, the CRC bit adding unit 103 creates a CRC (Cyclic Redundancy Check) bit sequence. The CRC bit adding unit 103 then adds the CRC bit sequence to the MAC added information bit sequence, and outputs the resulting bit sequence (hereinafter "MAC bit sequence") to the coding unit 104.

In accordance with the coding rate set by the adaptive control unit 101, the coding unit 104 codes the MAC bit sequence input from the CRC bit adding unit 103 and outputs the resulting code sequence to the code separation unit 105. Note that the coding unit 104 codes the MAC bit sequence at the set coding rate, for example, by coding via a convolution code and by punctured processing.

In accordance with the number of transmission streams set by the adaptive control unit 101, the code separation unit 105 separates the code sequence input from the coding unit 104 and outputs each code sequence obtained by separation (hereinafter "separated code sequences") to the modulation units $106_1$-$106_M$.

In each of the modulation units $106_1$-$106_M$, a modulation method is set by the adaptive control unit 101, and one of the separated code sequences is input by the code separation unit 105 in each of the modulation units $106_1$-$106_M$. Each of the modulation units $106_1$-$106_M$ maps the separated code sequence by a number of bits corresponding to the set modulation method to a constellation for the modulation method and outputs the complex value obtained as a result of mapping (the value for the in-phase component and the value for the quadrature component) to the corresponding unit in the IFFT units $108_1$-$108_M$.

Each of the PILOT generation units $107_1$-$107_M$ creates a bit sequence (hereinafter "control information bit sequence") that expresses the transmission rate, number of transmission streams, etc. input from the adaptive control unit 101. Each of the PILOT generation units $107_1$-$107_M$ then maps the control information bit sequence by a number of bits corresponding to the predetermined modulation method to a constellation for the modulation method and outputs the complex value obtained as a result of mapping to the corresponding unit in the IFFT units $108_1$-$108_M$. Note that, for example, in the IEEE 802.11n Draft 2.0, the HT (High Throughput)-SIGNAL for the PLCP (Physical Layer Convergence Protocol) corresponds to the control information bit sequence.

Each of the PILOT generation units $107_1$-$107_M$ also creates one or more bit sequences for channel estimation (hereinafter "one or more training bit sequences"). Each of the PILOT generation units $107_1$-$107_M$ then maps the one or more training bit sequences by a number of bits corresponding to the predetermined modulation method to a constellation for the modulation method and outputs the complex value obtained as a result of mapping to the corresponding unit in the IFFT units $108_1$-$108_M$.

A bandwidth (number of IFFT samples) is set in each of the IFFT units $108_1$-$108_M$ by the adaptive control unit 101, and each of the IFFT units $108_1$-$108_M$, in accordance with the set bandwidth, performs an Inverse Fast Fourier Transform (hereinafter, "IFFT") to modulate and multiply a plurality of carriers that are orthogonal to each other.

Each of the IFFT units $108_1$-$108_M$ performs an IFFT using the complex value for the one or more training bit sequences input by the corresponding unit in the PILOT generation units $107_1$-$107_M$ and outputs the one or more signals obtained via IFFT (hereinafter, "one or more training signals") to the corresponding unit in the GI insertion units $109_1$-$109_M$. Each of the IFFT units $108_1$-$108_M$ also performs an IFFT using the complex value for the control information bit sequence input by the corresponding unit in the PILOT generation units $107_1$-$107_M$ and outputs the signal obtained via IFFT (hereinafter, "control information signal") to the corresponding unit in the GI insertion units $109_1$-$109_M$.

Furthermore, each of the IFFT units $108_1$-$108_M$ performs an IFFT using the complex value for the MAC bit sequence input by the corresponding unit in the demodulation units $106_1$-$106_M$ and outputs the signal obtained via IFFT (hereinafter, "transmission information signal") to the corresponding unit in the GI insertion units $109_1$-$109_M$.

A guard interval length is set by the adaptive control unit 101 in each of the GI insertion units $109_1$-$109_M$. Based on the set guard interval, each of the GI insertion units $109_1$-$109_M$ inserts a signal in the training signal, control information signal, and transmission information signal input from the corresponding unit in the IFFT units $108_1$-$108_M$, thereby generating a transmission signal. The transmission signal output by the GI insertion unit $109_1$ is transmitted by the antenna $TA_1$ via the circulator 13, and the transmission signals output by the GI insertion units $109_2$-$109_M$ are transmitted by the antennas $TA_1$-$TA_M$.

<Receiver 20>

Figure 3:
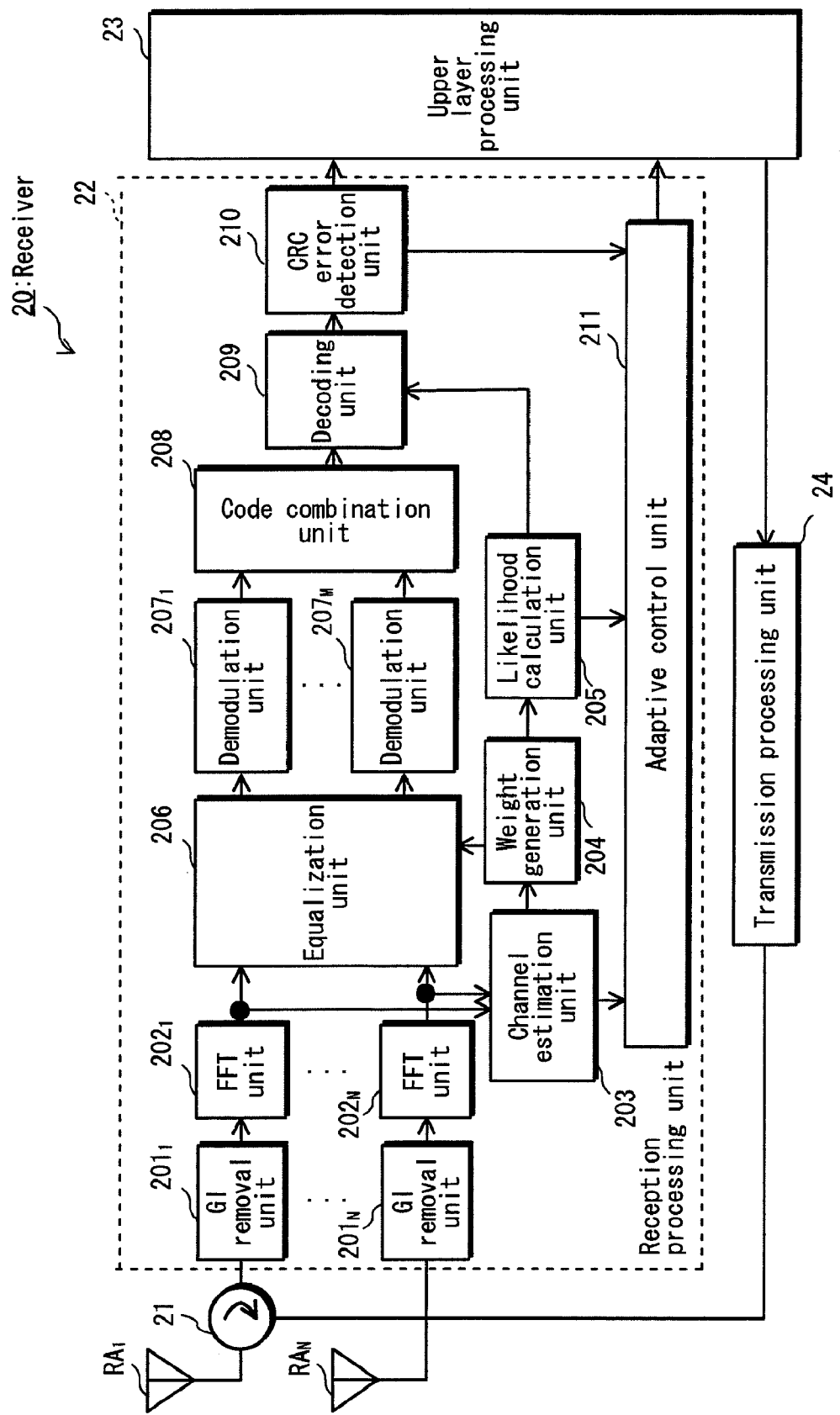
FIG. 3 is a configuration diagram of the receiver 20 in FIG. 1.

The following is an explanation of the receiver 20 in FIG. 1 with reference to FIG. 3, which is a configuration diagram of the receiver 20 in FIG. 1.

The receiver 20 in FIG. 1 includes N antennas $RA_1$-$RA_N$, a circulator 21, a reception processing unit 22, an upper layer processing unit 23, and a transmission processing unit 24.

The antenna $RA_1$ is connected via the circulator 21 to the GI removal unit $201_1$ (described below) in the transmission processing unit 24, and the antennas $RA_2$-$RA_N$ are connected to a corresponding unit in the GI removal units $201_2$-$201_N$ (described below) in the reception processing unit 22. The circulator 21 outputs a signal input from the antenna $RA_2$ to the GI removal unit $201_2$ in the reception processing unit 22 and outputs a transmission signal input from the transmission processing unit 24 to the antenna $RA_1$.

The reception processing unit 22 performs predetermined processing such as estimating the transmission signal from the received signal input from the antennas $RA_1$-$RA_N$ and determining the transmission rate to notify to the transmitter 10. Details are provided below.

The upper layer processing unit 23, for example, analyzes the information bit sequence input from the CRC error detection unit 210 (described below) in the reception processing unit 22. The upper layer processing unit 23 also generates an information bit sequence expressing the transmission rate input from the adaptive control unit 211 (described below) in the reception processing unit 22 and outputs the generated information bit sequence to the transmission processing unit 24.

The transmission processing unit 24 generates a transmission signal by applying predetermined processing such as coding or modulation to, for example, an information bit sequence expressing the transmission rate determined by the adaptive control unit 211 in the reception processing unit 22 and input by the upper layer processing unit 23. The transmission signal generated by the transmission processing unit 24 is then transmitted by the antenna $RA_1$ via the circulator 21.

[Reception Processing Unit 22]

The reception processing unit 22, as shown in FIG. 3, includes GI removal units $201_1$-$201_N$, FFT units $202_1$-$202_N$, a channel estimation unit 203, a weight generation unit 204, a likelihood calculation unit 205, an equalization unit 206, demodulation units $207_1$-$207_M$, an code combination unit 208, a decoding unit 209, a CRC error detection unit 210, and an adaptive control unit 211. Note that, as the transmitter 10 includes M antennas, the figure shows M as the number of demodulation units provided in the reception processing unit 22.

Each of the GI removal units $201_1$-$201_N$ removes the guard interval portion from the received signal input by the corresponding antenna in the antennas $RA_1$-$RA_N$ and outputs the transmission signal with the guard interval removed to the corresponding unit in the FFT units $202_1$-$202_N$.

Each of the FFT units $202_1$-$202_N$ performs a Fast Fourier Transform (hereinafter, "FFT") on the signal input by the corresponding unit in the GI removal units $201_1$-$201_N$ (the received signal with the guard interval section removed) and outputs the signal obtained via FFT to the channel estimation unit 203 and the equalization unit 206.

For each carrier, when the number of transmission streams is K and the number of reception antennas is N, the channel estimation unit 203 estimates the channel characteristics for each of N×K channels based on the one or more training signals included in the one or more signals input from the FFT units $202_1$-$202_N$. For each carrier, the channel estimation unit 203 then outputs the estimated value for the channel characteristics for each of N×K channels to the weight generation unit 204 and the adaptive control unit 211. For ease of explanation, hereinafter a channel matrix H is used, the matrix having in the "i" row and "j" column the estimated value for the channel characteristics for the channel associated with the transmission stream for stream letter "j" ("j" being an integer between one and K, inclusive), received by antenna $RA_i$ ("1" being an integer between one and N, inclusive), and the channel estimation unit 203 outputs the channel matrix H.

The channel estimation unit 203 also analyzes the control information signal included in the signals input from the FFT units $202_1$-$202_M$, identifies the modulation method, coding rate, number of transmission streams, etc., and in accordance with the identified information, controls the operations of the demodulation units $207_1$-$207_M$, the code combination unit 208, the decoding unit 209, etc. In FIG. 3, the control signal lines from the channel estimation unit 203 to the demodulation units $207_1$-$207_M$, etc., are not shown.

For each carrier, the weight generation unit 204 calculates a weight matrix used by the equalization unit 206 in calculation of weighting of the received signal (the signals input from the FFT units $202_1$-$202_N$) by substituting the channel matrix H input from the channel estimation unit 203 into Equation 3 below. The weight generation unit 204 then outputs the calculated weight matrix W to the equalization unit 206 and the likelihood calculation unit 205.

$$W=(H^H H)^{-1} H^H \qquad \text{Equation 3}$$

However, in Equation 3, $H^H$ expresses a complex conjugate transpose matrix for H, and $(H^H H)^{-1}$ expresses the inverse matrix of $H^H H$.

For each carrier, the likelihood calculation unit 205 calculates a likelihood matrix k by substituting the weight matrix W input from the weight generation unit 204 into Equation 4 below and outputs, to the decoding unit 209 and the adaptive control unit 211, likelihood information that includes the value for each diagonal element in the calculated matrix k as the likelihood for each transmission stream.

$$k=1/\sqrt{WW^H} \qquad \text{Equation 4}$$

However, in Equation 4, $W^H$ expresses a complex conjugate transpose matrix for W.

Since the channel matrix H is defined as described above, the value of the diagonal element in row "j," ("j" being an integer between one and M, inclusive) column "j" of the matrix k is the likelihood of the transmission stream for stream index "j" In this case, likelihood refers to information on the degree of confidence for a signal that has undergone stream separation operations in MIMO equalization processing. Likelihood information is used in soft decision Viterbi decoding.

For each carrier, by substituting the weight matrix W input from the weight generation unit 204 and a received signal matrix r, whose elements are the signals input from the FFT units $202_1$-$202_N$, into s=Wr, the equalization unit 206 performs equalization processing to estimate the transmission signal matrix s, whose elements are the transmission signals in each transmission stream transmitted by the transmitter 10. The equalization unit 206 then outputs the transmission signal obtained in this way to the corresponding unit in the demodulation units $207_1$-$207_M$.

Each of the demodulation units $207_1$-$207_M$ performs demodulation by demapping, in accordance with the set modulation method, the input transmission signal to a constellation for the modulation method and outputting the code sequence obtained as a result of demapping to the code combination unit 208.

The code combination unit 208, in accordance with the set number of transmission streams, performs processing opposite to the code separation unit 105 in the transmitter 10 on the code sequences input from the demodulation units $207_1$-$207_M$ to combine the code sequences into a single code sequence (hereinafter, "combined code sequence"), outputting the combined code sequence to the decoding unit 209.

The decoding unit 209, in accordance with the set coding rate, decodes (performs error correction) on the combined code sequence input from the code combination unit 208, using the likelihood information that is input from the likelihood calculation unit 205 and that includes the likelihood value for each transmission stream. The decoding unit 209 then outputs the bit sequence obtained as a result of decoding (hereinafter "decoded bit sequence") to the CRC error detection unit 210. Note that the decoding unit 209 decodes the combined code sequence via, for example, depunctured processing and soft decision Viterbi decoding.

The CRC error detection unit 210 detects errors using the CRC bit sequence included in the decoded bit sequence input from the decoding unit 209 and outputs a bit sequence consisting of the input decoded bit sequence with the CRC bit sequence removed (the information bit sequence) to the upper layer processing unit 23. The CRC error detection unit 210 also outputs CRC error detection information indicating the results of error detection to the adaptive control unit 211. Note that the CRC error detection unit 210 detects errors with the MAC header, information bit sequence, and CRC bit sequence as a single unit.

The adaptive control unit 211 determines the transmission rate to notify to the transmitter 10 and outputs the determined transmission rate to the upper layer processing unit 23. Details are provided below.

(Structure of Adaptive Control Unit 211)

The following is an explanation of the structure of the adaptive control unit 211 in FIG. 3 with reference to FIG. 4, which is a block diagram of the adaptive control unit 211 in FIG. 3.

The adaptive control unit 211 includes an FER measurement unit 230, a strength rate information storage unit 231, a received signal strength calculation unit 232, a likelihood correction calculation unit 233, a strength rate information correction unit 234, and a transmission rate determining unit 235.

Figure 5A:
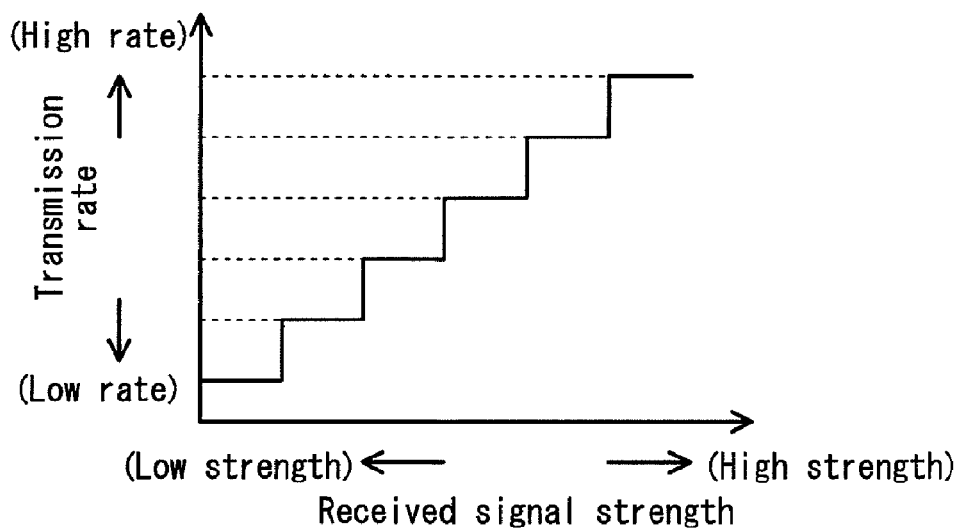
FIG. 5A shows an example of the strength rate information stored by the strength rate information storage unit 231 in FIG. 4.

The strength rate information storage unit 231 stores strength rate information, created by processing described below, that indicates a transmission rate for the received signal strength, as shown in the example in FIG. 5A. In FIG. 5A, the horizontal axis indicates the received signal strength, and the vertical axis indicates the transmission rate.

For each carrier, the received signal strength calculation unit 232 calculates the received signal strength for each transmission stream using the channel matrix H input from the channel estimation unit 203. The received signal strength calculation unit 232 then calculates the packet frame's received signal strength by adding up the received signal strength for all of the carriers in each transmission stream and then further adding up the resulting received signal strength for each transmission stream. The received signal strength calculation unit 232 then outputs the packet frame's calculated received signal strength to the transmission rate determining unit 235.

The likelihood correction calculation unit 233 adds up, for each transmission stream, the likelihoods for each of the carriers associated with the transmission stream, the likelihoods being included in the likelihood information input from the likelihood calculation unit 205. The likelihood correction calculation unit 233 then divides each of the resulting sums by the number of carriers, adds up the values for each transmission stream resulting from this division, and divides this newly obtained value by the number of transmission streams. The likelihood correction calculation unit 233 further seeks the likelihood correction value from the value thus resulting from division (hereinafter, "calculated likelihood value") and outputs the likelihood correction value sought in this way to the strength rate information correction unit 234.

When the likelihood is high, the channel matrix H can be deemed easy to separate into the original transmission streams during equalization processing by the receiving end, even at the same received signal strength. Therefore, the threshold value of the received signal strength for which the transmission rate switches is corrected in the direction of a lower received signal strength. Conversely, when the likelihood is low, the channel matrix H can be deemed difficult to separate into the original transmission streams during equalization processing by the receiving end, even at the same received signal strength. Therefore, the threshold value of the received signal strength for which the transmission rate switches is corrected in the direction of a higher received signal strength.

Note that calculation of the likelihood correction value by the likelihood correction calculation unit 233 can be performed by storing, in the likelihood correction calculation unit 233, corrected value information indicating the likelihood correction value for the calculated likelihood value created with the above-mentioned points in mind and having the likelihood correction calculation unit 233 refer to the corrected value information to estimate the likelihood correction value for the calculated likelihood value. In this case, when the threshold value of the received signal strength for which the transmission rate switches is corrected in the direction of a higher received signal strength value, the likelihood correction value is a positive value, and when the threshold value of the received signal strength for which the transmission rate switches is corrected in the direction of a lower received signal strength value, the likelihood correction value is a negative value. The above-described method of calculating the likelihood correction value is only one example, however, and such calculation is not limited to this method. For example, other methods that reflect the above points may be used, such as calculating the likelihood correction value by using a function with the calculated likelihood value as a variable.

Figure 5B:
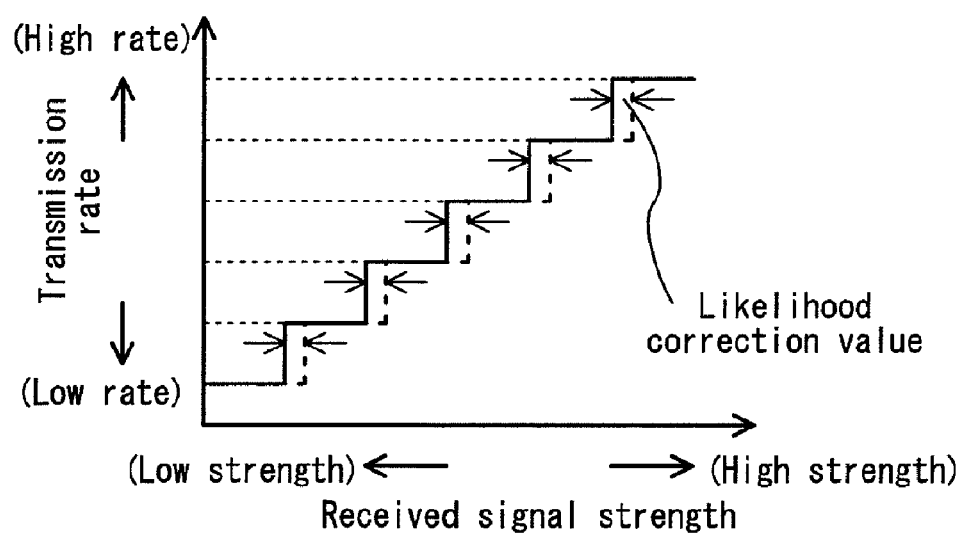
FIG. 5B shows an example of the strength rate information corrected by the strength rate information correction unit 234 in FIG. 4.

Based on the likelihood correction value input from the likelihood correction calculation unit 233, the strength rate information correction unit 234 corrects the strength rate information stored in the strength rate information storage unit 231. For example, the strength rate information correction unit 234 corrects the strength rate information by adding the likelihood correction value input from the likelihood correction calculation unit 233 to the threshold value for the received signal strength when the transmission rate switches. FIG. 5B shows an example of correction of the strength rate information when the likelihood correction value is positive. In FIG. 5B, the horizontal axis indicates the received signal strength, the vertical axis indicates the transmission rate, and the broken line indicates the strength rate information after correction.

The transmission rate determining unit 235 determines, by referring to the strength rate information after correction by the strength rate information correction unit 234, the transmission rate for the received signal strength of the packet frame input by the received signal strength calculation unit 232 as the transmission rate to be notified to the transmitter 10. The transmission rate determining unit 235 then outputs the determined transmission rate to the upper layer processing unit 23. The transmission rate output to the upper layer processing unit 23 is sent to the transmitter 10 via the transmission processing unit 24 and the antenna $RA_1$.

The following is an explanation of the operations of the function block associated with creating and updating the transmission rate information stored in the strength rate information storage unit 231.

For example, during initialization such as when the power is turned on, the other wireless transmission apparatus controls the transmission strength, causing the receiver to change the received signal strength. The FER measurement unit 230 calculates the frame error rate by performing statistical processing on a plurality of frames in accordance with the CRC error detection information input from the CRC error detection unit 210. Based on the received signal strength for the packet frame input from the received signal strength calculation unit 232 and on the frame error rate input from the FER measurement unit 230, the strength rate information storage unit 231 seeks the relationship between the received signal strength and the frame error rate. Based on the created frame error rate for the received signal strength, the strength rate information storage unit 231 determines the transmission rate for the received signal strength of the packet frame. The strength rate information storage unit 231, however, divides the frame error rate in multiple parts and assigns the transmission rate starting with the region where the frame error rate is small.

Strength rate information is updated through continual operation of the FER measurement unit 230, the strength rate information storage unit 231, and the received signal strength calculation unit 232.

<Operations by the Receiver 20 to Determine Transmission Rate>

Figure 6:
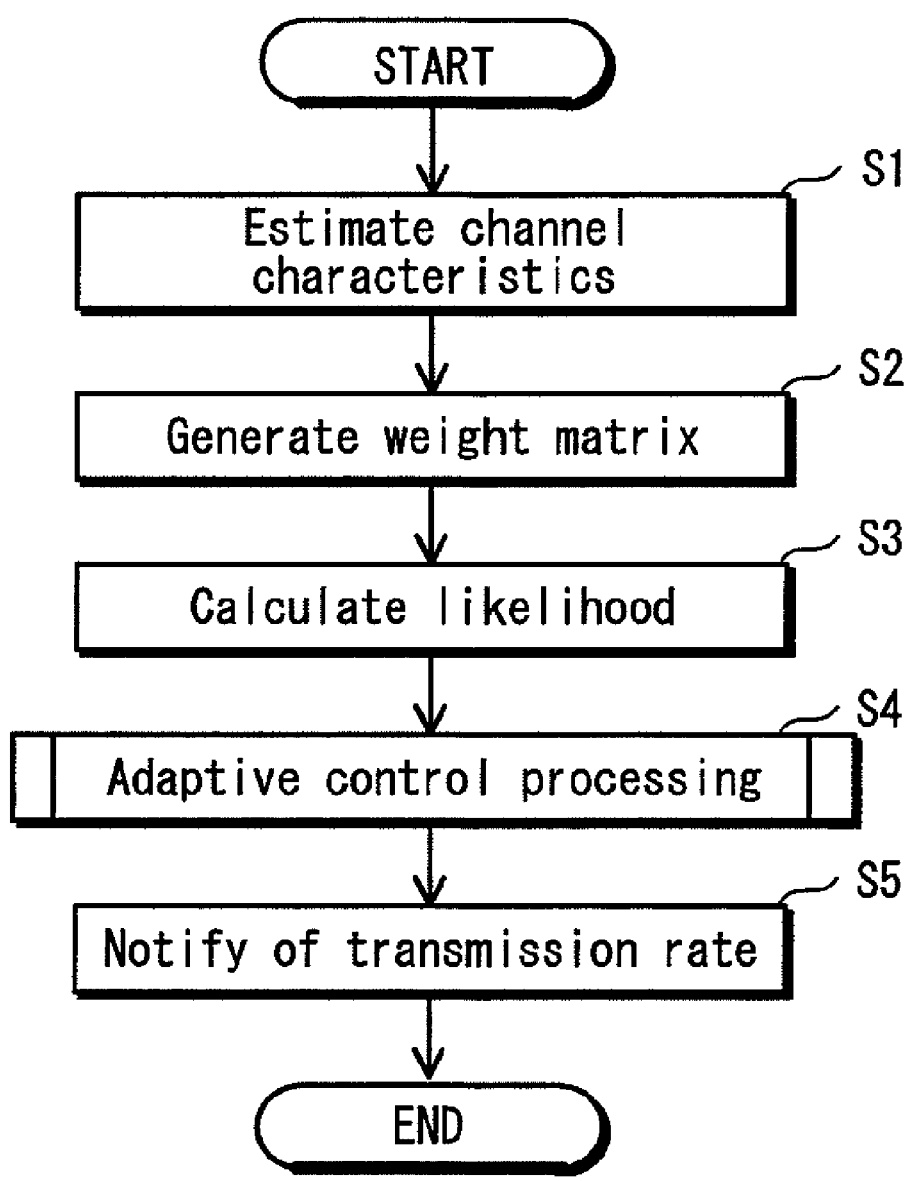
FIG. 6 is a flowchart showing the processing steps in transmission rate determination processing by the receiver 20.

The following is an explanation of transmission rate determination processing by the receiver 20 in FIG. 1 with reference to FIG. 6, which is a flowchart showing the processing steps in transmission rate determination processing by the receiver 20.

Based on the one or more training signals included in the one or more signals input from the FFT units $202_1$-$202_N$, the channel estimation unit 203 estimates the channel characteristics for each channel and outputs, to the weight generation unit 204 and the adaptive control unit 211, a channel matrix H having as elements the estimated values for the channel characteristics for each channel (step S1). The weight generation unit 204 generates a weight matrix W using the channel matrix H input in step S1 (step S2), and the likelihood calculation unit 205 calculates the likelihood for each transmission stream using the weight matrix W generated in step S2 (step S3). Based on the channel matrix H input in step S1 and the likelihood for each stream calculated in step S3, the adaptive control unit 211 determines the transmission rate to be notified to the transmitter 10 (step S4). In the receiver 20, predetermined processing is performed by the upper layer processing unit 23 and the transmission processing unit 24, and a transmission signal that includes the transmission rate determined in step S4 is transmitted from the antenna $RA_1$. In this way, the receiver 20 notifies the transmitter 10 of the transmission rate to be used for the next wireless communication from the transmitter 10 to the receiver 20 (step S5).

[Adaptive Control Processing]

Figure 7:
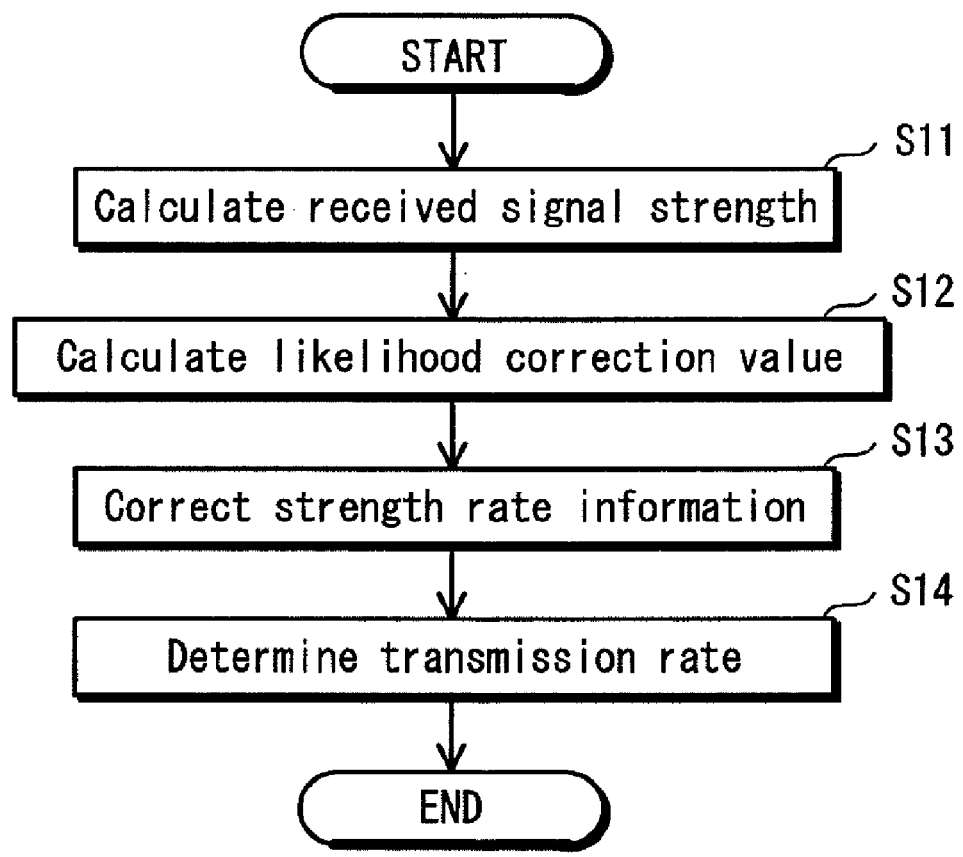
FIG. 7 is a flowchart showing the processing steps in adaptive control processing in FIG. 6.

The following is an explanation of the processing steps for adaptive control processing (step S4) in FIG. 6 with reference to FIG. 7, which is a flowchart showing the processing steps in adaptive control processing (step S4) in FIG. 6.

Based on the channel matrix H input from the channel estimation unit 203, the received signal strength calculation unit 232 calculates the received signal strength for the packet frame (step S11). Based on the likelihood information input from the likelihood calculation unit 205, the likelihood correction calculation unit 233 calculates a likelihood correction value (step S12), and based on the likelihood correction value calculated in step S12, the strength rate information correction unit 234 corrects the strength rate information stored in the strength rate information storage unit 231 (step S13). The transmission rate determining unit 235 determines, by referring to the strength rate information corrected in step S13, that the transmission rate for the received signal strength calculated in step S11 is the transmission rate to be notified to the transmitter 10, outputting this determined transmission rate to the upper layer processing unit 23 (step S14).

<Processing for Transmission/Reception Between the Transmitter 10 and the Receiver 20>

Figure 8:
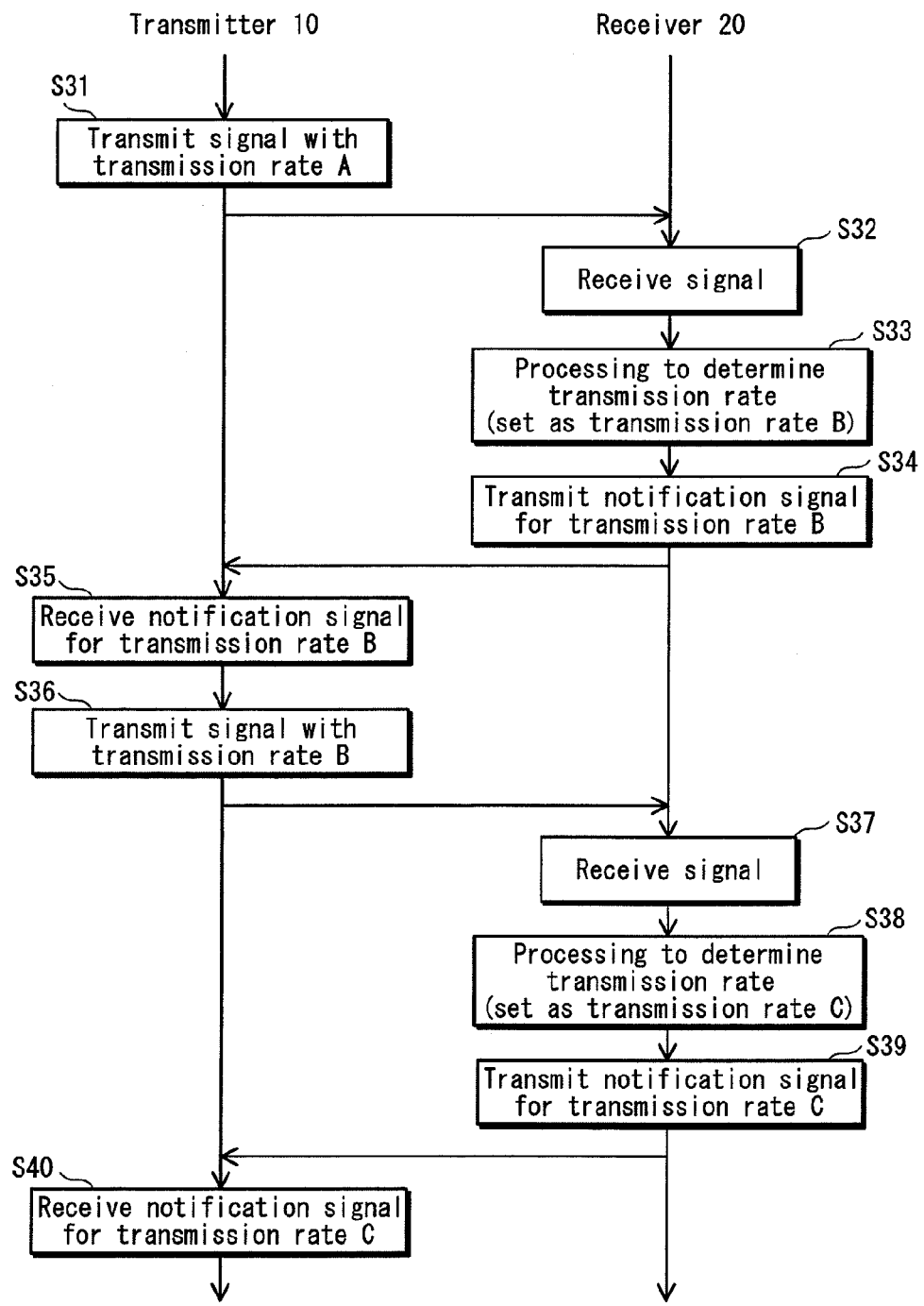
FIG. 8 is a sequence diagram showing the flow of processing for transmission/reception between the transmitter 10 and the receiver 20 in FIG. 1.

The following is an overview of the processing for transmission/reception between the transmitter 10 and the receiver 20 in FIG. 1 with reference to FIG. 8, which is a sequence diagram showing the flow of processing for transmission/reception between the transmitter 10 and the receiver 20 in FIG. 1.

In accordance with a transmission rate A in the previous notification by the receiver 20, the transmitter 10 transmits a signal (step S31), and the receiver 20 receives the signal transmitted in step S31 (step S32). The receiver 20 performs the processing steps shown in FIG. 6 (excluding step S5) and FIG. 7 and determines a transmission rate B to be the transmission rate to be notified to the transmitter 10 (step S33). The receiver 20 transmits a notification signal to notify the transmitter 10 of the transmission rate B determined in step S33 (step S34, corresponding to step S5 in the processing steps in FIG. 6), and the transmitter 10 receives the notification signal for the transmission rate B (step S35).

In accordance with the transmission rate B indicated by the notification signal received in step S35, the transmitter 10 transmits a signal (step S36), and the receiver 20 receives the signal transmitted in step S36 (step S37). The receiver 20 performs the processing steps shown in FIG. 6 (excluding step S5) and FIG. 7 and determines a transmission rate C to be the transmission rate to be notified to the transmitter 10 (step S38). The receiver 20 transmits a notification signal to notify the transmitter 10 of the transmission rate C determined in step S38 (step S39, corresponding to step S5 in the processing steps in FIG. 6), and the transmitter 10 receives the notification signal for the transmission rate C (step S40). For the next wireless communication to the receiver 20, the transmitter 10 transmits a signal using the transmission rate C of which it was notified.

Embodiment 2

The following is an explanation of Embodiment 2 of the present invention, with reference to the attached drawings.

In Embodiment 1, the adaptive control unit 211 used the received signal strength as is to determine the transmission rate with reference to the strength rate information. In the present embodiment, however, the adaptive control unit 211*a* corrects the received signal strength based on the likelihood correction value and determines the transmission rate using the corrected value for the received signal strength with reference to the strength rate information. Note that since the structure and operations of the adaptive control unit 211*a* differ essentially from Embodiment 1, explanation is provided for the adaptive control unit 211*a* in the present embodiment.

(Structure of Adaptive Control Unit 211*a*)

Figure 9:
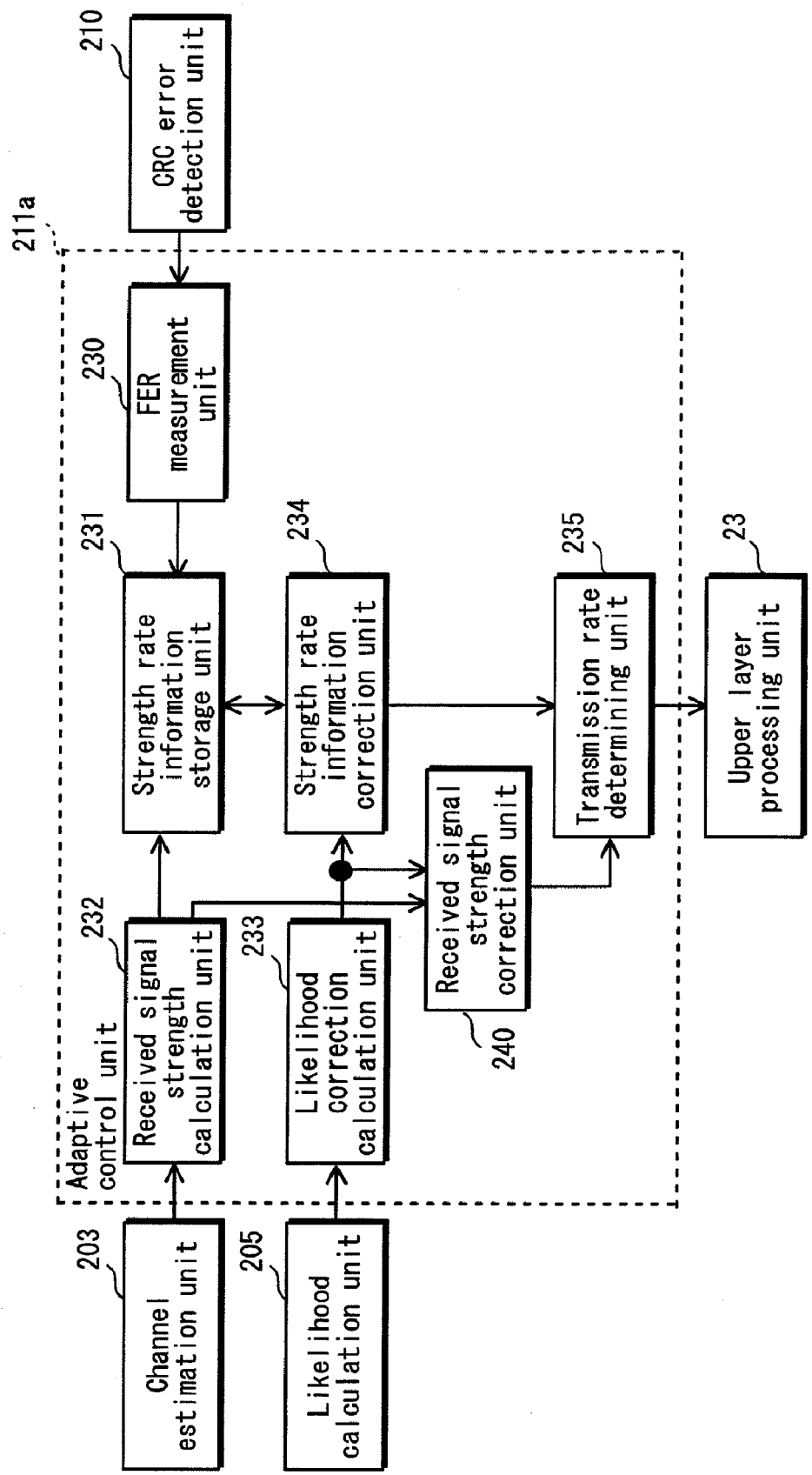
FIG. 9 is a block diagram of the adaptive control unit 211$a$ in the receiver in Embodiment 2.

The following is an explanation of the adaptive control unit 211*a* in the present embodiment with reference to FIG. 9, which is a block diagram of the adaptive control unit 211*a* in the present embodiment. Note that for structural elements in the present embodiment that are essentially the same as in Embodiment 1, the same labels have been used, and since the explanation of these elements also applies to the present embodiment, such explanation is not repeated.

The adaptive control unit 211*a* includes a received signal strength correction unit 240 in addition to the structural elements in the adaptive control unit 211 in Embodiment 1. Note that instead of outputting the received signal strength calculation value to the transmission rate determining unit 235, the received signal strength calculation unit 232 outputs this value to the received signal strength correction unit 240. The likelihood correction calculation unit 233 additionally outputs the likelihood correction value to the received signal strength correction unit 240.

Based on the likelihood correction value input from the likelihood correction calculation unit 233, the received signal strength correction unit 240 corrects the received signal strength for the packet frame input from the received signal strength calculation unit 232 and outputs the resulting corrected value for received signal strength (hereinafter, "corrected strength value") to the transmission rate determining unit 235.

When the likelihood is high, the channel matrix H can be deemed easy to separate into the original transmission streams during equalization processing by the receiving end, even at the same received signal strength. Therefore, the received signal strength correction unit 240 corrects the received signal strength for the packet frame that was input to make it higher. Conversely, when the likelihood is low, the channel matrix H can be deemed difficult to separate into the original transmission streams during equalization processing by the receiving end, even at the same received signal strength. Therefore, the received signal strength correction unit 240 corrects the received signal strength for the packet frame that was input to make it lower.

Correction of the received signal strength by the received signal strength correction unit 240 can be performed by storing, in the received signal strength correction unit 240, correction information that indicates the correction value (the value added to the received signal strength) for a likelihood correction value created with the above-mentioned points in mind, then having the received signal strength correction unit 240 estimate, by referring to the correction information, the correction value for the likelihood correction value and add the estimated correction value to the received signal strength that is input. In this case, the correction value is a positive value when the received signal strength is corrected to make the value larger and is a negative value when the received signal strength is corrected to make the value smaller. The above-described method of correcting the received signal strength is only one example, however, and such correction is not limited to this method. For example, other methods that reflect the above points may be used, such as calculating the corrected strength value by seeking the corrected value using a function or the like with the calculated likelihood value as a variable and adding the corrected value thus sought to the received signal strength.

In the present embodiment, the transmission rate determining unit 235 uses the corrected strength value input from the received signal strength correction unit 240 instead of using the received signal strength for the packet frame input from the received signal strength calculation unit 232. The transmission rate determining unit 235 determines, by referring to the strength rate information corrected by the strength rate information correction unit 234, that the transmission rate for the received signal strength that matches the corrected strength value input from the received signal strength correction unit 240 is the transmission rate to be notified to the transmitter 10. The transmission rate determining unit 235 then outputs the determined transmission rate to the upper layer processing unit 23.

(Operations of Adaptive Control Unit 211*a*)

Figure 10:
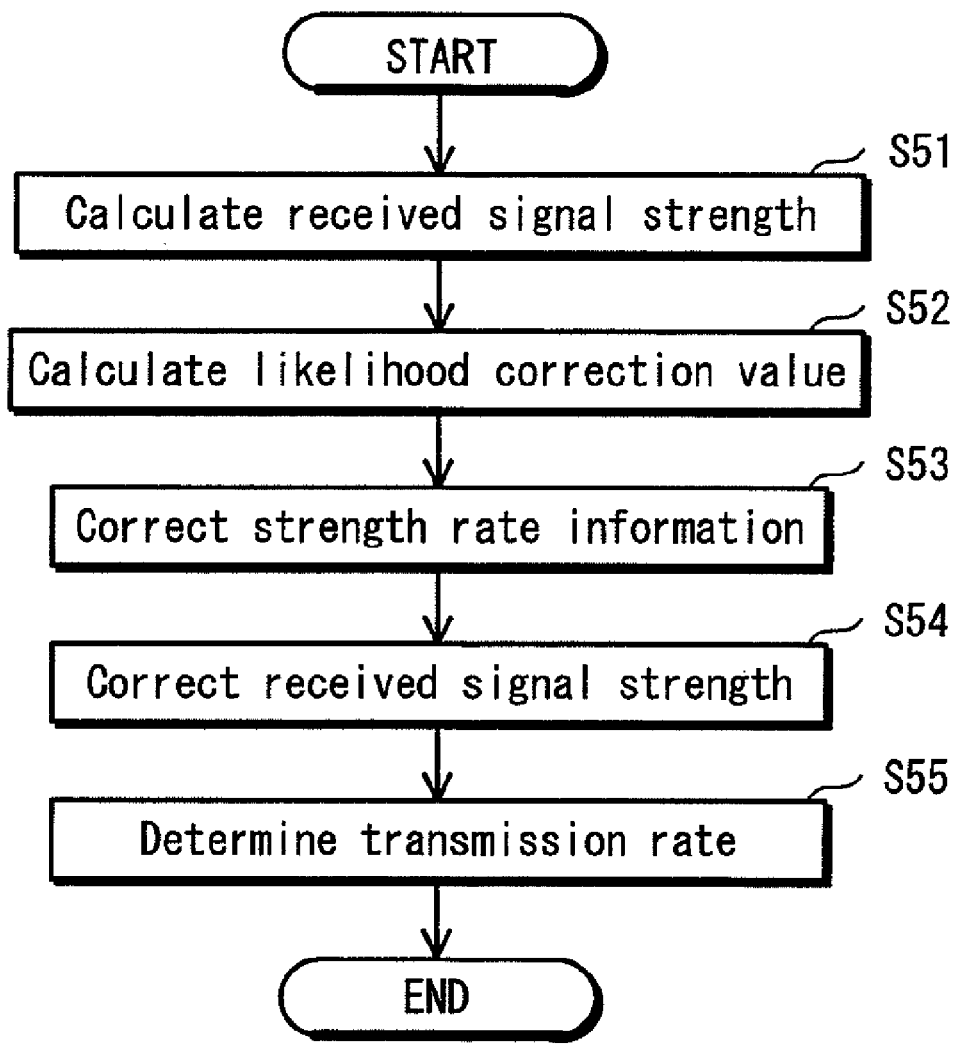
FIG. 10 is a flowchart showing the processing steps in adaptive control processing by the adaptive control unit 211$a$ in FIG. 9.

The following is an explanation of adaptive control processing by the adaptive control unit 211*a* in FIG. 9 with reference to FIG. 10, which is a flowchart showing the processing steps in adaptive control processing by the adaptive control unit 211*a* in FIG. 9.

The adaptive control unit 211*a* first performs essentially the same processing as in steps S1 through S3 (steps S51 through S53).

Based on the likelihood correction value input from the likelihood correction calculation unit 233, the received signal strength correction unit 240 corrects the received signal strength for the packet frame input from the received signal strength calculation unit 232 (step S54). Then, the transmission rate determining unit 235 determines, by referring to the strength rate information corrected in step S53, that the transmission rate for the received signal strength that matches the corrected strength value obtained in step S54 is the transmission rate to be notified to the transmitter 10. The transmission rate determining unit 235 then outputs the determined transmission rate to the upper layer processing unit 23 (step S55). By having the upper layer processing unit 23 and the transmission processing unit 24 perform predetermined processing, a transmission signal that includes the transmission rate output from the adaptive control unit 211*a* to the upper layer processing unit 23 is transmitted to the transmitter 10 via the antenna RA$_1$. For the next wireless communication to the receiver, the transmitter 10 transmits a signal in accordance with the transmission rate of which it was notified by the receiver.

Embodiment 3

The following is an explanation of Embodiment 3 of the present invention, with reference to the attached drawings.

The adaptive control unit 211*b* in Embodiment 3 performs different adaptive control processing than the adaptive control processing performed by the adaptive control unit 211 in Embodiment 1. In the present embodiment, the elements of the transmission rate of which the receiver 20*b* notifies the transmitter 10 are the modulation method and the coding rate, and therefore the adaptive control unit 101 in the transmitter 10 sets the coding rate in the coding unit 104 and the modulation method in the modulators 106$_1$-106$_M$ in accordance with the notification from the receiver 20*b*, setting other elements to predetermined values. Note that since the structure and operations of the receiver 20b differ essentially from Embodiment 1, explanation is provided for the receiver 20b in the present embodiment.

<Receiver 20b>

Figure 11:
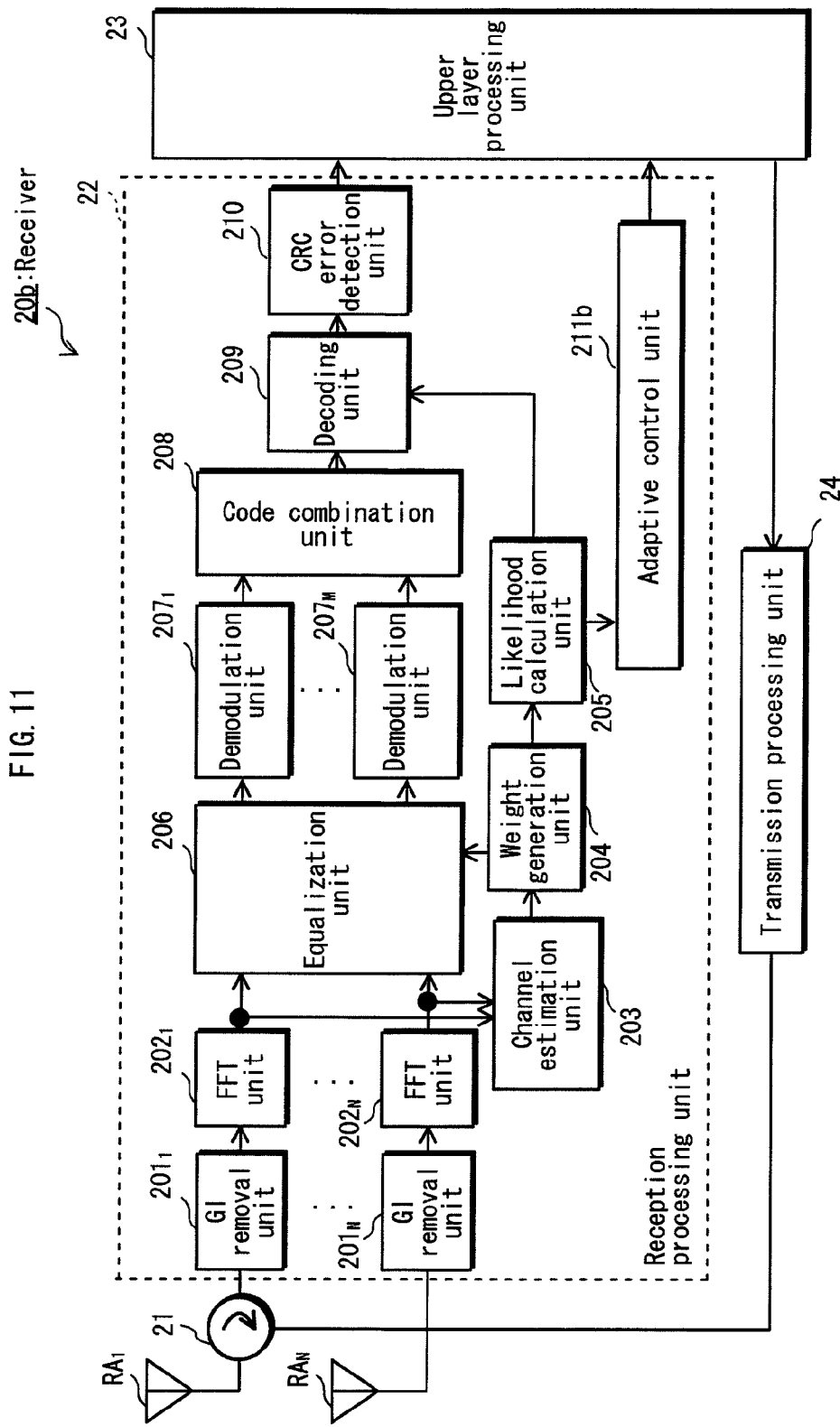
FIG. 11 is a configuration diagram of the receiver 20$b$ in Embodiment 3.

The following is an explanation of the receiver 20b in the present embodiment with reference to FIG. 11, which is a configuration diagram of the receiver 20b in the present embodiment. Note that for structural elements in the present embodiment that are essentially the same as in Embodiment 1, the same labels have been used, and since the explanation of these elements also applies to the present embodiment, such explanation is not repeated.

The receiver 20b includes an adaptive control unit 211b instead of the adaptive control unit 211 in the receiver 20 in Embodiment 1. Note that in the present embodiment, the channel estimation unit 203 does not output the channel matrix H to the adaptive control unit 211b, only outputting this matrix to the weight generation unit 204. Also, the CRC error detection unit 210 does not output the CRC error detection information to the adaptive control unit 211b.

(Structure of Adaptive Control Unit 211B)

Figure 12:
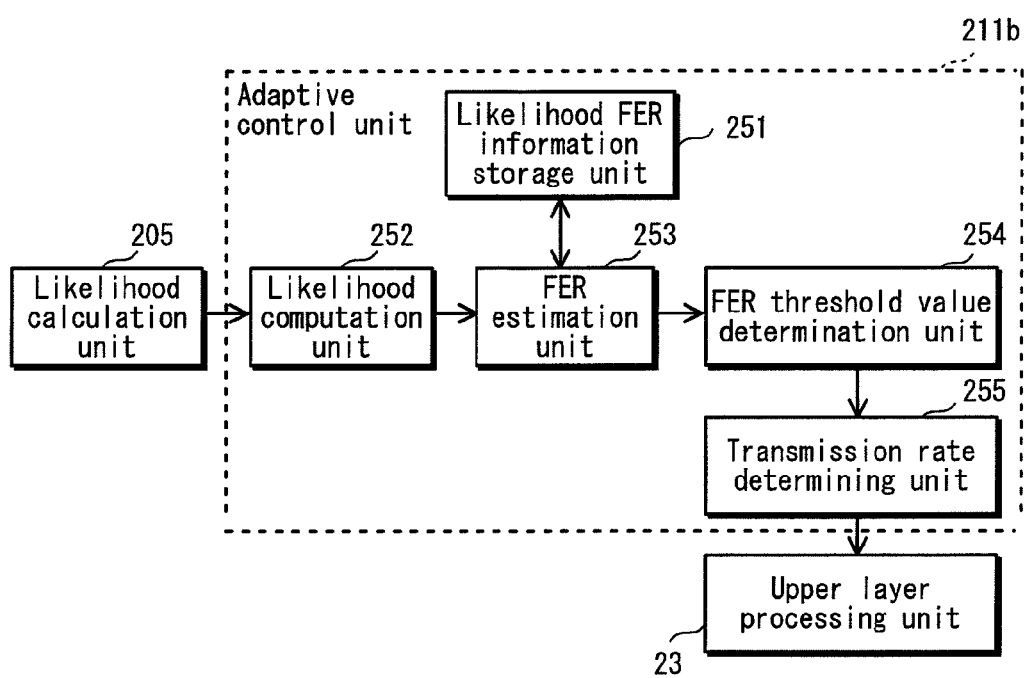
FIG. 12 is a block diagram of the adaptive control unit 211$b$ in FIG. 11.

The following is an explanation of the adaptive control unit 211b in FIG. 11 with reference to FIG. 12, which is a block diagram of the adaptive control unit 211b in FIG. 11.

The adaptive control unit 211b includes a likelihood FER information storage unit 251, a likelihood computation unit 252, an FER estimation unit 253, an FER threshold value determination unit 254, and a transmission rate determining unit 255.

Figure 13:
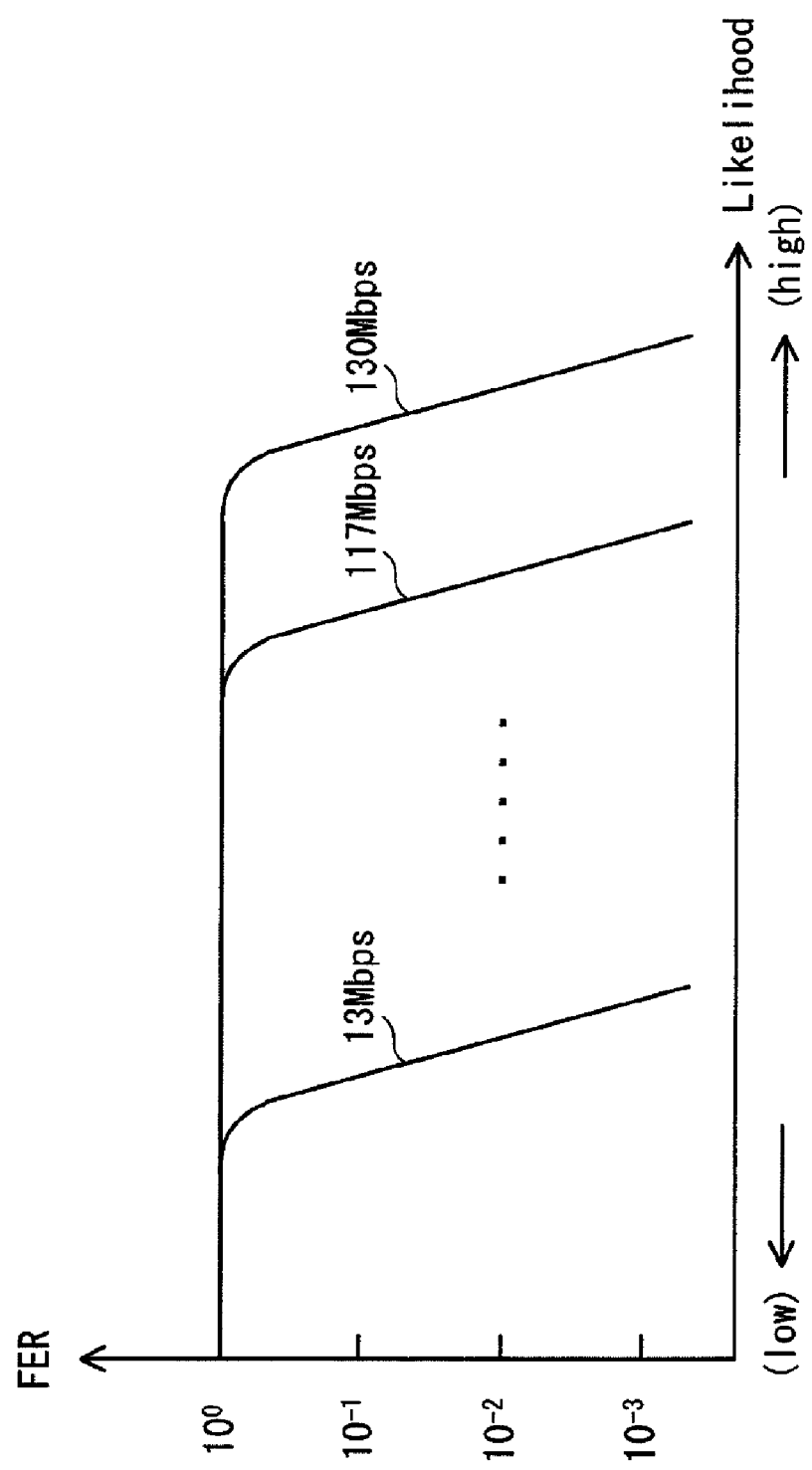
FIG. 13 shows an example of likelihood FER information stored by the likelihood FER information storage unit 251 in FIG. 12.

The likelihood FER information storage unit 251 stores the likelihood FER information indicating the FER (Frame Error Rate) for the likelihoods for each transmission rate, as shown in the example in FIG. 13. In this figure, the horizontal axis indicates likelihood, and the vertical axis indicates the FER. Note that in the IEEE 802.11n Draft 2.0, for a bandwidth of 20 MHz, a two-stream transmission, and a guard interval length of 800 nanoseconds, then likelihood FER information for eight transmission rates, 130 Mbps, 117 Mpbs, 104 Mbps, 78 Mpbs, 52 Mbps, 39 Mbps, 26 Mbps, and 13 Mbps, is stored in the likelihood FER information storage unit 251.

Figure 14A:
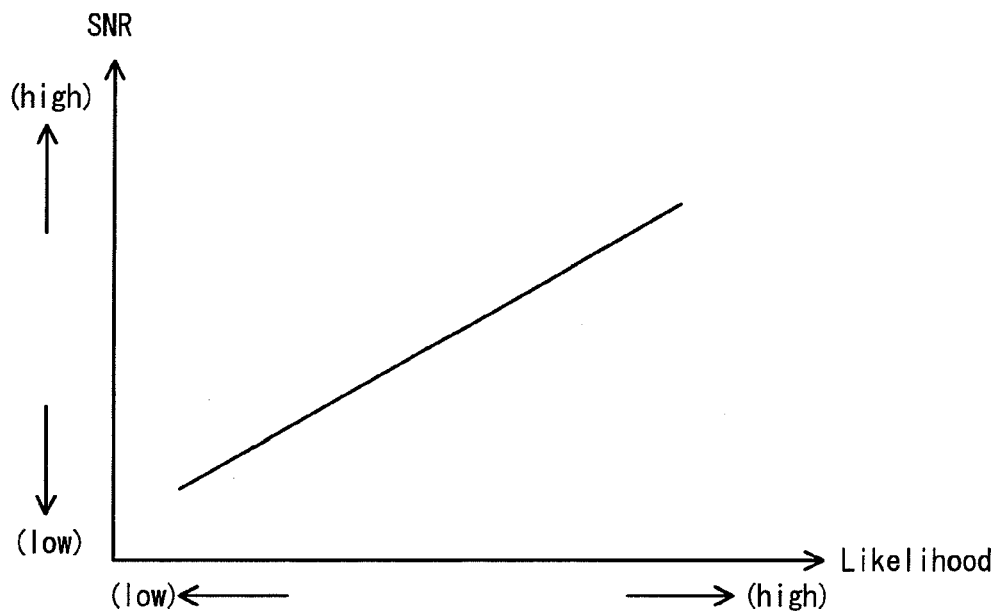
FIG. 14A shows an example of the relationship between likelihood and SNR, which is used in creation of the likelihood FER information for each transmission rate in FIG. 13.
Figure 14B:
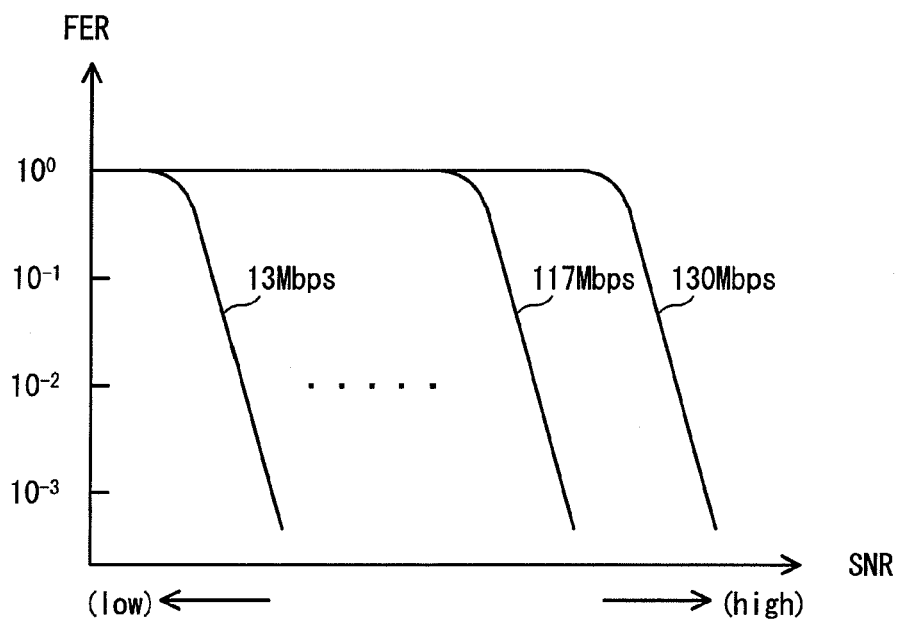
FIG. 14B shows an example of the relationship between SNR and FER, which is used in creation of each piece of likelihood FER information in FIG. 13.

The likelihood FER information for each transmission rate shown in FIG. 13 can be derived from the relationship between likelihood and SNR (Signal to Noise Ratio) shown in FIG. 14A and from the relationship between each transmission rate's SNR and FER shown in FIG. 14B.

For each transmission stream, the likelihood computation unit 252 adds the likelihoods for each carrier associated with the same transmission stream included in the likelihood information input from the likelihood calculation unit 205. The likelihood computation unit 252 then divides the value obtained through this addition by the number of carriers, adds up the values for each transmission stream resulting from division, and divides the value obtained through this addition by the number of transmission streams. Finally, the likelihood computation unit 252 outputs the value resulting from this division (a likelihood for a packet frame) to the FER estimation unit 253 as the likelihood for the FER estimation unit 253 to use when estimating the FER. Note that at this point, only the likelihood values for each carrier that can be measured are used for each transmission stream. The likelihood depends neither on the modulation method nor on the coding rate.

The FER estimation unit 253 estimates, by referring to the likelihood FER information stored in the likelihood FER information storage unit 251, the FER for the likelihood input from the likelihood computation unit 252 for each transmission rate, associates the estimated FER (hereinafter "estimated FER value") to a corresponding transmission rate, and outputs the FER and the corresponding transmission rate to the FER threshold value determination unit 254.

The FER threshold value determination unit 254 compares the estimated FER value input from the FER estimation unit 253 for each transmission rate with a predetermined FER threshold value and outputs transmission rates for which the estimated FER value is equal to or less than the FER threshold value to the transmission rate determining unit 255. Note that the FER threshold value can be changed in accordance with the application in use. For example, if the application in use is VoIP (Voice over Internet Protocol), the threshold FER value is set to 0.03 (3%), and when transmitting data from the Web or the like, the threshold FER value is set to 0.1 (10%).

The transmission rate determining unit 255 determines that the fastest transmission rate among the transmission rates input from the FER threshold value determination unit 254 will be the transmission rate to be notified to the transmitter 10.

The transmission rate determining unit 255 then outputs the modulation method and coding rate for the determined transmission rate to the upper layer processing unit 23. The modulation method and coding rate output to the upper layer processing unit 23 are notified to the transmitter 10. Note that for each transmission rate, the transmission rate determining unit 255 stores a corresponding modulation method and coding rate. FIG. 15 shows the modulation method and coding rate for a transmission stream with a 20 MHz bandwidth, two-stream transmission, and 800 nanosecond guard interval length according to the IEEE 802.11n Draft 2.0.

(Operations of Adaptive Control Unit 211b)

Figure 16:
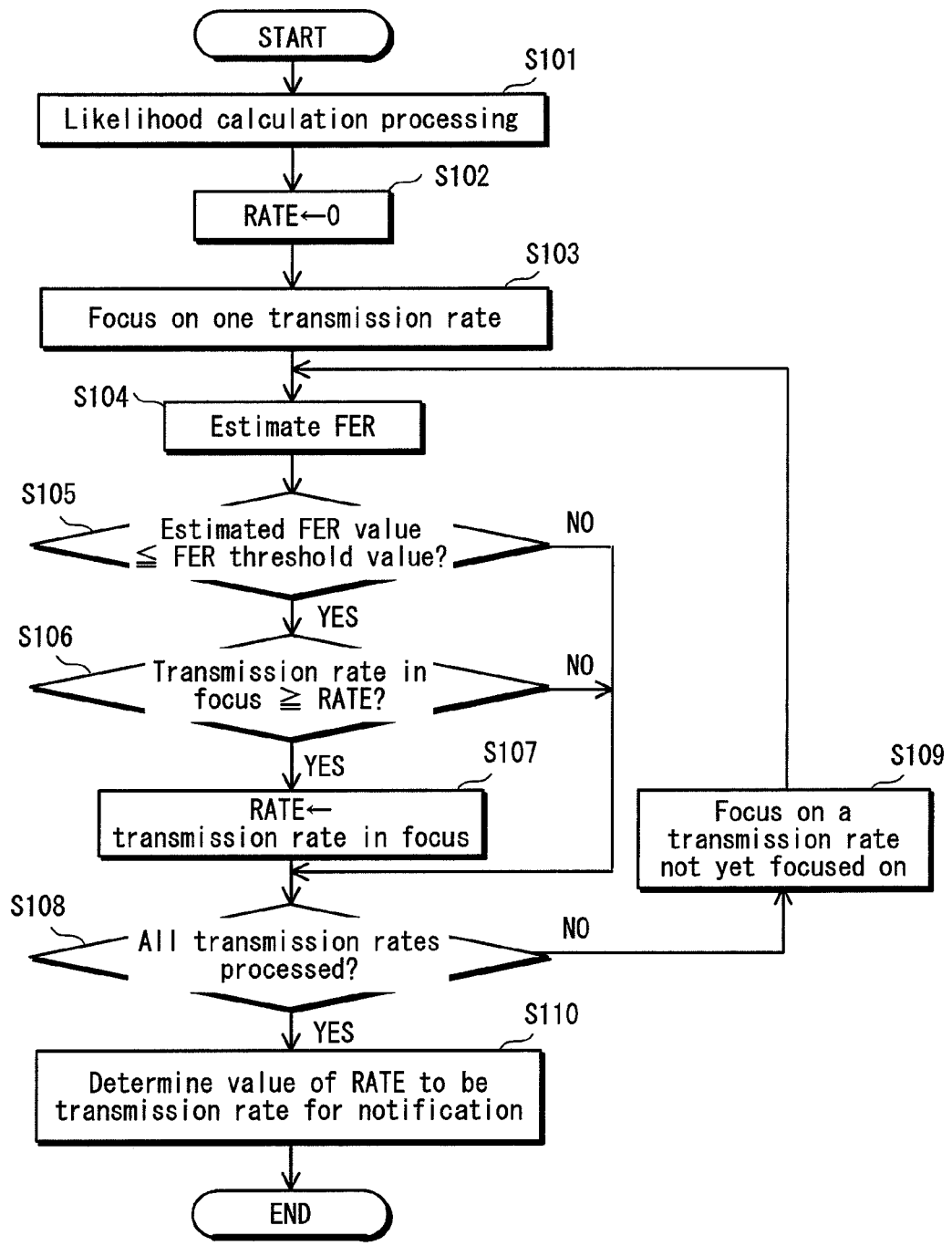
FIG. 16 is a flowchart showing the processing steps in adaptive control processing by the adaptive control unit 211$b$ in FIG. 12.

The following is an explanation of the adaptive control processing by the adaptive control unit 211b in FIG. 12 with reference to FIG. 16, which is a flowchart showing the processing steps in adaptive control processing by the adaptive control unit 211b in FIG. 12.

Based on the likelihood information input from the likelihood calculation unit 205, the likelihood computation unit 252 calculates the likelihood used by the FER estimation unit 253 for estimating the FER (step S101), and the transmission rate determining unit 255 sets the variable RATE to 0 (step S102).

The FER estimation unit 253 focuses on one transmission rate (step S103), and for the transmission rate in focus, estimates the FER for the likelihood calculated in step S101 by referring to the likelihood FER information stored in the likelihood FER information storage unit 251 (step S104). The FER threshold value determination unit 254 compares the estimated FER value estimated in step S104 with the FER threshold value, determining whether the estimated FER value is equal to or less than the FER threshold value or not (step S105). When the estimated FER value is determined not to be equal to or less than the FER threshold value (S105: NO), then the processing in step S108 is carried out. Conversely, when the estimated FER value is determined to be equal to or less than the FER threshold value (S105: YES), then the processing in step S106 is carried out.

The transmission rate determining unit 255 determines whether the transmission rate in focus is equal to or greater than the variable RATE (step S106). When the transmission rate in focus is determined to be equal to or greater than the variable RATE (S106: YES), then the transmission rate determining unit 255 updates the value of the variable RATE to the transmission rate in focus (step S107) and performs the processing in step S108. Conversely, when the transmission rate in focus is determined not to be equal to or greater than the variable RATE (S106: NO), then the processing in step S108 is performed directly.

The FER estimation unit 253 determines whether processing such as FER estimation has been performed for all transmission rates (step S108). When processing such as FER estimation has not been performed for all transmission rates (S108: NO), the FER estimation unit 253 focuses on one of the transmission rates for which FER estimation and other processing has not been performed (step S109), and processing proceeds to step S104. Conversely, when processing such as FER estimation has been performed for all transmission rates (S108: YES), then processing proceeds to step S110.

The transmission rate determining unit 255 determines the value of the variable RATE to be the transmission rate to be notified to the transmitter 10 and outputs the modulation method and coding rate for the determined transmission rate to the upper layer processing unit 23 (step S110). By having the upper layer processing unit 23 and the transmission processing unit 24 perform predetermined processing, a transmission signal that includes the modulation method and the coding rate output from the adaptive control unit 211b to the upper layer processing unit 23 is transmitted to the transmitter 10 via the antenna $RA_1$. For the next wireless communication to the receiver 20b, the transmitter 10 transmits a signal in accordance with the modulation method and coding rate of which it was notified by the receiver 20b.

With the above-described embodiment, it is possible to reflect the characteristics of the channel matrix H when deciding the transmission rate by instantaneously estimating the FER based on the likelihood to determine the transmission rate, and it is thus possible to determine an appropriate transmission rate in accordance with the channel state. Since it is possible to measure likelihood for each subcarrier, by using likelihood it is possible instantaneously to follow the moment-by-moment changes in the channel and determine the transmission rate.

Embodiment 4

The following is an explanation of Embodiment 4 of the present invention, with reference to the attached drawings.

In Embodiment 3, the fastest transmission rate among the transmission rates with an estimated FER value equal to or below the FER threshold value was the transmission rate to be notified to the transmitter 10. In the present embodiment, the transmission rate with the largest throughput calculated based on the estimated FER value is the transmission rate to be notified to the transmitter 10. Note that since the structure and operations of the adaptive control unit 211c differ essentially from Embodiment 3, explanation is provided for the adaptive control unit 211c in the present embodiment.

(Structure of Adaptive Control Unit 211c)

Figure 17:
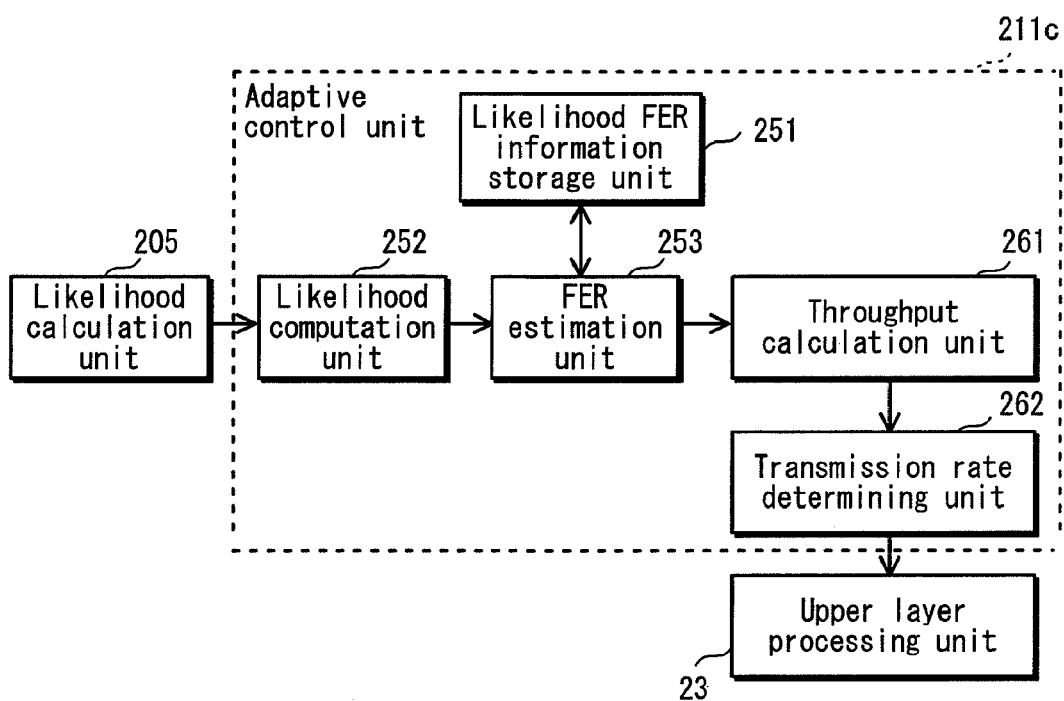
FIG. 17 is a block diagram of the adaptive control unit 211$c$ in Embodiment 4.

The following is an explanation of the adaptive control unit 211c with reference to FIG. 17, which is a block diagram of the adaptive control unit 211c in the present embodiment. Note that for structural elements in the present embodiment that are essentially the same as in Embodiment 3, the same labels have been used, and since the explanation of these elements also applies to the present embodiment, such explanation is not repeated.

The adaptive control unit 211c includes a likelihood FER information storage unit 251, a likelihood computation unit 252, an FER estimation unit 253, a throughput calculation unit 261, and a transmission rate determining unit 262.

For each transmission rate, the throughput calculation unit 261 calculates the feasible throughput in the MAC layer level, i.e. the effective transmission rate, in accordance with the estimated FER value that is input from the FER estimation unit 253 and corresponds to the transmission rate. The throughput calculation unit 261 then assigns the calculated throughput (hereinafter "calculated throughput value") to a corresponding transmission rate and outputs the calculated throughput and corresponding transmission rate to the transmission rate determining unit 262.

The following is an example of a throughput calculation method using the Surplus Bandwidth Allowance (hereinafter "surplus" or "retransmission ratio") in the IEEE 802.11e Draft 13.0. Note that the retransmission ratio is the ratio of the bandwidth desired to be reserved in the transmission stream in light of retransmission and other considerations to the standard bandwidth, and this ratio cannot be smaller than one.

Figure 18:
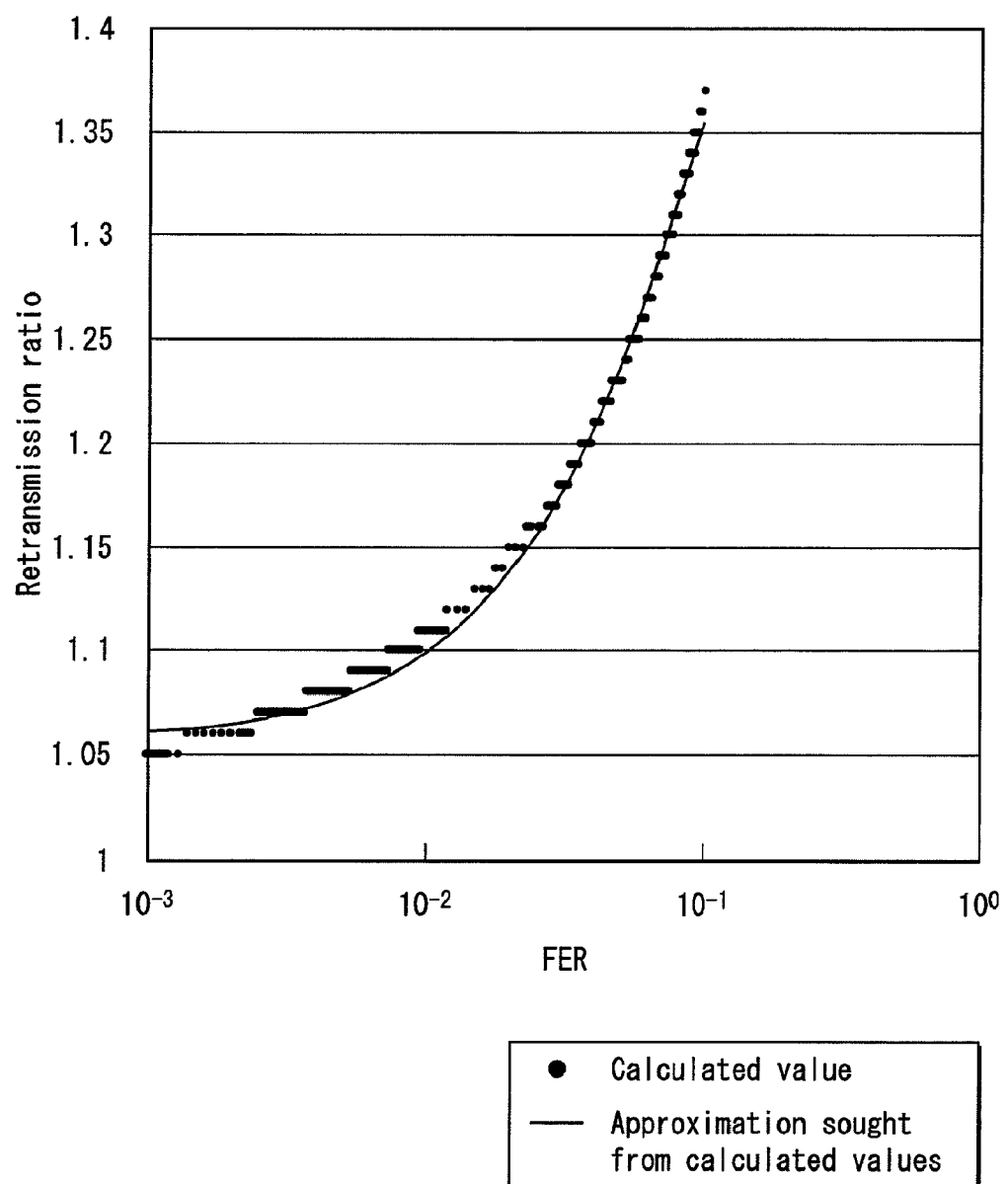
FIG. 18 shows an example of the relationship between FER and the retransmission ratio, which is used by the throughput calculation unit 261 in FIG. 17.

The throughput calculation unit 261 calculates the retransmission ratio based on the estimated FER value input from the FER estimation unit 253. The relationship between FER and the retransmission ratio, of which an example is shown in FIG. 18, is used during calculation of the retransmission ratio. This relationship between FER and the retransmission ratio can be sought using Equation 5 below, which is recorded in the IEEE 802.11e Draft 13.0. In the relationship in Equation 5 below, when transmitting 100 frames it is possible to determine the number of redundant frames S taking retransmission into consideration.

$$P_{drop} = \sum_{k=S+1}^{S+100} {}_{S+100}C_k p^k (1-p)^{100+S-k} \qquad \text{[Equation 5]}$$

In this equation, p is the FER, and $P_{drop}$ is the frame loss ratio indicating the ratio of how many of the 100 frames could not be received among 100+S frames.

FIG. 18 shows the results of using Equation 5 to seek the number of redundant frames S for maintaining the frame loss ratio for each FER at $10^{-8}$ or lower. In FIG. 18, the horizontal axis indicates the FER, and vertical axis indicates the retransmission ratio (=(100+S)/100). The black dots in FIG. 18 are the values sought by using Equation 5, and the line in FIG. 18 is the approximated curve sought from the black dots. For example, with a contents rate of 10 Mbps, and a retransmission ratio of 1.25, the graph indicates that for contents transmission, a bandwidth of at least 12.5 Mbps is necessary.

Note that the frame loss ratio is fixed at $10^{-8}$ so that not a single frame will be lost when viewing a movie approximately two hours long (with a number of transmitted frames fixed at approximately $1.65^{+7}$) via 28 Mbps BS digital broadcasting, full TS broadcast, the highest rate for the assumed contents. In Equation 5, the number of frames is set at 100, but this number can be changed in accordance with the size of the transmission buffer in the transmitter or the reception buffer in the receiver.

The throughput calculation unit 261 substitutes the estimated FER value input from the FER estimation unit 253 into Equation 5 and calculates the number of redundant frames S for which the frame loss ratio $P_{drop}$ will be $10^{-8}$ or less. The throughput calculation unit 261 calculates the retransmission ratio by substituting the calculated number of redundant frames S into (100+S)/100. The throughput calculation unit 261 then calculates the throughput from this calculated retransmission ratio.

As an example, calculation of throughput when the transmission rate is 48 Mbps as per IEEE 802.11a and the calculated retransmission ratio is 1.25 is considered. First, the highest effective rate in the MAC layer level for a transmission rate of 48 Mbps is approximately 32 Mbps. This is the largest effective rate calculated by transmitting via HCCA (HCF Controlled Channel Access) as per IEEE 802.11e, taking into consideration the frame preamble, physical layer header, MAC header, SIFS (Short Inter Frame Space), and ACK frame. Since the throughput is obtained by dividing the calculated highest effective rate by the retransmission ratio, the throughput in this case is 32,000,000 (bps)/1.25=25,600,000 (bps). In other words, since the retransmission ratio is 1.25, when the transmission rate is 48 Mbps, throughput that takes retransmission into consideration can be calculated to be 25.6 Mbps.

The transmission rate determining unit 262 finds the largest calculated throughput value from among the calculated throughput values associated with each transmission rate input from the throughput calculation unit 261. The transmission rate determining unit 262 then determines that the transmission rate corresponding to this highest calculated throughput value will be the transmission rate to be notified to the transmitter 10 and outputs the modulation method and decoding ratio for the determined transmission rate to the upper layer processing unit 23. The transmission rate determining unit 262 stores the modulation method and coding rate corresponding to each transmission rate.

(Operations of Adaptive Control Unit 211c)

Figure 19:
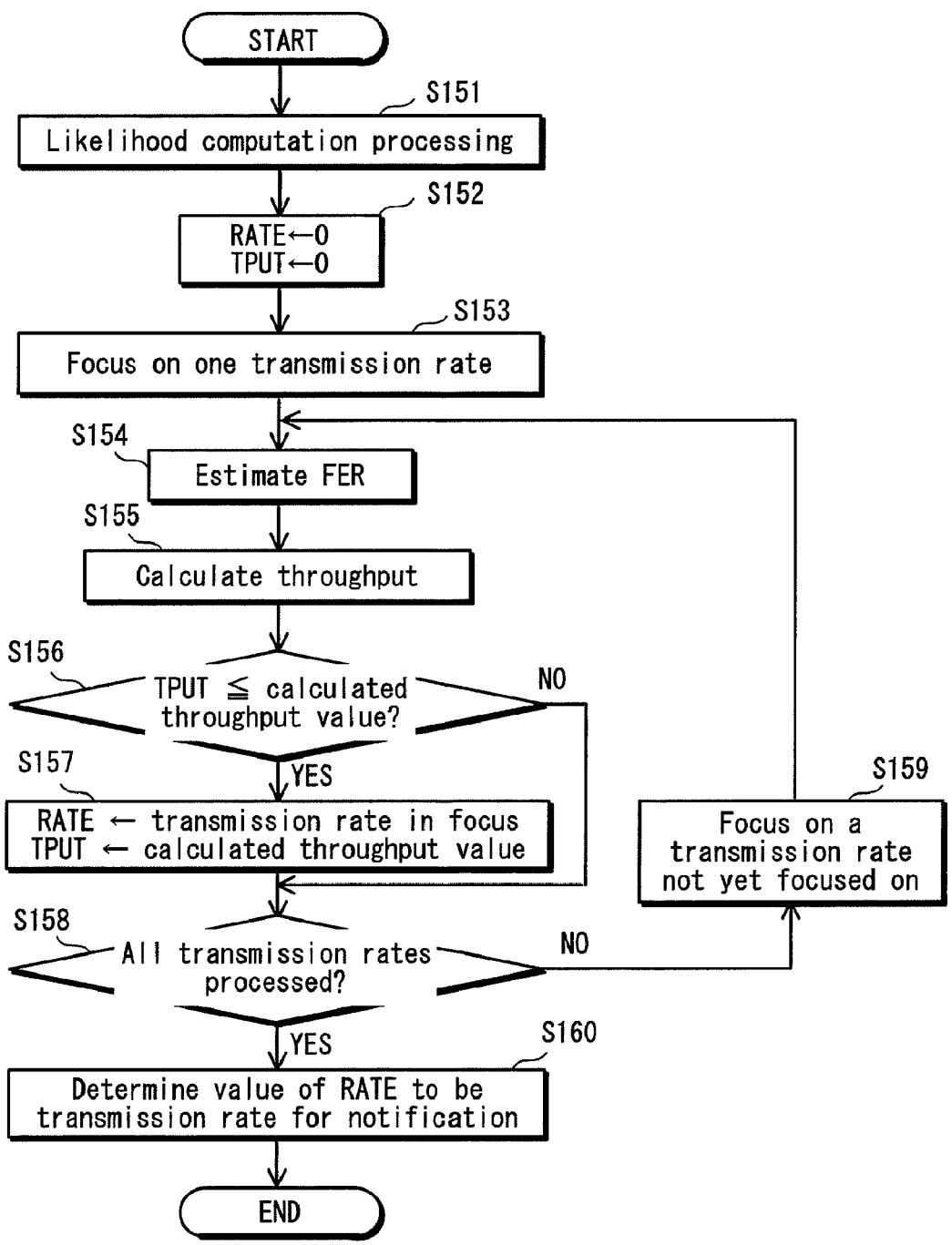
FIG. 19 is a flowchart showing the processing steps in adaptive control processing by the adaptive control unit 211$c$ in FIG. 17.

The following is an explanation of the adaptive control processing by the adaptive control unit 211c in FIG. 17 with reference to FIG. 19, which is a flowchart showing the processing steps in adaptive control processing by the adaptive control unit 211c in FIG. 17.

Based on the likelihood information input from the likelihood calculation unit 205, the likelihood computation unit 252 calculates the likelihood used by the FER estimation unit 253 for estimating the FER (step S151), and the transmission rate determining unit 262 sets the variable RATE and the variable TPUT both to 0 (step S152).

The FER estimation unit 253 focuses on one transmission rate (step S153), and for the transmission rate in focus, estimates the FER for the likelihood calculated in step S151 by referring to the likelihood FER information stored in the likelihood FER information storage unit 251 (step S154). The throughput calculation unit 261 calculates the throughput using the estimated FER value estimated in step S154 (step S155).

The transmission rate determining unit 262 compares the calculated throughput value calculated in step S155 with the value of the variable TPUT and determines whether the calculated throughput value is equal to or greater than the variable TPUT (step S156). When the calculated throughput value is determined not to be equal to or greater than the variable TPUT (S156: NO), then the processing in step S158 is performed. Conversely, when the calculated throughput value is determined to be equal to or greater than the variable TPUT (S156: YES), then the transmission rate determining unit 262 updates the value of the variable RATE to the transmission rate in focus and updates the value of the variable TPUT to the calculated throughput value (step S157), after which the processing in step S158 is performed.

The FER estimation unit 253 determines whether processing such as FER estimation has been performed for all transmission rates (step S158). When processing such as FER estimation has not been performed for all transmission rates (S108: NO), the FER estimation unit 253 focuses on one of the transmission rates for which FER estimation and other processing has not been performed (step S159), and processing proceeds to step S154. Conversely, when processing such as FER estimation has been performed for all transmission rates (S158: YES), then processing proceeds to step S160.

The transmission rate determining unit 262 determines the value of the variable RATE to be the transmission rate to be notified to the transmitter 10 and outputs the modulation method and coding rate for the determined transmission rate to the upper layer processing unit 23 (step S160). By having the upper layer processing unit 23 and the transmission processing unit 24 perform predetermined processing, a transmission signal that includes the modulation method and the coding rate output from the adaptive control unit 211c to the upper layer processing unit 23 is transmitted to the transmitter 10 via the antenna $RA_1$. For the next wireless communication to the receiver, the transmitter 10 transmits a signal in accordance with the modulation method and coding rate of which it was notified by the receiver.

Figure 20:
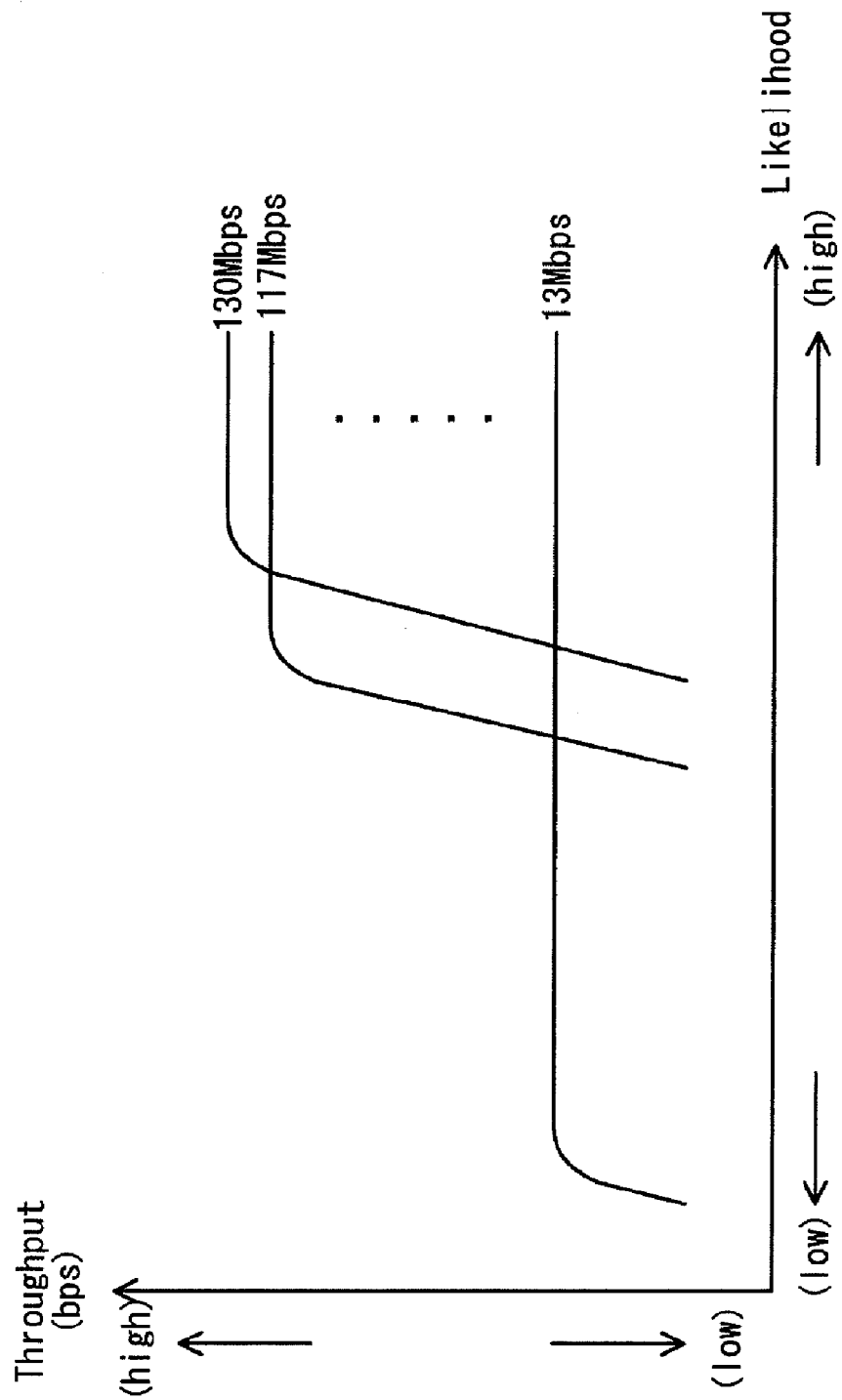
FIG. 20 shows an example of the relationship between likelihood and throughput in Embodiment 4.

FIG. 20 shows the relationship between likelihood (corresponding to the likelihood calculated in step S151) and the throughput in the MAC layer level (corresponding to the calculated throughput value calculated in step S155). In FIG. 20, the horizontal axis shows the likelihood, and the vertical axis shows the throughput in the MAC layer level. As can be seen in FIG. 20, the transmission rate for the maximum throughput varies according to the likelihood value. In the above-described adaptive control unit 211c, the transmission rate for the maximum throughput is always chosen as the transmission rate to be notified to the transmitter 10.

Embodiment 5

Figures 21, 22:
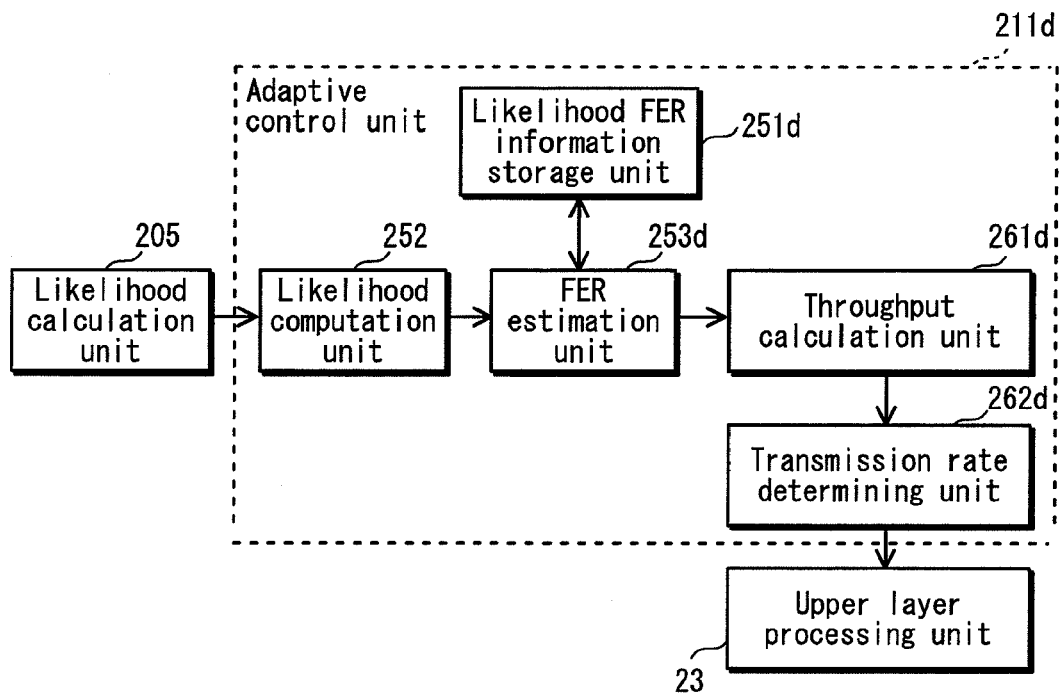
FIG. 21 shows an example of a guard interval length, modulation method, and coding rate corresponding to a transmission rate.
FIG. 22 is a block diagram of the adaptive control unit 211$d$ in the receiver in Embodiment 5.

In IEEE 802.11n Draft 2.0, guard interval lengths (hereinafter "GI length") of 800 nanoseconds and 400 nanoseconds are supported. The transmission rate changes not only according to the modulation method and the coding rate, but also according to the GI length. FIG. 21 shows the guard interval length, modulation method, and coding rate corresponding to a transmission rate with a 20 MHz bandwidth and two-stream transmission as per IEEE 802.11n Draft 2.0.

The guard interval (hereinafter "GI") has the effect of increasing the resistance to multipath fading. When the GI length is a large value, the resistance to multipath fading is high, and it is possible to transmit stably over a great propagated distance. However, as the redundant section added to the signal increases, throughput decreases. Conversely, when the GI length is a small value, throughput is high, but the effects of multipath fading increase, making such a GI length appropriate for transmission over short distances.

The following is an explanation of Embodiment 5 of the present invention, with reference to the attached drawings.

In Embodiment 4, the adaptive control unit 211c determined the modulation method and coding rate to be notified to the transmitter 10. In the present embodiment, on the other hand, the adaptive control unit 211d determines the GI length, modulation method, and coding rate to be notified to the transmitter 10. In the present embodiment, the elements of the transmission rate of which the receiver notifies the transmitter 10 are the GI length, modulation method, and coding rate, and therefore the adaptive control unit 101 in the transmitter 10 sets the coding rate in the coding unit 104, the modulation method in the modulators $106_1$-$106_M$, and the GI length in the GI units $109_1$-$109_M$, in accordance with the notification from the receiver, setting other elements to predetermined values. Note that since the structure and operations that differ essentially from Embodiment 4 are found in the adaptive control unit 211d, explanation is provided for the adaptive control unit 211d in the present embodiment.

(Structure of Adaptive Control Unit 211d)

The following is an explanation of the adaptive control unit 211d with reference to FIG. 22, which is a block diagram of the adaptive control unit 211d in the present embodiment. Note that for structural elements in the present embodiment that are essentially the same as in Embodiment 3, the same labels have been used, and since the explanation of these elements also applies to the present embodiment, such explanation is not repeated.

The adaptive control unit 211d includes a likelihood FER information storage unit 251d, a likelihood computation unit 252, an FER estimation unit 253d, a throughput calculation unit 261d, and a transmission rate determining unit 262d. In the present embodiment, considering how even different sets of GI length, modulation method, and coding rate can yield the same transmission rate, the adaptive control unit 211d performs predetermined processing on each GI length at each transmission rate.

Figure 23:
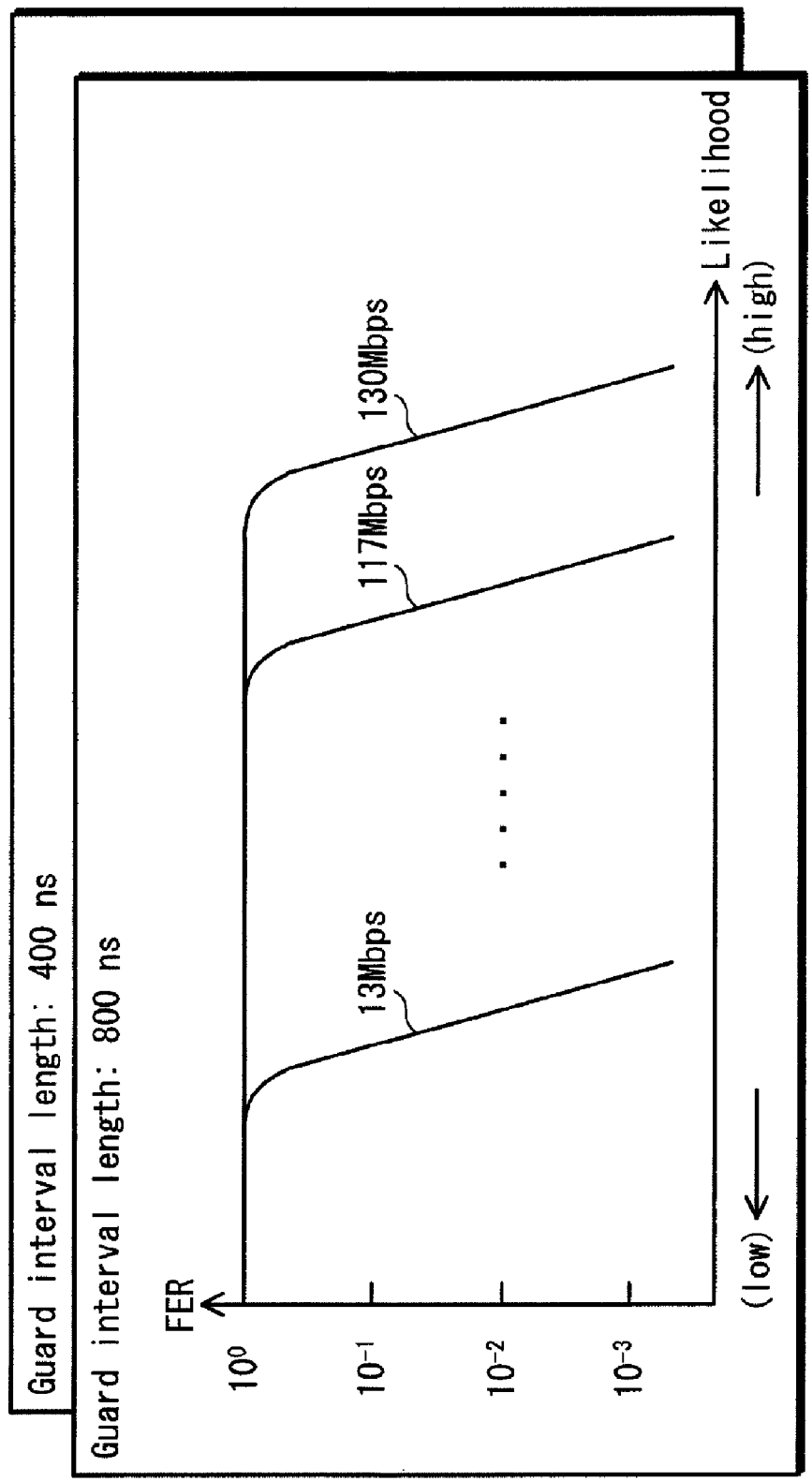
FIG. 23 shows an example of the likelihood FER information stored by the likelihood FER information storage unit 251$d$ in FIG. 22.

The likelihood FER information storage unit 251d stores likelihood FER information indicating the FER for the likelihood for each GI length at each transmission rate, as shown in the example in FIG. 23. In this figure, the horizontal axis indicates likelihood, and the vertical axis indicates FER.

The FER estimation unit 253d estimates, by referring to the likelihood FER information stored in the likelihood FER information storage unit 251d, the FER for the likelihood input from the likelihood computation unit 252 for each GI length at each transmission rate. The FER estimation unit 253d also associates the estimated FER value with a corresponding transmission rate and a GI length and outputs the estimated FER value and corresponding transmission rate and GI length to the throughput calculation unit 261d.

For each GI length at each transmission rate, the throughput calculation unit 261d calculates the throughput based on the estimated FER value input from the FER estimation unit 253d, associates the calculated throughput value with a corresponding transmission rate and a GI length, and outputs the calculated throughput value and corresponding transmission rate and GI length to the transmission rate determining unit 262d.

The transmission rate determining unit 262d finds the highest estimated throughput value from among the estimated throughput values input from the throughput calculation unit 261d. Then, based on the transmission rate and GI length corresponding to the highest estimated throughput value, the transmission rate determining unit 262d determines the GI length, modulation method, and coding rate to be notified to the transmitter 10. Afterwards, the transmission rate determining unit 262d outputs the determined GI length, modulation method, and coding rate to the upper layer processing unit 23. Note that the transmission rate determining unit 262d stores the contents shown in FIG. 21.

(Operations of Adaptive Control Unit 211D)

Figure 24:
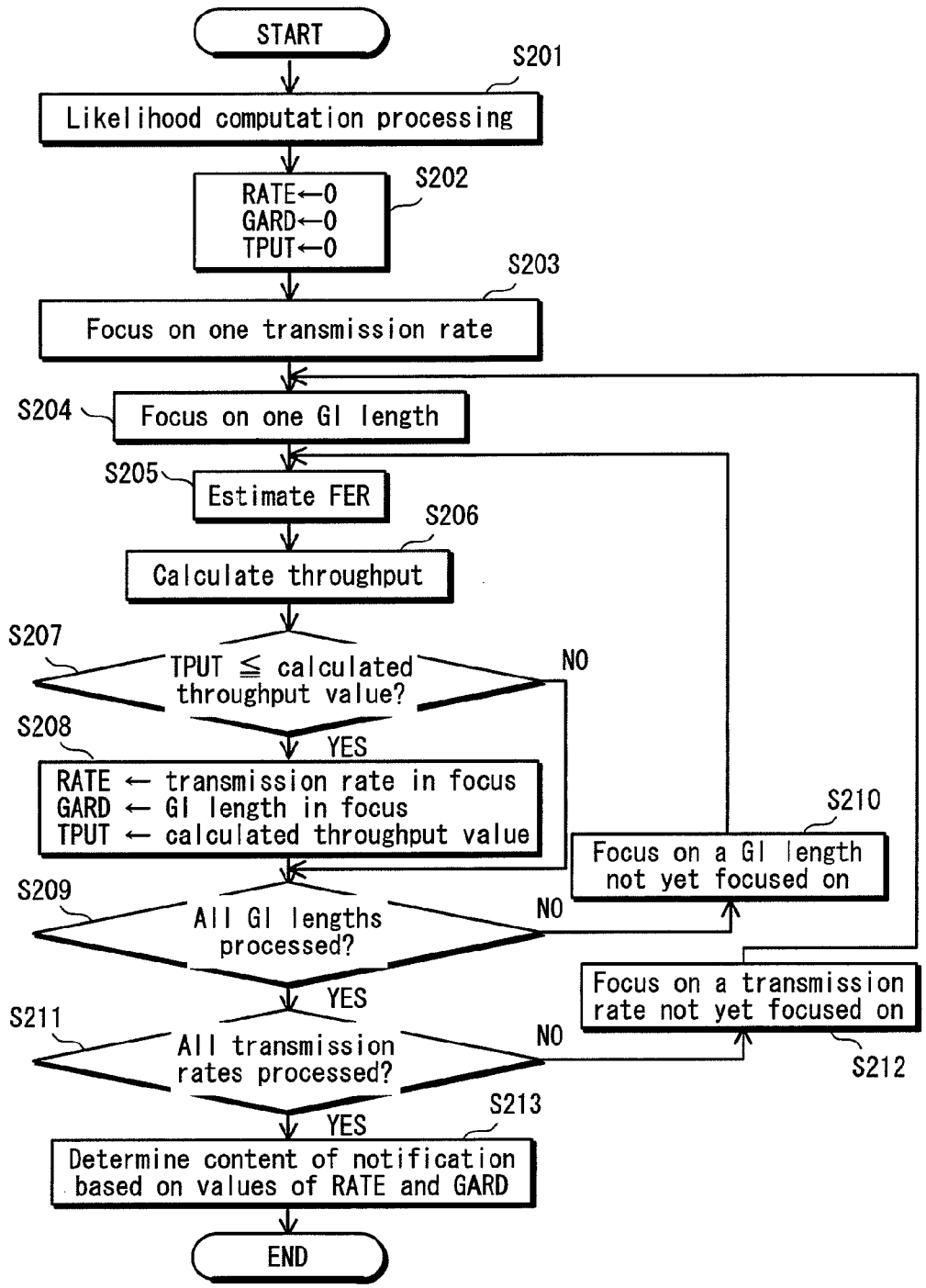
FIG. 24 is a flowchart showing the processing steps in adaptive control processing by the adaptive control unit 211$d$ in FIG. 22.

The following is an explanation of the adaptive control processing by the adaptive control unit 211d in FIG. 22 with reference to FIG. 24, which is a flowchart showing the processing steps in adaptive control processing by the adaptive control unit 211d in FIG. 22.

Based on the likelihood information input from the likelihood calculation unit 205, the likelihood computation unit 252 calculates the likelihood used by the FER estimation unit 253d for estimating the FER (step S201), and the transmission rate determining unit 262d sets the variables RATE, GARD, and TPUT all to 0 (step S202).

The FER estimation unit 253d focuses on one transmission rate (step S203) and on one GI length (step S204). For the GI length in focus at the transmission rate in focus, the FER estimation unit 253d estimates, by referring to the likelihood FER information stored in the likelihood FER information storage unit 251d, the FER for the likelihood calculated in step S201 (step S205). The throughput calculation unit 261d calculates the throughput using the estimated FER value estimated in step S205 (step S206).

The transmission rate determining unit 262d compares the calculated throughput value calculated in step S206 with the value of the variable TPUT and determines whether the calculated throughput value is equal to or greater than the variable TPUT (step S207). When the calculated throughput value is determined not to be equal to or greater than the variable TPUT (S207: NO), then the processing in step S209 is performed. Conversely, when the calculated throughput value is determined to be equal to or greater than the variable TPUT (S207: YES), then the transmission rate determining unit 262 updates the value of the variable RATE to the transmission rate in focus, updates the value of the variable GARD to the GI length in focus, and updates the value of the variable TPUT to the calculated throughput value (step S208), after which the processing in step S209 is performed.

The FER estimation unit 253d determines whether processing such as FER estimation has been performed for all of the GI lengths at the transmission rate in focus (step S209). When processing such as FER estimation has not been performed for all of the GI lengths at the transmission rate in focus (S209: NO), the FER estimation unit 253d focuses on one of the GI lengths for which FER estimation and other processing has not been performed (step S210), and processing proceeds to step S205.

Conversely, when processing such as FER estimation has been performed for all of the GI lengths at the transmission rate in focus (S209: YES), then the FER estimation unit 253d determines whether processing such as FER estimation has been performed for all of the GI lengths at all of the transmission rates (step S211). When processing such as FER estimation has not been performed for all of the GI lengths at all of the transmission rates (S211: NO), the FER estimation unit 253d focuses on one of the transmission rates for which FER estimation and other processing has not been performed (step S212), and processing proceeds to step S204. Conversely, when the FER estimation unit 253d has performed processing such as FER estimation for all of the GI lengths at all of the transmission rates (S211: YES), then processing proceeds to step S213.

The transmission rate determining unit 262d determines the GI length, modulation method, and coding rate to be notified to the transmitter 10 based on the values of the variables RATE and GARD. The transmission rate determining unit 262d then outputs the determined GI length, modulation method, and coding rate to the upper layer processing unit 23 (step S213). By having the upper layer processing unit 23 and the transmission processing unit 24 perform predetermined processing, a transmission signal that includes the GI length, the modulation method, and the coding rate output from the adaptive control unit 211d to the upper layer processing unit 23 is transmitted to the transmitter 10 via the antenna $RA_1$. For the next wireless communication to the receiver, the transmitter 10 transmits a signal in accordance with the GI length, modulation method, and coding rate of which it was notified by the receiver.

Embodiment 6

Figures 25, 26:
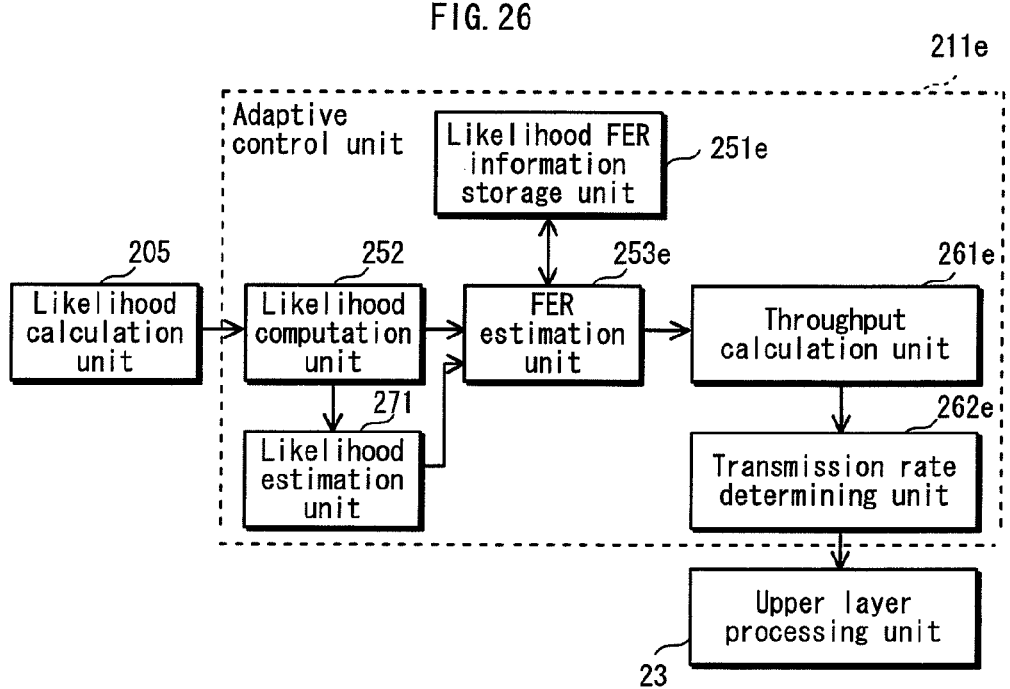
FIG. 25 shows an example of a number of transmission streams, a modulation method, and a coding rate corresponding to a transmission rate.
FIG. 26 is a block diagram of the adaptive control unit 211$e$ in the receiver in Embodiment 6.

IEEE 802.11n Draft 2.0 supports one to four transport streams. The transmission rate changes not only according to the modulation method and the coding rate, but also according to the number of transmission streams. FIG. 25 shows the number of transmission streams, modulation method, and coding rate for transmission rates with a 20 MHz bandwidth and a guard interval of 800 nanoseconds as per IEEE 802.11n Draft 2.0. This figure only shows data for one or two transmission streams, labeled "1 stream" and "2 streams" respectively.

For example, the likelihood for one-stream transmission using two transmission antennas and the likelihood for two-stream transmission using two transmission antennas can be compared as follows. One-stream transmission yields one likelihood, and two-stream transmission yield two likelihoods. The likelihood for one-stream transmission is a larger value than one of the likelihoods for two-stream transmission. This is because, in the case of one-stream transmission, the same signal is transmitted by two transmission antennas, and thus the received signal strength for one-stream transmission is twice the received signal strength for one of the transmission streams in two-stream transmission.

The following is an explanation of Embodiment 6 of the present invention, with reference to the attached drawings.

In Embodiment 4, the adaptive control unit 211*c* determined the modulation method and coding rate to be notified to the transmitter 10. In the present embodiment, on the other hand, the adaptive control unit 211*e* determines the number of transmission streams, modulation method, and coding rate to be notified to the transmitter 10. In the present embodiment, the elements of the transmission rate of which the receiver notifies the transmitter 10 are the number of transmission streams, modulation method, and coding rate, and therefore the adaptive control unit 101 in the transmitter 10 sets the coding rate in the coding unit 104, the number of transmission streams in the code separation unit 105, and the modulation method in the modulators $106_1$-$106_M$, in accordance with the notification from the receiver, setting other elements to predetermined values. Note that since the structure and operations that differ essentially from Embodiment 4 are found in the adaptive control unit 211*e*, explanation is provided for the adaptive control unit 211*e* in the present embodiment.

(Structure of Adaptive Control Unit 211*e*)

The following is an explanation of the adaptive control unit 211*e* with reference to FIG. 26, which is a block diagram of the adaptive control unit 211*e* in the present embodiment. Explanation is provided for the present embodiment with a fixed number of antennas used for transmitting signals, regardless of the number of transmission streams. Note that for structural elements in the present embodiment that are essentially the same as in Embodiment 3, the same labels have been used, and since the explanation of these elements also applies to the present embodiment, such explanation is not repeated.

The adaptive control unit 211*e* includes a likelihood FER information storage unit 251*e*, a likelihood computation unit 252, a likelihood estimation unit 271, an FER estimation unit 253*e*, a throughput calculation unit 261*e*, and a transmission rate determining unit 262*e*. In the present invention, considering how even different sets of a number of transmission streams, modulation method, and coding rate can yield the same transmission rate, the adaptive control unit 211*e* performs predetermined processing on each number of transmission streams at each transmission rate.

Figure 27:
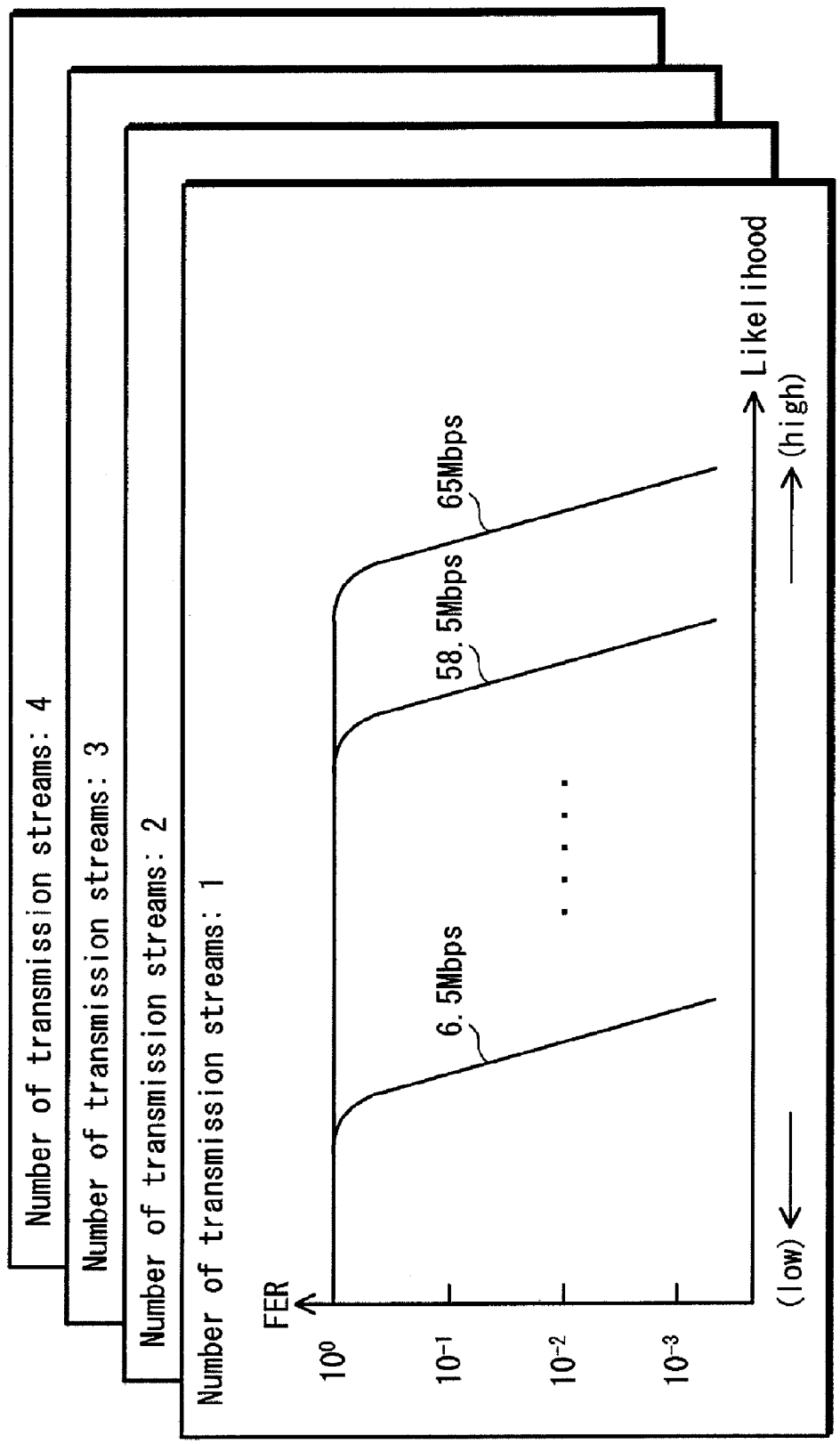
FIG. 27 shows an example of the likelihood FER information stored by the likelihood FER information storage unit 251$e$ in FIG. 26.

The likelihood FER information storage unit 251*e* stores likelihood FER information indicating the FER for the likelihood for each transmission stream at each transmission rate, as shown in the example in FIG. 27. In this figure, the horizontal axis indicates likelihood, and the vertical axis indicates FER.

Based on the likelihood input from the likelihood computation unit 252 (the likelihood for the number of transmission streams currently being used for wireless communication from the transmitter 10 to the receiver), the likelihood estimation unit 271 estimates the likelihoods, used by the FER estimation unit 253*e* for estimating the FER, for each of the other numbers of transmission streams (the numbers of transmission streams other than the number of transmission streams currently being used for wireless communication from the transmitter 10 to the receiver). The likelihood estimation unit 271 then associates the estimated likelihood with a corresponding number of transmission streams and outputs the estimated likelihood and corresponding number of transmission streams to the FER estimation unit 253*e*. Note that the number of transmission streams currently being used for wireless communication from the transmitter 10 to the receiver is included in the control information signal.

Two examples of methods by which the likelihood estimation unit 271 estimates the likelihoods for the other numbers of transmission streams are now described.

The first example is of estimation of likelihood for one-stream transmission when two-stream transmission is currently being performed by two transmission antennas. When two-stream transmission switches to one-stream transmission, it is considered that the received signal strength for the stream will double. This is because the same data stream is transmitted from two transmission antennas. In other words, the received signal strength is considered to increase by approximately $(3+\alpha)$dB. Thus, increasing the likelihood during two-stream transmission by $(3+\alpha)$dB makes it possible to estimate the likelihood during one-stream transmission. Since there are two likelihoods during two-stream transmission, the higher value, the lower value, or the mean for the two values can be used as the likelihood to which $(3+\alpha)$dB is added.

The second example is of estimation of likelihood for two-stream transmission when one-stream transmission is currently being performed by two transmission antennas. When one-stream transmission switches to two-stream transmission, it is considered that the received signal strength for the stream will halve. In other words, the received signal strength is considered to decrease by approximately $(3+\alpha)$ dB. Thus, decreasing the likelihood during one-stream transmission by $(3+\alpha)$dB makes it possible to estimate the likelihood during two-stream transmission.

Applying the above-mentioned considerations, based on the likelihood input from the likelihood computation unit 252 (the likelihood for the number of transmission streams currently being used for wireless communication from the transmitter 10 to the receiver), the likelihood estimation unit 271 estimates the likelihoods for each of the other numbers of transmission streams (the numbers of transmission streams other than the number of transmission streams currently being used for wireless communication from the transmitter 10 to the receiver).

The FER estimation unit 253*e* estimates, by referring to the likelihood FER information stored in the likelihood FER information storage unit 251*e*, the FER for the likelihood for each number of transmissions streams at each transmission rate (the likelihood being input from the likelihood computation unit 252 or from the likelihood estimation unit 271). The FER estimation unit 253*e* also associates the estimated FER value with a corresponding transmission rate and number of transmission streams and outputs the estimated FER value and corresponding transmission rate to the throughput calculation unit 261*e*.

For each number of transmission streams at each transmission rate, the throughput calculation unit 261*e* calculates the throughput from the estimated FER value input from the FER estimation unit 253*e*, associates the calculated throughput value with a corresponding transmission rate and number of transmission streams, and outputs the calculated throughput value and corresponding transmission rate and number of transmission streams to the transmission rate determining unit 262e.

The transmission rate determining unit 262e finds the highest estimated throughput value from among the estimated throughput values input from the throughput calculation unit 261e. Then, based on the transmission rate and number of transmission streams corresponding to the highest estimated throughput value, the transmission rate determining unit 262e determines the number of transmission streams, modulation method, and coding rate to be notified to the transmitter 10. Afterwards, the transmission rate determining unit 262e outputs the determined number of transmission streams, modulation method, and coding rate to the upper layer processing unit 23. Note that the transmission rate determining unit 262e stores the transmission rate corresponding to the modulation method, coding rate, and number of transmission streams (cf. FIG. 25).

(Operations of Adaptive Control Unit 211e)

Figure 28:
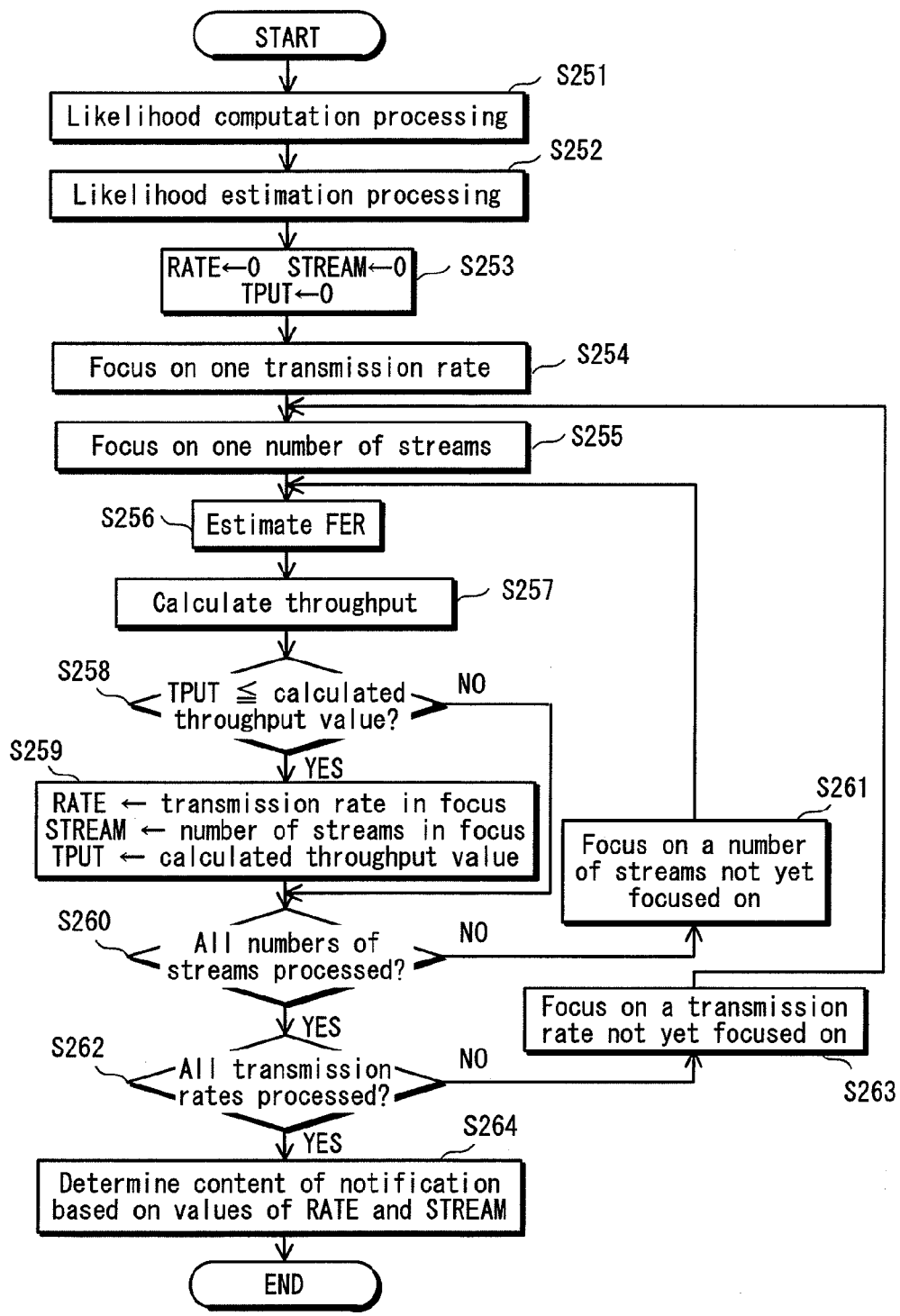
FIG. 28 is a flowchart showing the processing steps in adaptive control processing by the adaptive control unit 211$e$ in FIG. 26.

The following is an explanation of the adaptive control processing by the adaptive control unit 211e in FIG. 26 with reference to FIG. 28, which is a flowchart showing the processing steps in adaptive control processing by the adaptive control unit 211e in FIG. 26. Note that in FIG. 28, the "number of transmission streams" is simply labeled "number of streams."

Based on the likelihood information input from the likelihood calculation unit 205, the likelihood computation unit 252 calculates the likelihood, used by the FER estimation unit 253e for estimating the FER, for the number of transmission streams currently being used for wireless communication from the transmitter 10 to the receiver (step S251). Based on the likelihood calculated in step S251, the likelihood estimation unit 271 also estimates the likelihoods, used by the FER estimation unit 253e for estimating the FER, for each of the numbers of transmission streams other than the number of transmission streams currently being used for wireless communication from the transmitter 10 to the receiver (step S252). Furthermore, the transmission rate determining unit 262e sets the variables RATE, STREAM, and TPUT all to 0 (step S253).

The FER estimation unit 253e focuses on one transmission rate (step S254) and on one number of transmission streams (step S255). For the number of transmission streams in focus at the transmission rate in focus, the FER estimation unit 253e estimates the FER for the likelihood for the number of transmission streams in focus as obtained in either step S251 or step S252 by referring to the likelihood FER information stored in the likelihood FER information storage unit 251e (step S256). The throughput calculation unit 261e calculates the throughput using the estimated FER value estimated in step S256 (step S257).

The transmission rate determining unit 262e compares the calculated throughput value calculated in step S257 with the value of the variable TPUT and determines whether the calculated throughput value is equal to or greater than the variable TPUT (step S258). When the calculated throughput value is determined not to be equal to or greater than the variable TPUT (S258: NO), then the processing in step S260 is performed. Conversely, when the calculated throughput value is determined to be equal to or greater than the variable TPUT (S258: YES), then the transmission rate determining unit 262 updates the value of the variable RATE to the transmission rate in focus, updates the value of the variable STREAM to the number of transmission streams in focus, and updates the value of the variable TPUT to the calculated throughput value (step S259), after which the processing in step S260 is performed.

The FER estimation unit 253e determines whether processing such as FER estimation has been performed for all of the numbers of transmission streams at the transmission rate in focus (step S260). When processing such as FER estimation has not been performed for all of the numbers of transmission streams at the transmission rate in focus (S260: NO), the FER estimation unit 253e focuses on one of the numbers of transmission streams for which FER estimation and other processing has not been performed (step S261), and processing proceeds to step S256.

Conversely, when processing such as FER estimation has been performed for all of the numbers of transmission streams at the transmission rate in focus (S260: YES), then the FER estimation unit 253e determines whether processing such as FER estimation has been performed for all of the numbers of transmission streams at all of the transmission rates (step S262). When processing such as FER estimation has not been performed for all of the numbers of transmission streams at all of the transmission rates (S262: NO), the FER estimation unit 253e focuses on one of the transmission rates for which FER estimation and other processing has not been performed (step S263), and processing proceeds to step S255. Conversely, when the FER estimation unit 253e has performed processing such as FER estimation for all of the numbers of transmission streams at all of the transmission rates (S262: YES), then processing proceeds to step S264.

The transmission rate determining unit 262e determines the number of transmission streams, modulation method, and coding rate to be notified to the transmitter 10 based on the values of the variables RATE and STREAM. The transmission rate determining unit 262e then outputs the determined number of transmission streams, modulation method, and coding rate to the upper layer processing unit 23 (step S264). By having the upper layer processing unit 23 and the transmission processing unit 24 perform predetermined processing, a transmission signal that includes the number of transmission streams, the modulation method, and the coding rate output from the adaptive control unit 211e to the upper layer processing unit 23 is transmitted to the transmitter 10 via the antenna $RA_1$. For the next wireless communication to the receiver, the transmitter 10 transmits a signal in accordance with the number of transmission streams, modulation method, and coding rate of which it was notified by the receiver.

Embodiment 7

Figures 29, 30:
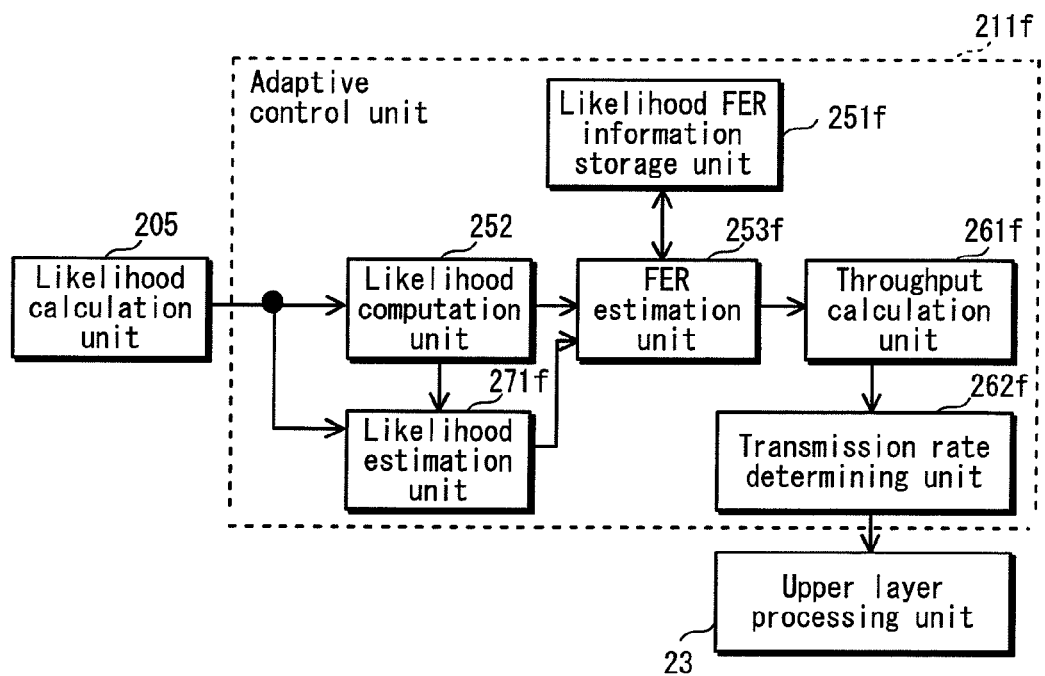
FIG. 29 shows an example of a bandwidth, modulation method, and coding rate corresponding to a transmission rate.
FIG. 30 is a block diagram of the adaptive control unit 211$f$ in the receiver in Embodiment 7.

IEEE 802.11n Draft 2.0 supports 20 MHz and 40 MHz bandwidths. The transmission rate changes not only according to the modulation method and the coding rate, but also according to the bandwidth. FIG. 29 shows the bandwidth, modulation method, and coding rate for transmission rates during two-stream transmission with a guard interval of 800 nanoseconds as per IEEE 802.11n Draft 2.0.

The following is an explanation of Embodiment 7 of the present invention, with reference to the attached drawings.

In Embodiment 4, the adaptive control unit 211c determined the modulation method and coding rate to be notified to the transmitter 10. In the present embodiment, on the other hand, the adaptive control unit 211f determines the bandwidth, modulation method, and coding rate to be notified to the transmitter 10. In the present embodiment, the elements of the transmission rate of which the receiver notifies the transmitter 10 are the bandwidth, modulation method, and coding rate, and therefore the adaptive control unit 101 in the transmitter 10 sets the coding rate in the coding unit 104, the modulation method in the modulators $106_1$-$106_M$, and the bandwidth in the IFFT units $108_1$-$108_M$, in accordance with the notification from the receiver, setting other elements to predetermined values. Note that since the structure and operations that differ essentially from Embodiment 4 are found in the adaptive control unit 211f, explanation is provided for the adaptive control unit 211f in the present embodiment.

(Structure of Adaptive Control Unit 211F)

The following is an explanation of the adaptive control unit 211f with reference to FIG. 30, which is a block diagram of the adaptive control unit 211f in the present embodiment. Note that for structural elements in the present embodiment that are essentially the same as in Embodiment 3, the same labels have been used, and since the explanation of these elements also applies to the present embodiment, such explanation is not repeated.

The adaptive control unit 211f includes a likelihood FER information storage unit 251f, a likelihood computation unit 252, a likelihood estimation unit 271f, an FER estimation unit 253f, a throughput calculation unit 261f, and a transmission rate determining unit 262f. In the present invention, considering how even different sets of bandwidth, modulation method, and coding rate can yield the same transmission rate, the adaptive control unit 211f performs predetermined processing on each bandwidth at each transmission rate.

Figure 31:
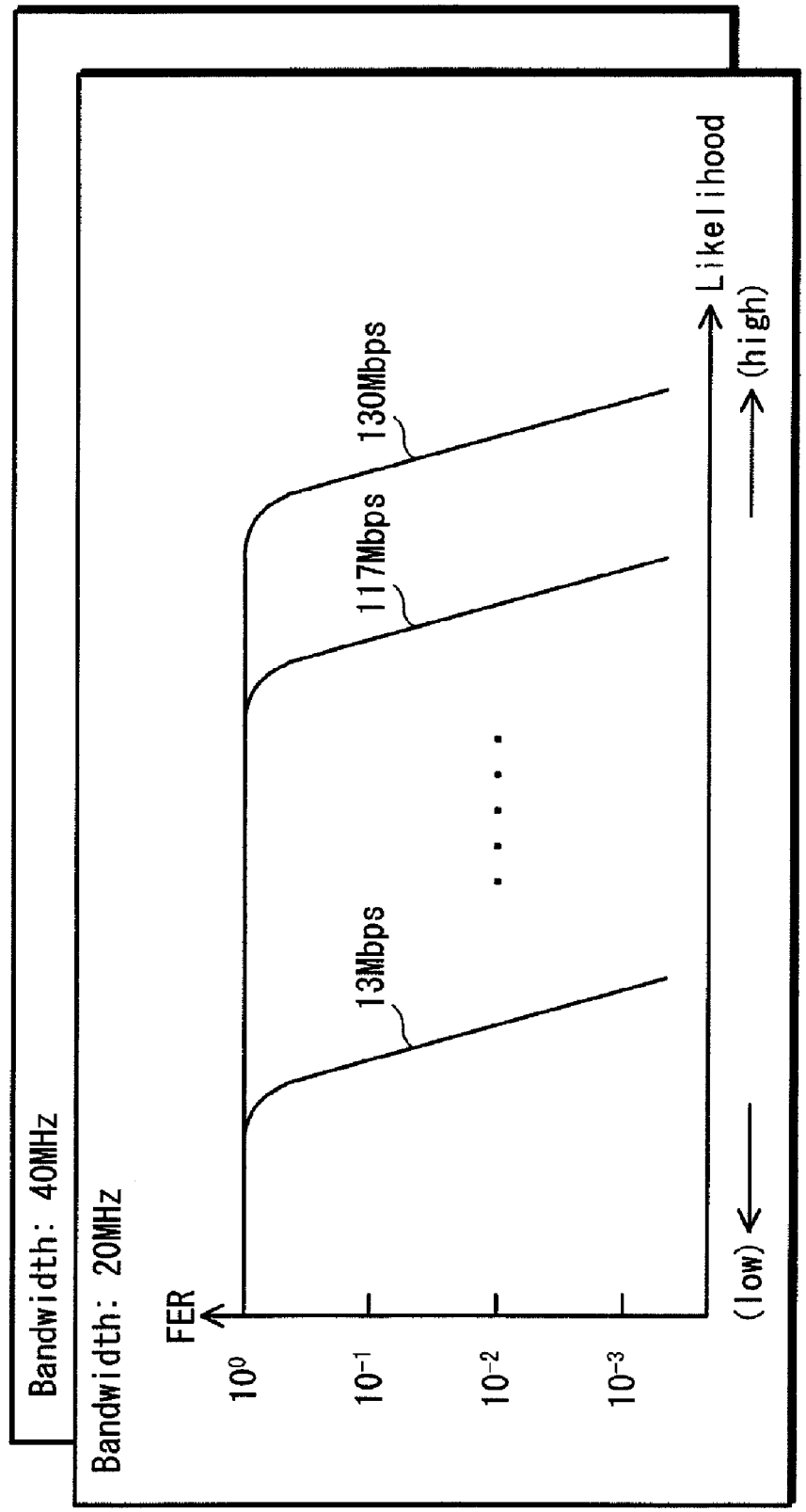
FIG. 31 shows an example of the likelihood FER information stored by the likelihood FER information storage unit 251$f$ in FIG. 30.

The likelihood FER information storage unit 251f stores likelihood FER information indicating the FER for the likelihood for each bandwidth at each transmission rate, as shown in the example in FIG. 31. In this figure, the horizontal axis indicates likelihood, and the vertical axis indicates FER.

Based on the likelihood information input from the likelihood calculation unit 205, the likelihood estimation unit 271f estimates the likelihoods, used by the FER estimation unit 253f for estimating the FER, for each of the other bandwidths with a smaller value than the bandwidth currently being used for wireless communication from the transmitter 10 to the receiver. The likelihood estimation unit 271f then associates the estimated likelihood with a corresponding bandwidth and outputs the estimated likelihood and corresponding bandwidth to the FER estimation unit 253f.

The following is an explanation of the method by which the likelihood estimation unit 271f estimates the likelihoods for the other bandwidths.

The likelihood estimation unit 271f adds up, for each transmission stream, the likelihoods for each of the carriers in the other bandwidths associated with the transmission stream, the likelihoods being included in the likelihood information input from the likelihood calculation unit 205. The likelihood estimation unit 271f then divides each of the resulting sums by the number of carriers in the other bandwidths, adds up the values for each transmission stream resulting from this division, and divides this newly obtained value by the number of transmission streams, setting the end product as the likelihood used by the FER estimation unit 253 to estimate the FER for the other bandwidths.

For example, suppose the bandwidths are 20 MHz and 40 MHz, and that the 40 MHz bandwidth channel is composed of two adjacent 20 MHz band channels. In this case, when the bandwidth currently being used for wireless communication from the transmitter 10 to the receiver is 40 MHz, and the likelihood estimation unit 271f estimates the likelihood for the 20 MHz bandwidth, then the likelihood estimation unit 271f estimates the likelihood for the 20 MHz bandwidth using, for example, a carrier included in the 20 MHz band that has the lower frequency in the 40 MHz band.

The FER estimation unit 253f estimates, by referring to the likelihood FER information stored in the likelihood FER information storage unit 251f, the FER for the likelihood for each bandwidth at each transmission rate (the likelihood being input from the likelihood computation unit 252 or from the likelihood estimation unit 271f). The FER estimation unit 253f also associates the estimated FER value with a corresponding transmission rate and bandwidth and outputs the estimated FER value and corresponding transmission rate and bandwidth to the throughput calculation unit 261f. The bandwidths for which the FER estimation unit 253f estimates the FER are the bandwidths equal to or lower than the bandwidth currently being used for wireless communication from the transmitter 10 to the receiver.

For each bandwidth at each transmission rate, the throughput calculation unit 261f calculates the throughput from the estimated FER value input from the FER estimation unit 253f, associates the calculated throughput value with a corresponding transmission rate and bandwidth, and outputs the calculated throughput value and corresponding transmission rate and bandwidth to the transmission rate determining unit 262f. The bandwidths for which the throughput calculation unit 261f calculates the throughput are the bandwidths equal to or lower than the bandwidth currently being used for wireless communication from the transmitter 10 to the receiver.

The transmission rate determining unit 262f finds the highest estimated throughput value from among the estimated throughput values input from the throughput calculation unit 261f. Then, based on the transmission rate and bandwidth corresponding to the highest estimated throughput value, the transmission rate determining unit 262f determines the bandwidth, modulation method, and coding rate to be notified to the transmitter 10. Afterwards, the transmission rate determining unit 262f outputs the determined bandwidth, modulation method, and coding rate to the upper layer processing unit 23. Note that the transmission rate determining unit 262f stores the contents shown in FIG. 29.

(Operations of Adaptive Control Unit 211f)

Figure 32:
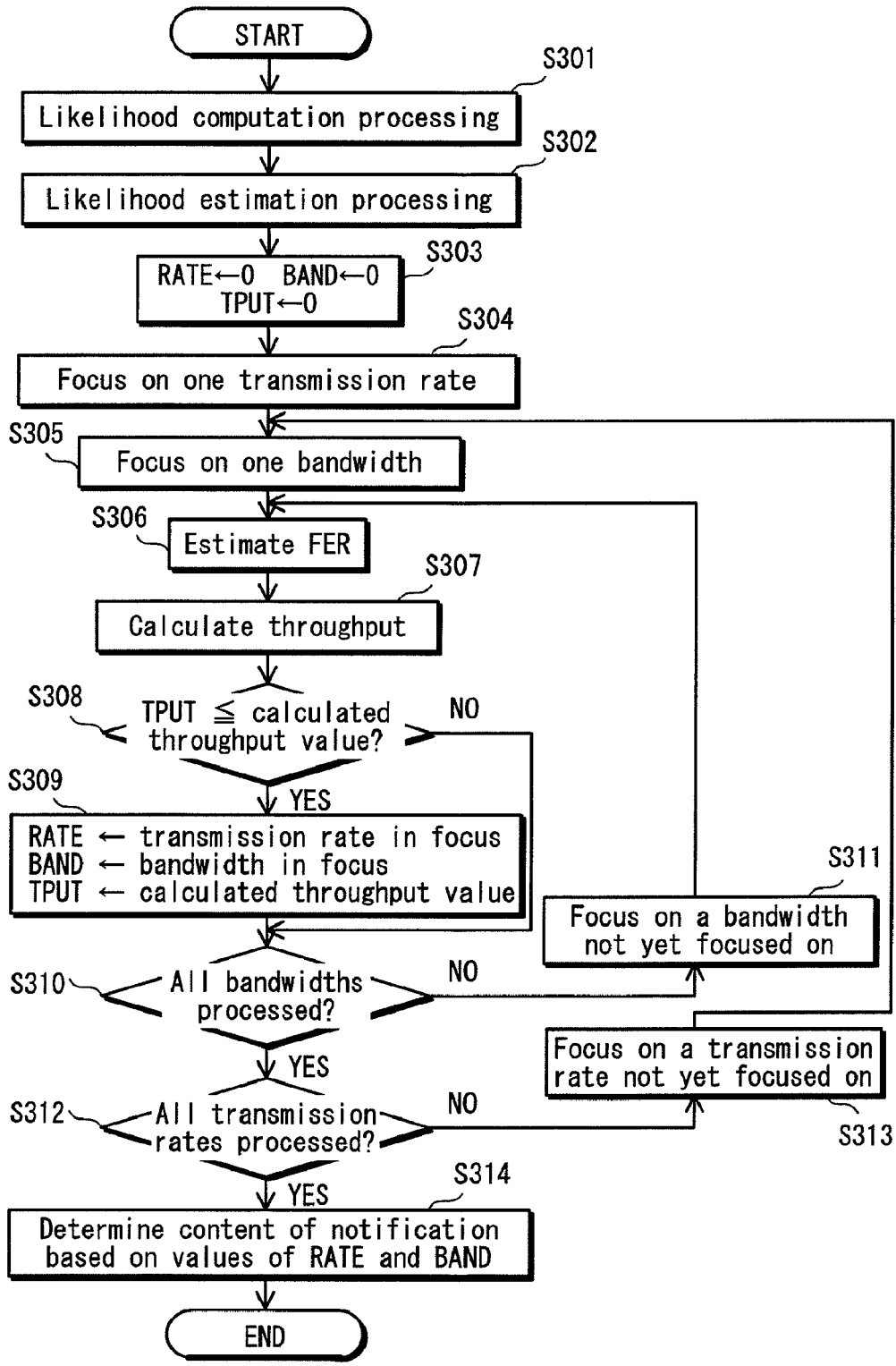
FIG. 32 is a flowchart showing the processing steps in adaptive control processing by the adaptive control unit 211$f$ in FIG. 30.

The following is an explanation of the adaptive control processing by the adaptive control unit 211f in FIG. 30 with reference to FIG. 32, which is a flowchart showing the processing steps in adaptive control processing by the adaptive control unit 211f in FIG. 30. Given, however, that the adaptive control unit 211f only determines the transmission rate for bandwidths equal to or lower than the bandwidth currently being used for wireless communication from the transmitter 10 to the receiver, the term "all bandwidths" in the flowchart in FIG. 32 as well as in the explanation thereof is used to mean "all of the bandwidths equal to or lower than the bandwidth currently being used for wireless communication from the transmitter 10 to the receiver."

Based on the likelihood information input from the likelihood calculation unit 205, the likelihood computation unit 252 calculates the likelihood, used by the FER estimation unit 253f for estimating the FER, for the bandwidth currently being used for wireless communication from the transmitter 10 to the receiver (step S301). Based on the likelihood information input from the likelihood calculation unit 205, the likelihood estimation unit 271f also estimates the likelihoods, used by the FER estimation unit 253f for estimating the FER, for each of the bandwidths with a smaller value than the bandwidth currently being used for wireless communication from the transmitter 10 to the receiver (step S302). Furthermore, the transmission rate determining unit 262f sets the variables RATE, BAND, and TPUT all to 0 (step S303).

The FER estimation unit 253f focuses on one transmission rate (step S304) and on one bandwidth (step S305). For the bandwidth in focus at the transmission rate in focus, the FER estimation unit 253f estimates the FER for the likelihood for the bandwidth in focus as estimated in either step S301 or step S302 by referring to the likelihood FER information stored in the likelihood FER information storage unit 251f (step S306). The throughput calculation unit 261f calculates the throughput using the estimated FER value estimated in step S306 (step S307).

The transmission rate determining unit 262f compares the calculated throughput value calculated in step S307 with the value of the variable TPUT and determines whether the calculated throughput value is equal to or greater than the variable TPUT (step S308). When the calculated throughput value is determined not to be equal to or greater than the variable TPUT (S308: NO), then the processing in step S310 is performed. Conversely, when the calculated throughput value is determined to be equal to or greater than the variable TPUT (S308: YES), then the transmission rate determining unit 262 updates the value of the variable RATE to the transmission rate in focus, updates the value of the variable BAND to the bandwidth in focus, and updates the value of the variable TPUT to the calculated throughput value (step S309), after which the processing in step S310 is performed.

The FER estimation unit 253f determines whether processing such as FER estimation has been performed for all of the bandwidths at the transmission rate in focus (step S310). When processing such as FER estimation has not been performed for all of the bandwidths at the transmission rate in focus (S310: NO), the FER estimation unit 253f focuses on one of the bandwidths for which FER estimation and other processing has not been performed (step S311), and processing proceeds to step S306.

Conversely, when processing such as FER estimation has been performed for all of the bandwidths at the transmission rate in focus (S310: YES), then the FER estimation unit 253f determines whether processing such as FER estimation has been performed for all of the bandwidths at all of the transmission rates (step S312). When processing such as FER estimation has not been performed for all of the bandwidths at all of the transmission rates (S312: NO), the FER estimation unit 253f focuses on one of the transmission rates for which FER estimation and other processing has not been performed (step S313), and processing proceeds to step S305. Conversely, when the FER estimation unit 253f has performed processing such as FER estimation for all of the bandwidths at all of the transmission rates (S312: YES), then processing proceeds to step S314.

The transmission rate determining unit 262f determines the bandwidth, modulation method, and coding rate to be notified to the transmitter 10 based on the values of the variables RATE and BAND. The transmission rate determining unit 262f then outputs the determined bandwidth, modulation method, and coding rate to the upper layer processing unit 23 (step S314). By having the upper layer processing unit 23 and the transmission processing unit 24 perform predetermined processing, a transmission signal that includes the bandwidth, the modulation method, and the coding rate output from the adaptive control unit 211f to the upper layer processing unit 23 is transmitted to the transmitter 10 via the antenna $RA_1$. For the next wireless communication to the receiver, the transmitter 10 transmits a signal in accordance with the bandwidth, modulation method, and coding rate of which it was notified by the receiver.

Embodiment 8

IEEE 802.11n Draft 2.0 supports the two types of frame aggregation functions shown in FIGS. 33A and 33B. FIG. 33A shows the frame structure of an A-MSDU (Aggregation MAC Service Data Unit), and FIG. 33B shows the frame structure of an A-MPDU (Aggregation MAC Protocol Data Unit). The frames shown in FIGS. 33A and 33B meet set standards, and their contents are known; therefore, details are omitted.

In wireless transmission using A-MSDUs, when the channel state is good, frame aggregation transmission yields a higher throughput than transmitting frames one at a time. This is because it is possible to cut out lengthy sections such as the preamble or header necessary for each frame. When the channel state is poor, however, frame aggregation transmission yields a lower throughput than transmitting frames one at a time. This is because frame aggregation creates longer frames, and thus when a frame error occurs, retransmission lowers the efficiency of utilization of the wireless bandwidth.

FIG. 34 shows the throughput in the MAC layer level (labeled "MAC throughput" in the figure), when each frame is 1,500 bytes, corresponding to a combination of a transmission rate for the A-MPDU (modulation method and coding rate) and a frame aggregation number. The data pertain to two-stream transmission over a 20 MHz bandwidth with a guard interval length of 800 nanoseconds under IEEE802.11n Draft 2.0. Note that in FIGS. 34, 36, and 37, the "Frame aggregation number" is simply labeled "Aggregation number."

As indicated in FIG. 34, the throughput in the MAC layer level depends not only on the transmission rate (modulation method and coding rate) but also on the frame aggregation number.

The following is an explanation of Embodiment 8 of the present invention, with reference to the attached drawings.

In Embodiment 4, the adaptive control unit 211c determined the modulation method and coding rate to be notified to the transmitter 10. In the present embodiment, on the other hand, the adaptive control unit 211g determines the frame aggregation number, modulation method, and coding rate to be notified to the transmitter 10. Note that likelihood does not depend on the frame aggregation number, modulation method, or coding rate. In the present embodiment, in addition to the modulation method and coding rate, which are elements of the transmission rate, the frame aggregation number is also notified to the transmitter 10 by the receiver, and therefore the adaptive control unit 101 in the transmitter 10 sets the coding rate in the coding unit 104, the frame aggregation number in the MAC header adding unit 102, and the modulation method in the modulators $106_1$-$106_M$, in accordance with the notification from the receiver, setting other elements to predetermined values. Note that since the structure and operations that differ essentially from Embodiment 4 are found in the adaptive control unit 211g, explanation is provided for the adaptive control unit 211g in the present embodiment.

(Structure of Adaptive Control Unit 211G)

Figure 35:
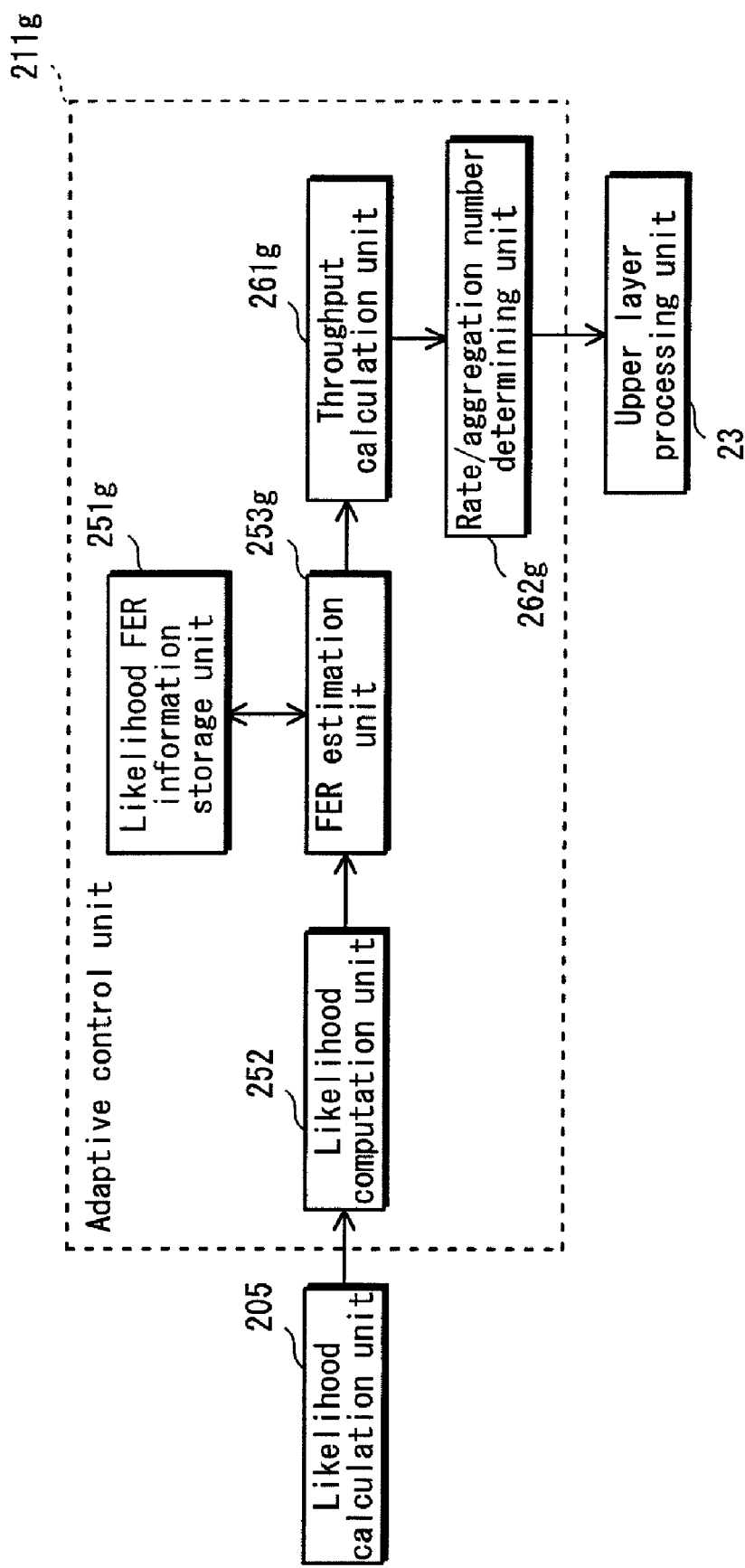
FIG. 35 is a block diagram of the adaptive control unit 211$g$ in the receiver in Embodiment 8.

The following is an explanation of the adaptive control unit 211g with reference to FIG. 35, which is a block diagram of the adaptive control unit 211g in the present embodiment. Note that for structural elements in the present embodiment that are essentially the same as in Embodiment 3, the same labels have been used, and since the explanation of these elements also applies to the present embodiment, such explanation is not repeated.

The adaptive control unit 211g includes a likelihood FER information storage unit 251g, a likelihood computation unit 252, an FER estimation unit 253g, a throughput calculation unit 261g, and a rate/aggregation number determining unit 262g.

Figure 36:
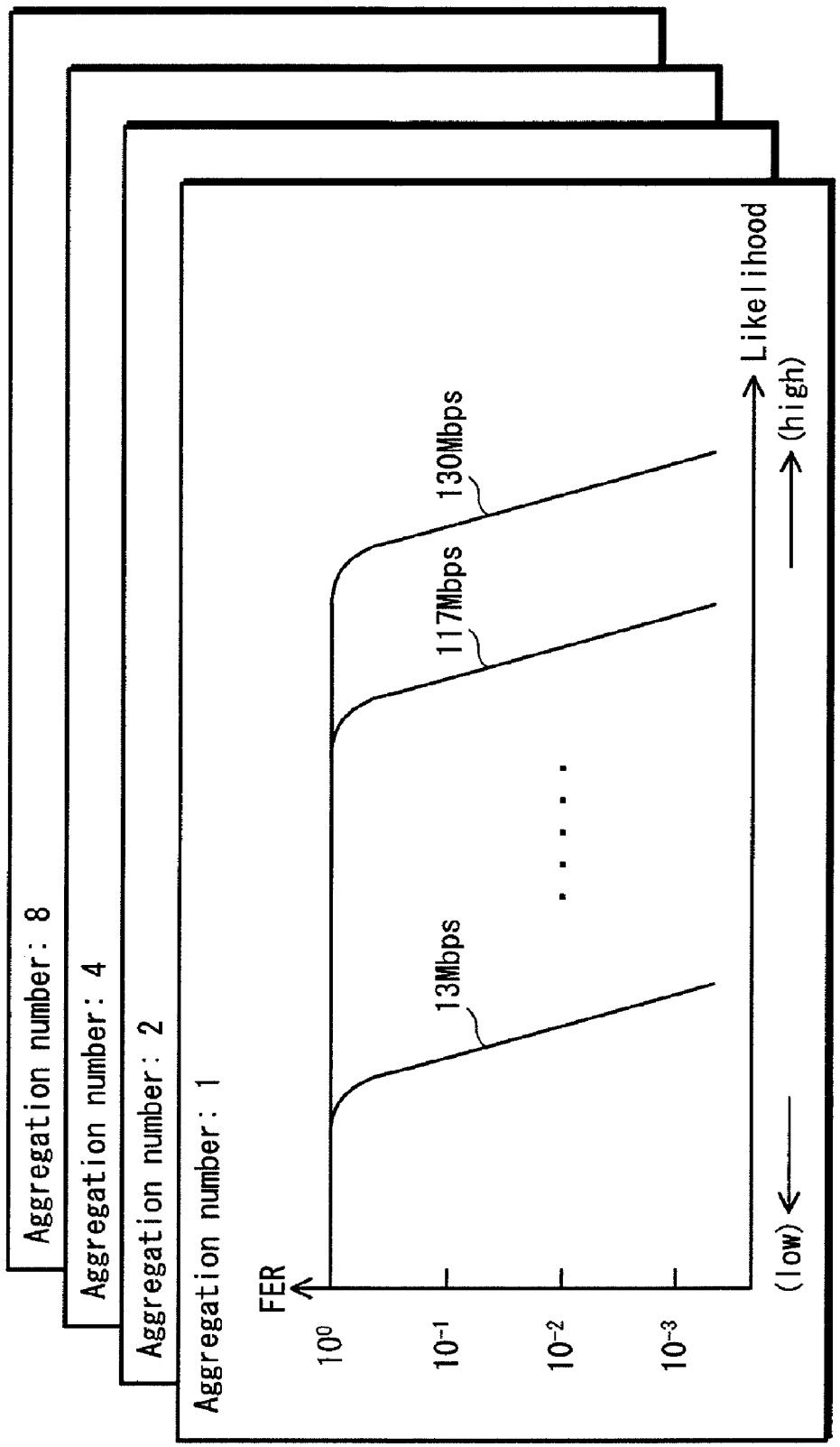
FIG. 36 shows an example of the likelihood FER information stored by the likelihood FER information storage unit 251$g$ in FIG. 35.

The likelihood FER information storage unit 251g stores likelihood FER information indicating the FER for the likelihood for each frame aggregation number at each transmission rate, as shown in the example in FIG. 36. In this figure, the horizontal axis indicates likelihood, and the vertical axis indicates FER.

The FER estimation unit 253g estimates, by referring to the likelihood FER information stored in the likelihood FER information storage unit 251g, the FER for the likelihood input from the likelihood computation unit 252 for each frame aggregation number at each transmission rate. The FER estimation unit 253g also associates the estimated FER value with a corresponding transmission rate and frame aggregation number and outputs the estimated FER value and corresponding transmission rate and frame aggregation number to the throughput calculation unit 261g.

For each frame aggregation number at each transmission rate, the throughput calculation unit 261g calculates the throughput from the estimated FER value input from the FER estimation unit 253g, associates the calculated throughput value with a corresponding transmission rate and frame aggregation number, and outputs the calculated throughput value and corresponding transmission rate and frame aggregation number to the rate/aggregation number determining unit 262g.

The rate/aggregation number determining unit 262g finds the highest estimated throughput value from among the estimated throughput values input from the throughput calculation unit 261g. Then, based on the transmission rate and frame aggregation number corresponding to the highest estimated throughput value, the rate/aggregation number determining unit 262g determines the frame aggregation number, modulation method, and coding rate to be notified to the transmitter 10. Afterwards, the rate/aggregation number determining unit 262g outputs the determined frame aggregation number, modulation method, and coding rate to the upper layer processing unit 23. Note that the rate/aggregation number determining unit 262g stores the contents shown in FIG. 15.

(Operations of Adaptive Control Unit 211G)

Figure 37:
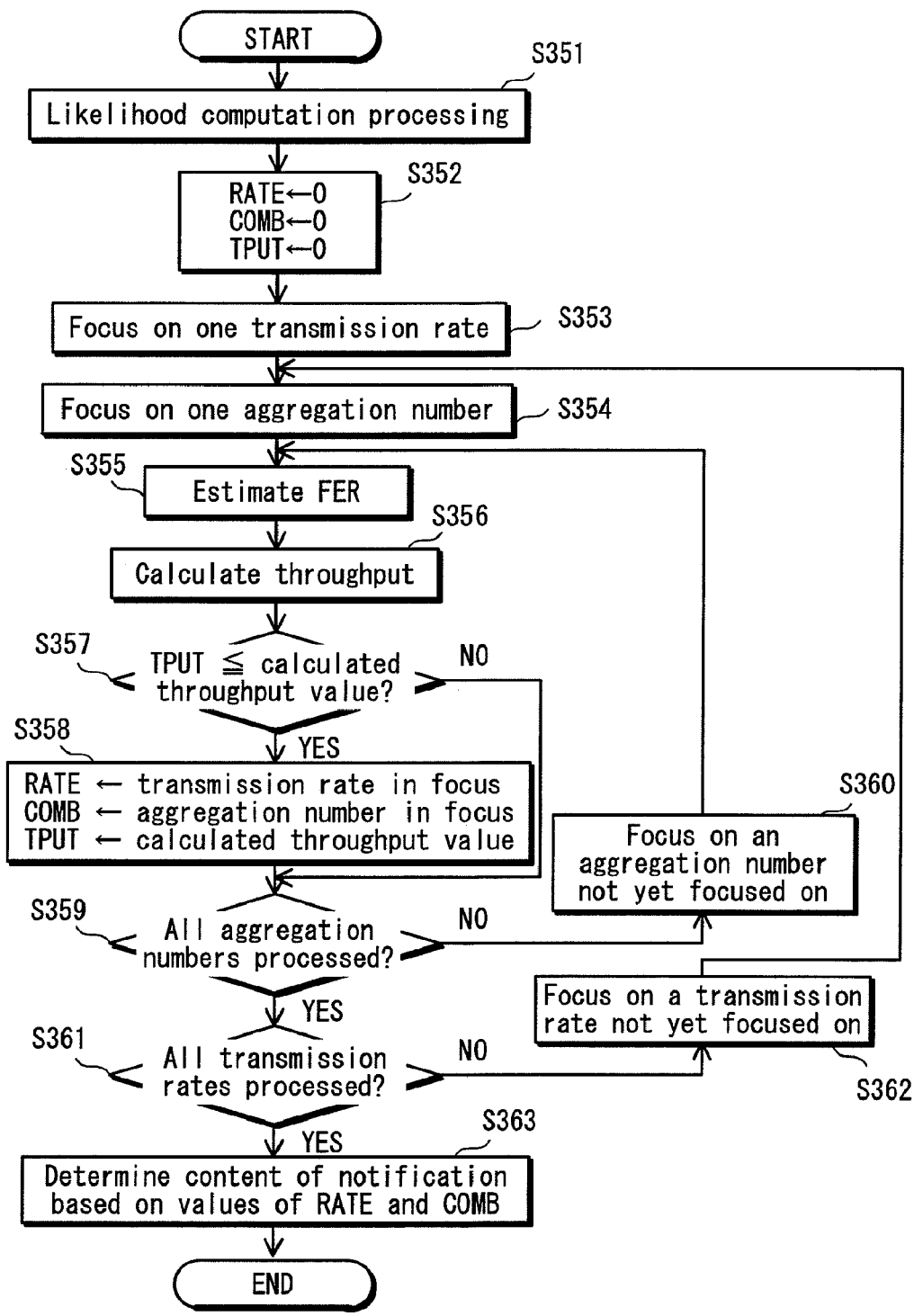
FIG. 37 is a flowchart showing the processing steps in adaptive control processing by the adaptive control unit 211$g$ in FIG. 35.

The following is an explanation of the adaptive control processing by the adaptive control unit 211g in FIG. 35 with reference to FIG. 37, which is a flowchart showing the processing steps in adaptive control processing by the adaptive control unit 211g in FIG. 35.

Based on the likelihood information input from the likelihood calculation unit 205, the likelihood computation unit 252 calculates the likelihood used by the FER estimation unit 253g for estimating the FER (step S351). The rate/aggregation number determining unit 262g sets the variables RATE, COMB, and TPUT all to 0 (step S352).

The FER estimation unit 253g focuses on one transmission rate (step S353) and on one frame aggregation number (step S354). For the frame aggregation number in focus at the transmission rate in focus, the FER estimation unit 253g estimates the FER for the likelihood calculated in step S351 by referring to the likelihood FER information stored in the likelihood FER information storage unit 251g (step S355). The throughput calculation unit 261g calculates the throughput using the estimated FER value estimated in step S355 (step S356).

The rate/aggregation number determining unit 262g compares the calculated throughput value calculated in step S356 with the value of the variable TPUT and determines whether the calculated throughput value is equal to or greater than the variable TPUT (step S357). When the calculated throughput value is determined not to be equal to or greater than the variable TPUT (S357: NO), then the processing in step S359 is performed. Conversely, when the calculated throughput value is determined to be equal to or greater than the variable TPUT (S357: YES), then the rate/aggregation number determining unit 262g updates the value of the variable RATE to the transmission rate in focus, updates the value of the variable COMB to the frame aggregation number in focus, and updates the value of the variable TPUT to the calculated throughput value (step S358), after which the processing in step S359 is performed.

The FER estimation unit 253g determines whether processing such as FER estimation has been performed for all of the frame aggregation numbers at the transmission rate in focus (step S359). When processing such as FER estimation has not been performed for all of the frame aggregation numbers at the transmission rate in focus (S359: NO), the FER estimation unit 253g focuses on one of the frame aggregation numbers for which FER estimation and other processing has not been performed (step S360), and processing proceeds to step S355.

Conversely, when processing such as FER estimation has been performed for all of the frame aggregation numbers at the transmission rate in focus (S359: YES), then the FER estimation unit 253g determines whether processing such as FER estimation has been performed for all of the frame aggregation numbers at all of the transmission rates (step S361). When processing such as FER estimation has not been performed for all of the frame aggregation numbers at all of the transmission rates (S361: NO), the FER estimation unit 253g focuses on one of the transmission rates for which FER estimation and other processing has not been performed (step S362), and processing proceeds to step S354. Conversely, when the FER estimation unit 253g has performed processing such as FER estimation for all of the frame aggregation numbers at all of the transmission rates (S361: YES), then processing proceeds to step S363.

The rate/aggregation number determining unit 262g determines the frame aggregation number, modulation method, and coding rate to be notified to the transmitter 10 based on the values of the variables RATE and COMB. The rate/aggregation number determining unit 262g then outputs the determined frame aggregation number, modulation method, and coding rate to the upper layer processing unit 23 (step S363). By having the upper layer processing unit 23 and the transmission processing unit 24 perform predetermined processing, a transmission signal that includes the frame aggregation number, the modulation method, and the coding rate output from the adaptive control unit 211g to the upper layer processing unit 23 is transmitted to the transmitter 10 via the antenna $RA_1$. For the next wireless communication to the receiver, the transmitter 10 transmits a signal in accordance with the frame aggregation number, modulation method, and coding rate of which it was notified by the receiver.

Figure 38:
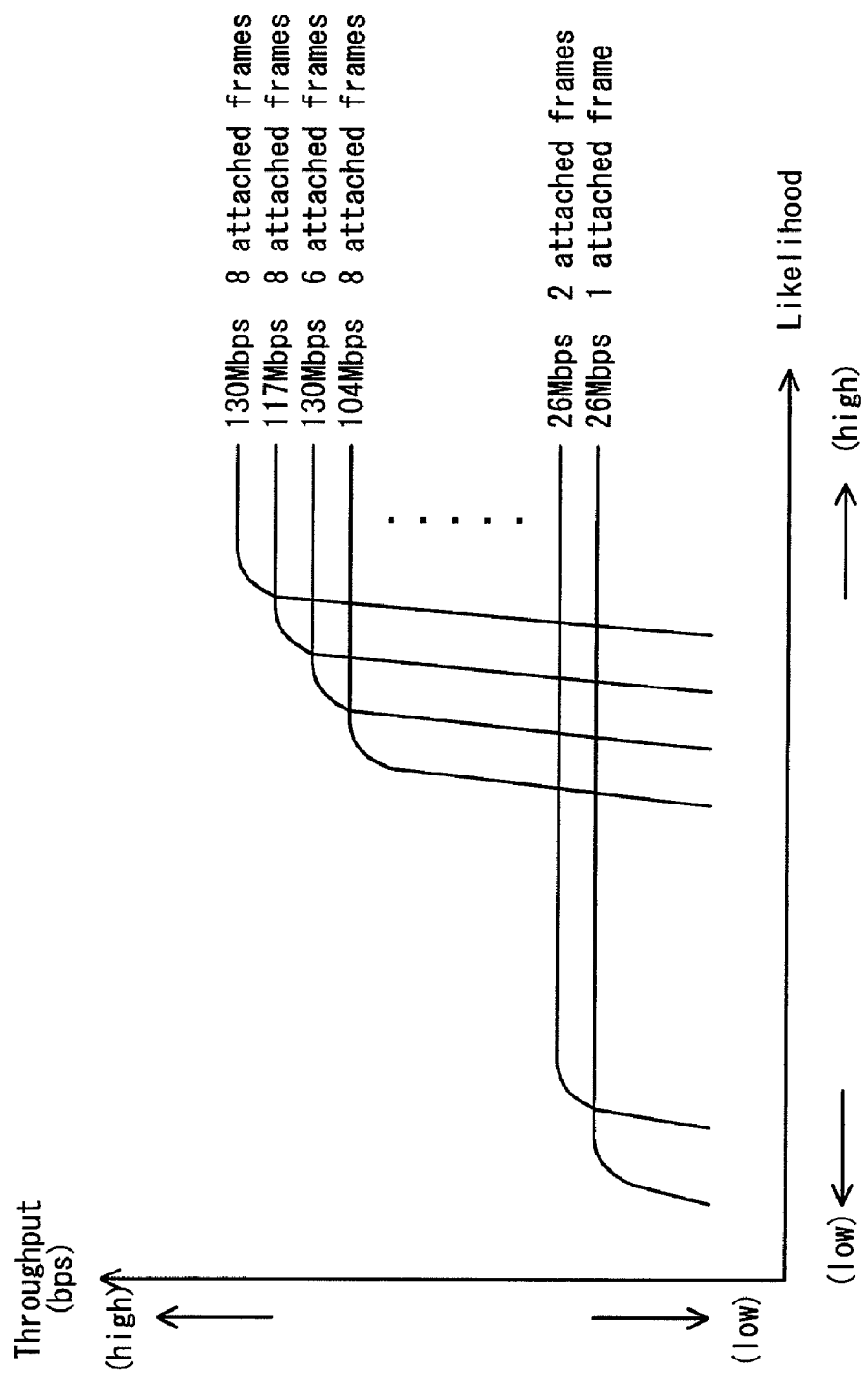
FIG. 38 shows an example of the relationship between likelihood and throughput in Embodiment 8.

FIG. 38 shows the relationship between likelihood (corresponding to the likelihood calculated in step S351) and throughput in the MAC layer level (corresponding to the throughput calculated in step S356). In FIG. 38, the horizontal axis indicates likelihood, and the vertical axis indicates throughput in the MAC layer level. As is clear from FIG. 38, the transmission rate and frame aggregation number yielding the greatest throughput vary depending on the likelihood value. In the above-described adaptive control unit 211g, the transmission rate and frame aggregation number yielding the maximum throughput are chosen as the transmission rate and frame aggregation number to be notified to the transmitter 10.

Embodiment 9

The following is an explanation of Embodiment 9 of the present invention, with reference to the attached drawings.

In Embodiment 4, the adaptive control unit 211c only used the FER estimated from likelihood when determining the transmission rate. In the present embodiment, on the other hand, the adaptive control unit 211h uses both the FER estimated from likelihood and the FER estimated from received signal strength when selecting the transmission rate. In the present embodiment, the elements of the transmission rate of which the receiver 20h notifies the transmitter 10 are the modulation method and coding rate, and therefore the adaptive control unit 101 in the transmitter 10 sets the coding rate in the coding unit 104 and the modulation method in the modulators $106_1$-$106_M$ in accordance with the notification from the receiver 20h, setting other elements to predetermined values. Note that since the structure and operations that differ essentially from Embodiment 4 are found in the receiver 20h, explanation is provided for the receiver 20h in the present embodiment.

<Receiver 20h>

Figure 39:
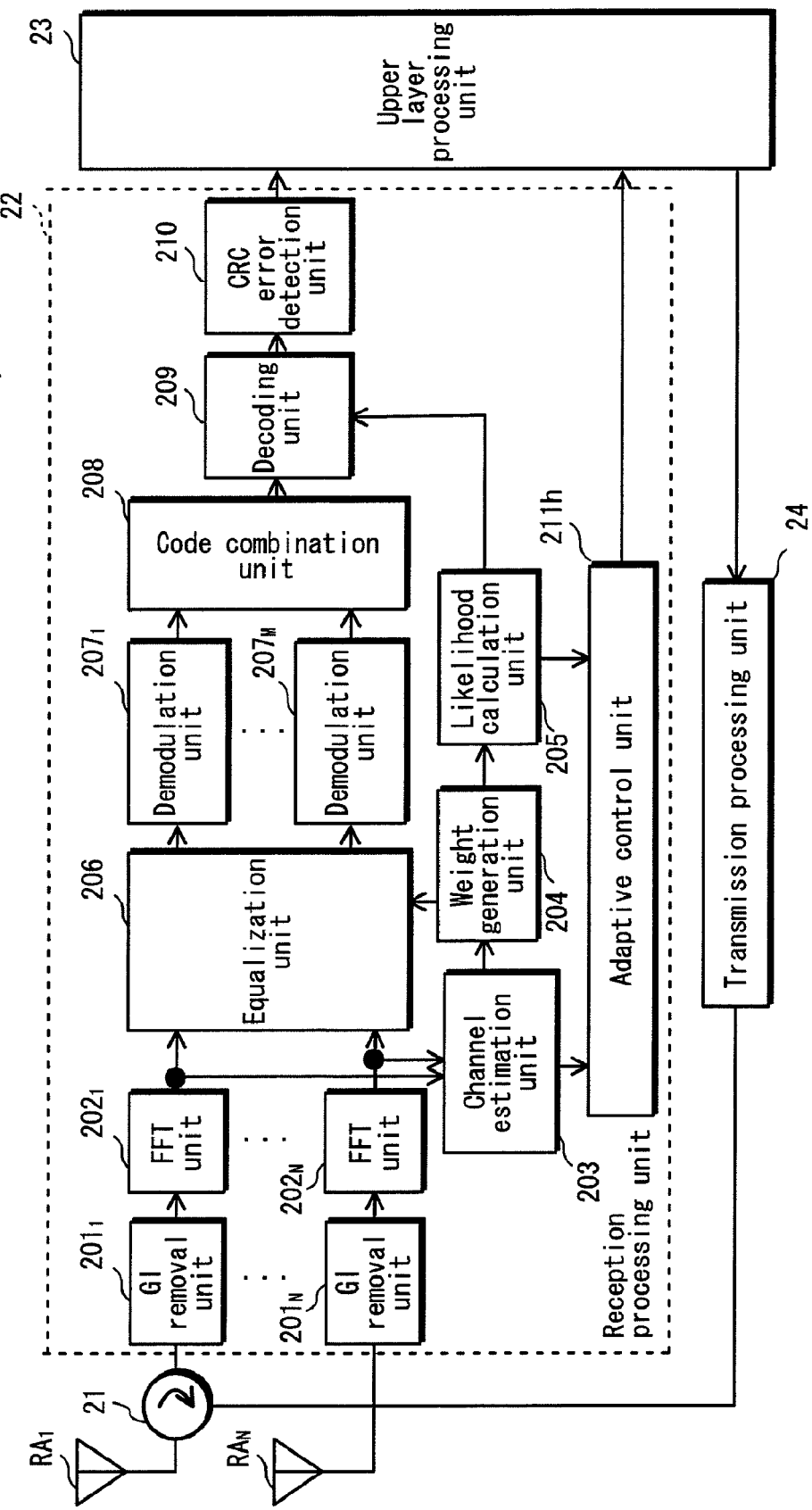
FIG. 39 is a configuration diagram of the receiver 20h in Embodiment 9.

The following is an explanation of the receiver 20h in the present embodiment with reference to FIG. 39, which is a configuration diagram of the receiver 20h in the present embodiment. Note that for structural elements in the present embodiment that are essentially the same as in Embodiment 1, the same labels have been used, and since the explanation of these elements also applies to the present embodiment, such explanation is not repeated.

Instead of the adaptive control unit 211b in the receiver 20b in Embodiment 3, the receiver 20h contains an adaptive control unit 211h. The channel estimation unit 203 outputs the channel matrix H not only to the weight generation unit 204, but also to the adaptive control unit 211h.

(Structure of Adaptive Control Unit 211h)

Figure 40:
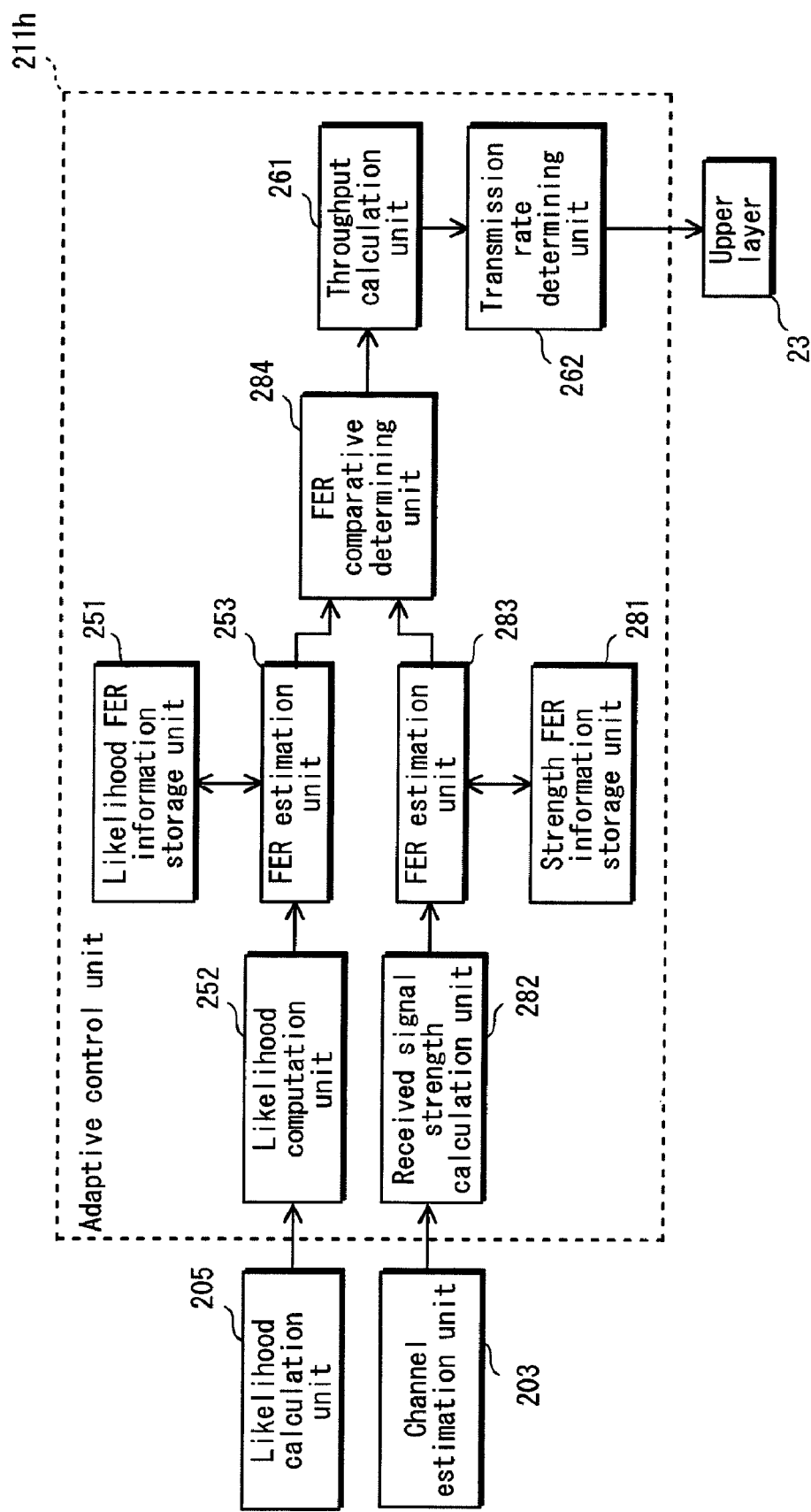
FIG. 40 is a block diagram of the adaptive control unit 211h in FIG. 39.

The following is an explanation of the adaptive control unit 211h in FIG. 39 with reference to FIG. 40, which is a block diagram of the adaptive control unit 211h in FIG. 39. Note that for structural elements in the present embodiment that are essentially the same as in Embodiments 3 and 4, the same labels have been used, and since the explanation of these elements also applies to the present embodiment, such explanation is not repeated.

The adaptive control unit 211h includes a likelihood FER information storage unit 251, a likelihood computation unit 252, an FER estimation unit 253, a strength FER information storage unit 281, a received signal strength calculation unit 282, an FER estimation unit 283, an FER comparative determining unit 284, a throughput calculation unit 261, and a transmission rate determining unit 262. In the present embodiment, instead of outputting the estimated FER value to the throughput calculation unit 261, the FER estimation unit 253 outputs this value to the FER comparative determining unit 284. Furthermore, in calculating the throughput for each transmission stream, the throughput calculation unit 261 uses the estimated FER value input from the FER comparative determining unit 284 instead of using the estimated FER value input from the FER estimation unit 253.

Figure 41:
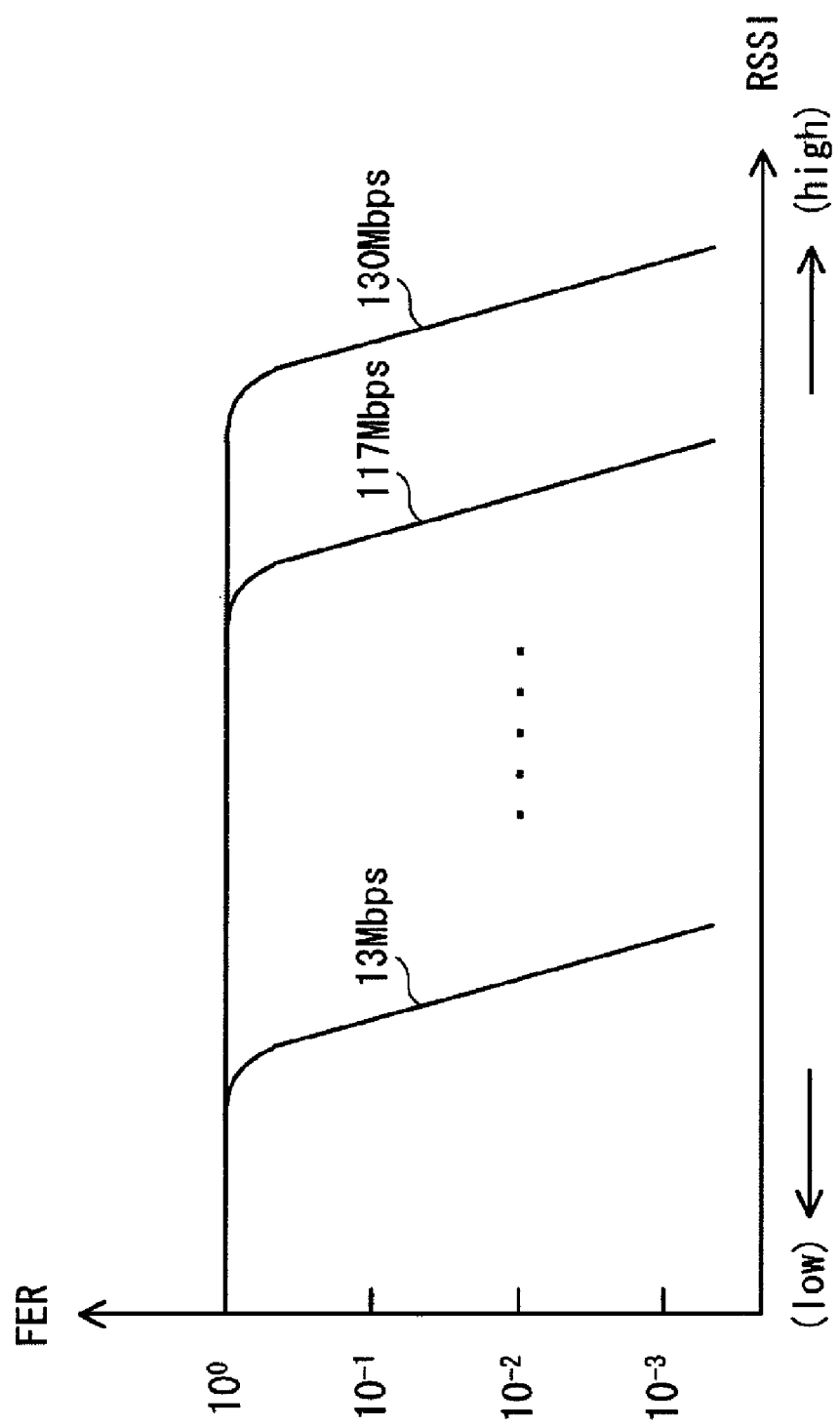
FIG. 41 shows an example of the strength FER information stored by the strength FER information storage unit 281 in FIG. 40.

The strength FER information storage unit 281 stores strength FER information indicating the FER for the Received Signal Strength Indicator (RSSI) for each transmission rate, as shown in the example in FIG. 41. In this figure, the horizontal axis indicates RSSI, and the vertical axis indicates FER.

The received signal strength calculation unit 282 performs substantially the same processing as the received signal strength calculation unit 232, and using the channel matrix H input from the channel estimation unit 203, it calculates the received signal strength for the packet frame and outputs the calculated received signal strength to the FER estimation unit 283.

The FER estimation unit 283 estimates, by referring to the strength FER information stored in the strength FER information storage unit 281, the FER for the received signal strength input from the received signal strength calculation unit 282 for each transmission rate and outputs the estimated FER values to the FER comparative determining unit 284.

For each transmission rate, the FER comparative determining unit 284 compares the estimated FER value input from the FER estimation unit 253 with the estimated FER value input from the FER estimation unit 283 and outputs the larger of the estimated FER values to the throughput calculation unit 261. Note that the reason for using the larger of the estimated FER values is that, by using the value for which the channel state is considered to be worse, the next wireless communication from the transmitter 10 to the receiver 20h can be carried out more reliably.

(Operations of Adaptive Control Unit 211h)

Figure 42:
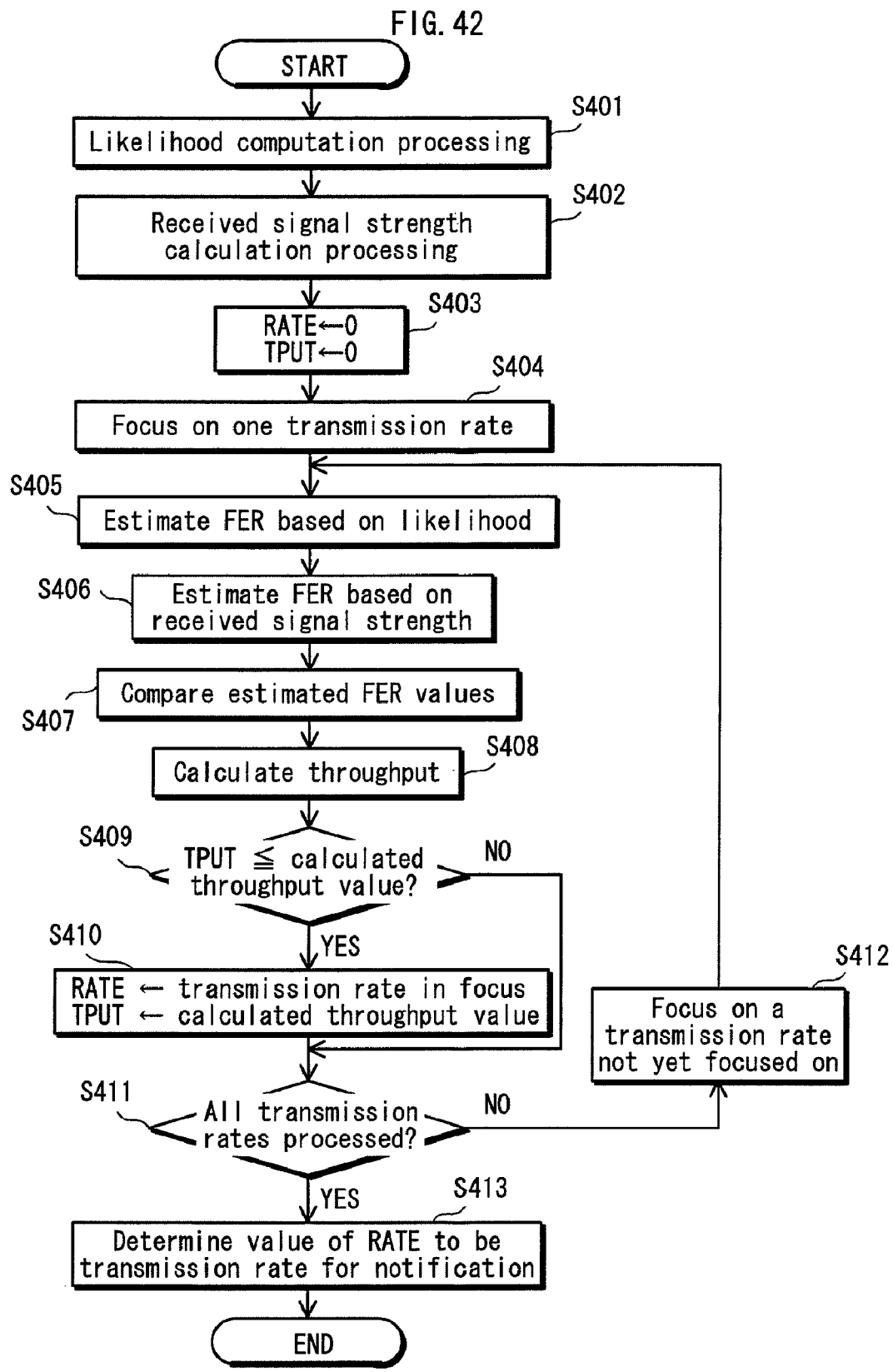
FIG. 42 is a flowchart showing the processing steps in adaptive control processing by the adaptive control unit 211h in FIG. 40.

The following is an explanation of the adaptive control processing by the adaptive control unit 211h in FIG. 40 with reference to FIG. 42, which is a flowchart showing the processing steps in adaptive control processing by the adaptive control unit 211h in FIG. 40.

Based on the likelihood information input from the likelihood calculation unit 205, the likelihood computation unit 252 calculates the likelihood used by the FER estimation unit 253 for estimating the FER (step S401), and the received signal strength calculation unit 282 calculates the received signal strength of the packet frame based on the channel matrix H input from the channel estimation unit 203 (step S402). Furthermore, the transmission rate determining unit 262 sets the variable RATE and the variable TPUT both to 0 (step S403).

Both the FER estimation unit 253 and the FER estimation unit 283 focus on the same transmission rate (step S404). For the transmission rate in focus, the FER estimation unit 253 estimates the FER for the likelihood calculated in step S401 by referring to the likelihood FER information stored in the likelihood FER information storage unit 251 (step S405). Furthermore, for the transmission rate in focus, the FER estimation unit 283 estimates the FER for the received signal strength calculated in step S402 by referring to the strength FER information stored in the strength FER information storage unit 281 (step S406).

The FER comparative determining unit 284 compares the estimated FER value estimated in step S405 with the estimated FER value estimated in step S406, outputting the larger of the estimated FER values to the throughput calculation unit 261 (step S407). The throughput calculation unit 261 calculates the throughput using the estimated FER value input in step S407 (step S408).

The transmission rate determining unit 262 compares the calculated throughput value calculated in step S408 with the value of the variable TPUT and determines whether the calculated throughput value is equal to or greater than the variable TPUT (step S409). When the calculated throughput value is determined not to be equal to or greater than the variable TPUT (S409: NO), then the processing in step S411 is performed. Conversely, when the calculated throughput value is determined to be equal to or greater than the variable TPUT (S409: YES), then the transmission rate determining unit 262 updates the value of the variable RATE to the transmission rate in focus and updates the value of the variable TPUT to the calculated throughput value (step S410), after which the processing in step S411 is performed.

The FER estimation unit 253 determines whether processing such as FER estimation has been performed for all transmission rates (step S411). When processing such as FER estimation has not been performed by the FER estimation unit 253 for all transmission rates (S411: NO), the FER estimation unit 253 and the FER estimation unit 283 focus on an identical transmission rate for which FER estimation and other processing has not been performed (step S412), and processing proceeds to step S405. Conversely, when processing such as FER estimation has been performed by the FER estimation unit 253 for all transmission rates (S411: YES), then processing proceeds to step S413.

The transmission rate determining unit 262 determines the value of the variable RATE to be the transmission rate to be notified to the transmitter 10 and outputs the modulation method and coding rate for the determined transmission rate to the upper layer processing unit 23 (step S413). By having the upper layer processing unit 23 and the transmission processing unit 24 perform predetermined processing, a transmission signal that includes the modulation method and the coding rate output from the adaptive control unit 211h to the upper layer processing unit 23 is transmitted to the transmitter 10 via the antenna $RA_1$. For the next wireless communication to the receiver 20h, the transmitter 10 transmits a signal in accordance with the modulation method and coding rate of which it was notified by the receiver 20h.

Embodiment 10

The following is an explanation of Embodiment 10 of the present invention, with reference to the attached drawings.

In Embodiment 10, the adaptive control unit 211h in Embodiment 9 has the additional function of correcting the likelihood FER information stored by the likelihood FER information storage unit 251 and the strength FER information stored by the strength FER information storage unit 281, in accordance with changes in the environment at the location where the transmitter 10 and receiver 20i are positioned or changes in the environment due to movement of these apparatuses. In the present embodiment, the elements of the transmission rate of which the receiver 20i notifies the transmitter 10 are the modulation method and the coding rate, and therefore the adaptive control unit 101 in the transmitter 10 sets the coding rate in the coding unit 104 and the modulation method in the modulators $106_1$-$106_M$ in accordance with the notification from the receiver 20i, setting other elements to predetermined values. Note that since the structure and operations of the receiver 20i differ essentially from Embodiment 9, explanation is provided for the receiver 20i in the present embodiment.

<Receiver 20i>

Figure 43:
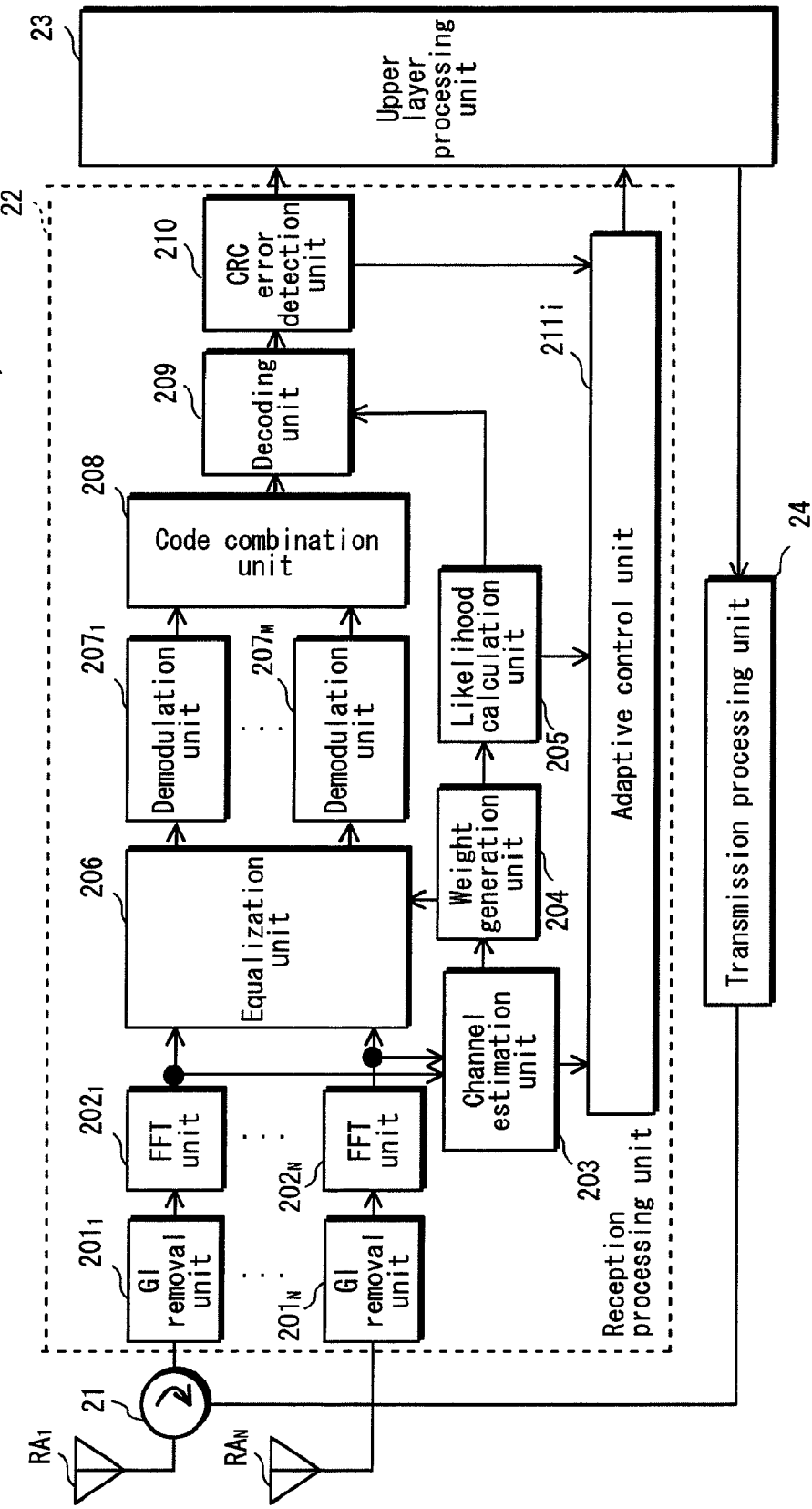
FIG. 43 is a configuration diagram of the receiver 20i in Embodiment 10.

The following is an explanation of the receiver 20i in the present embodiment with reference to FIG. 43, which is a configuration diagram of the receiver 20i in the present embodiment. Note that for structural elements in the present embodiment that are essentially the same as in Embodiment 1, the same labels have been used, and since the explanation of these elements also applies to the present embodiment, such explanation is not repeated.

The receiver 20i includes an adaptive control unit 211i instead of the adaptive control unit 211h in the receiver 20h in Embodiment 9. Note that the CRC error detection unit 210 in the present embodiment outputs the CRC error detection information that indicates the results of CRC error detection to the adaptive control unit 211i.

(Structure of Adaptive Control Unit 211B)

Figure 44:
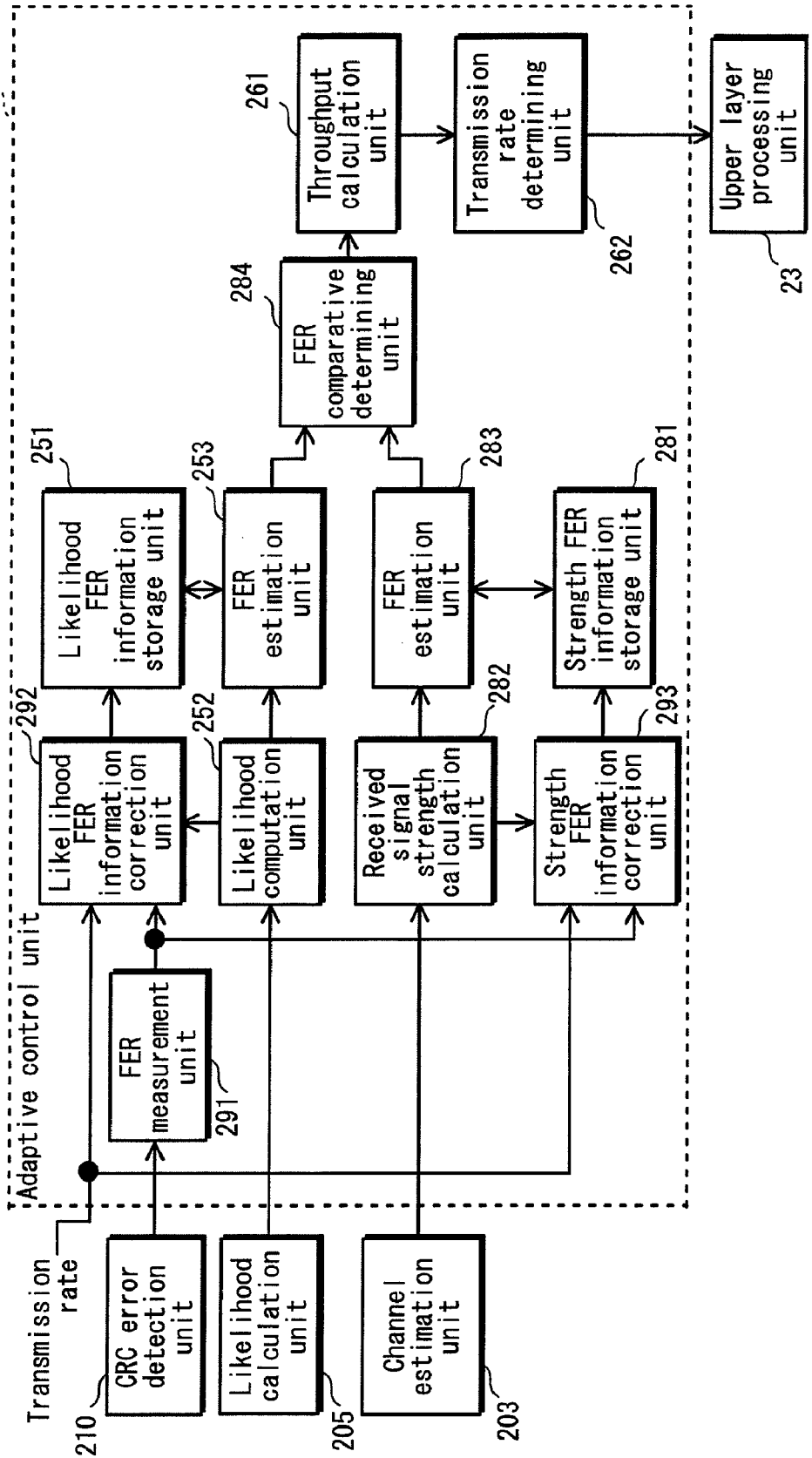
FIG. 44 is a block diagram of the adaptive control unit 211i in FIG. 43.

The following is an explanation of the adaptive control unit 211i in FIG. 43 with reference to FIG. 44, which is a block diagram of the adaptive control unit 211i in the present embodiment in FIG. 44. Note that for structural elements in the present embodiment that are essentially the same as in Embodiments 3, 4, and 9, the same labels have been used, and since the explanation of these elements also applies to the present embodiment, such explanation is not repeated.

In addition to the structural elements of the adaptive control unit 211h in Embodiment 9, the adaptive control unit 211i contains an FER measurement unit 291, a likelihood FER information correction unit 292, and a strength FER information correction unit 293.

Information indicating the transmission rate that was used for the last wireless communication from the transmitter 10 to the receiver 20i is input into the likelihood FER information correction unit 292 and the strength FER information correction unit 293 from the channel estimation unit 203. Note that the channel estimation unit 203 analyzes the control information signal received from the transmitter 10, identifies the transmission rate contained in this control information signal, and outputs the identified transmission rate to the likelihood FER information correction unit 292 and the strength FER information correction unit 293.

Based on the CRC detection results input from the CRC error detection unit 210, the FER measurement unit 291 calculates the FER at set intervals or each time the detection results reach a set value and outputs the calculated FER to the likelihood FER information correction unit 292 and the strength FER information correction unit 293. For example, the FER can be calculated by using the equation FER=number of CRC errors/(number of successful CRCs+ number of CRC errors).

Figure 45:
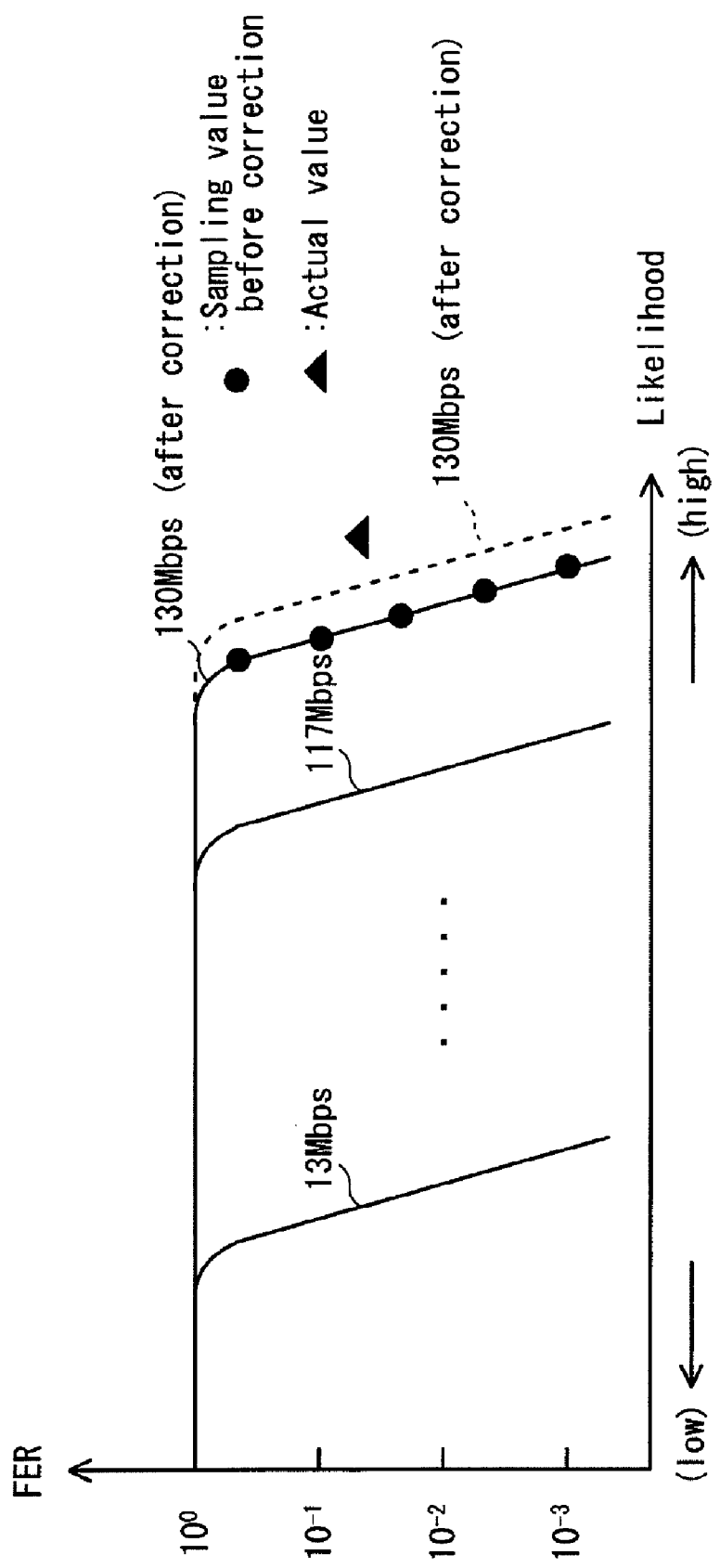
FIG. 45 shows an example of correction processing of likelihood FER information by the likelihood FER information correction unit 292 in FIG. 44.

Based on the input transmission rate, the likelihood input from the likelihood computation unit 252, and the FER input from the FER measurement unit 291, the likelihood FER information correction unit 292 corrects the likelihood FER information stored in the likelihood FER information storage unit 251. An example of correction of the likelihood FER information by the likelihood FER information correction unit 292 for a transmission rate of 130 Mbps is shown in FIG. 45. In this figure, the black dots are points showing the sample value before correction of the 130 Mbps transmission rate, whereas the black triangles show actual measurement values (points corresponding to a pair consisting of the FER calculated by the FER measurement unit 291 and the likelihood detected by the likelihood computation unit 252). The likelihood FER information correction unit 292 corrects the likelihood FER information for the 130 Mbps transmission rate by calculating an approximated curve from the sample values shown as black dots and the actual measurement values shown as black triangles. Calculation of the approximated curve can, for example, be performed using the least-square method or by moving the original curve geometrically.

Based on the input transmission rate, the received signal strength input from the received signal strength calculation unit 252, and the FER input from the FER measurement unit 291, the strength FER information correction unit 293 corrects the strength FER information stored in the strength FER information storage unit 281. The mechanism whereby the strength FER information correction unit 293 corrects the strength FER information can, for example, be the same mechanism that the likelihood FER information correction unit 292 uses to correct the likelihood FER information, replacing likelihood with received signal strength.

As the processing steps in adaptive control processing performed by the adaptive control unit 211i are substantially the same as the processing steps in adaptive control processing performed by the adaptive control unit 211h, explanation is provided below for correction which the adaptive control unit 211i performs on the likelihood FER information stored by the likelihood FER information storage unit 251 and on the strength FER information stored by the strength FER information storage unit 281.

(Operations of Adaptive Control Unit 211i)

Figure 46:
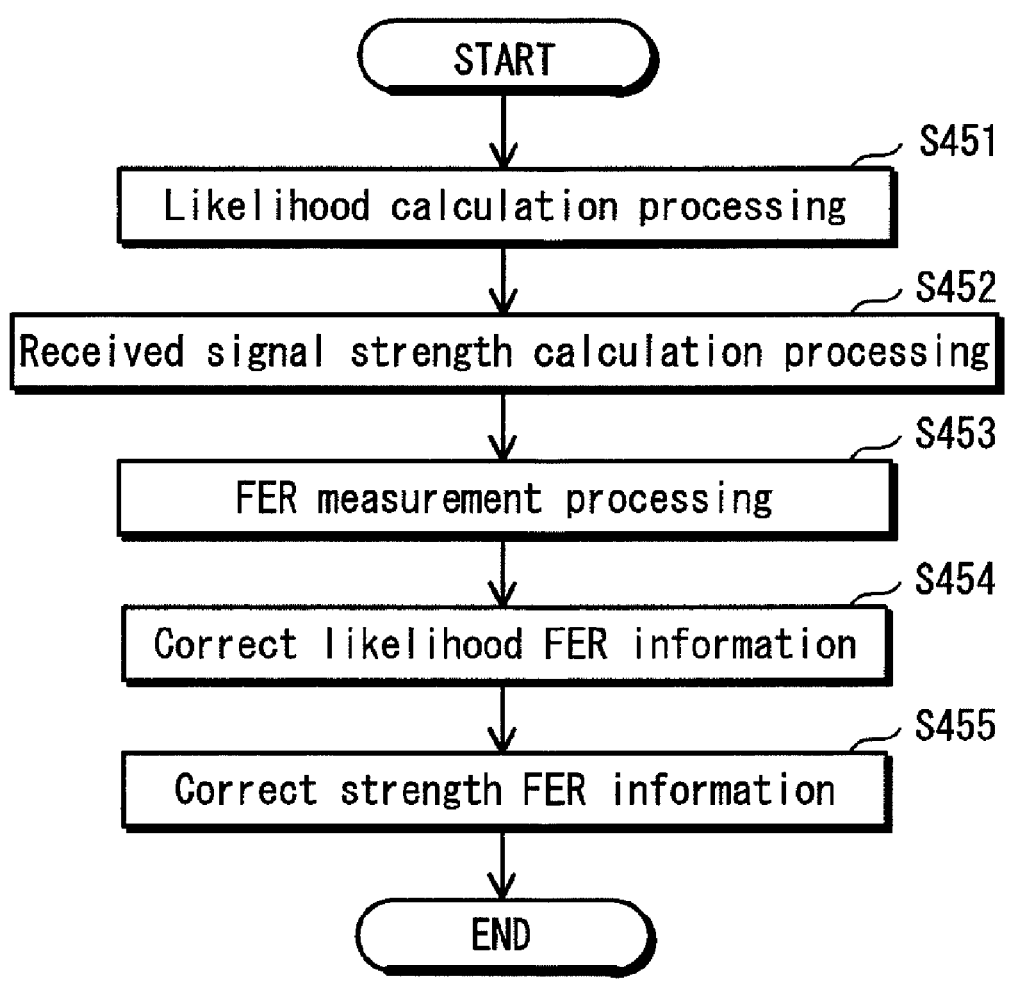
FIG. 46 is a flowchart showing the processing steps in correction processing of likelihood FER information and strength FER information by the adaptive control unit 211i in FIG. 44.

The following is an explanation of the correction processing of the likelihood FER information and the strength FER information by the adaptive control unit 211i in FIG. 44 with reference to FIG. 46, which is a flowchart showing the processing steps in correction processing of likelihood FER information and strength FER information by the adaptive control unit 211i in FIG. 44.

The likelihood calculation unit 205 calculates the likelihood for each transmission stream using the weight matrix W input from the weight generation unit 204 and outputs likelihood information that includes the calculated likelihood value for each transmission stream to the likelihood computation unit 252. Based on the likelihood information input from the likelihood calculation unit 205, the likelihood computation unit 252 calculates the likelihood (step S451), and the received signal strength calculation unit 282 calculates the received signal strength for the packet frame based on the channel matrix H input from the channel estimation unit 203 (step S452). The CRC error detection unit 210 performs error detection on the received frame using the CRC bit sequence and outputs CRC error detection information indicating the results of error detection to the FER measurement unit 291. The FER measurement unit 291 calculates the FER based on the CRC error detection information input from the CRC error detection unit 210 (step S453).

Based on the likelihood calculated in step S451 and the FER calculated in step S453, the likelihood FER information correction unit 292 corrects the likelihood FER information corresponding to the input transmission rate stored in the likelihood FER information storage unit 251 (step S454). Based on the received signal strength calculated in step S452 and the FER calculated in step S453, the strength FER information correction unit 293 corrects the strength FER information corresponding to the input transmission rate stored in the strength FER information storage unit 281 (step S455).

With the above-described embodiment, it is possible to reduce the estimation error of the FER based on the likelihood value and of the FER based on the received signal strength value by continually correcting the likelihood FER information and strength FER information, despite differences in the propagation environments due to the position of the transmitter 10 or the receiver 20i, changes in the propagation environment produced by movement, error characteristics of the transmitter 10 or the receiver 20i, etc.

Embodiment 11

The following is an explanation of Embodiment 11 of the present invention, with reference to the attached drawings.

In Embodiment 1, the adaptive control unit 211 in the receiver 20 determined the transmission rate for the transmitter as a whole. In the present embodiment, on the other hand, the adaptive control unit 211j determines the transmission rate for individual transmission streams. Note that since the structure and operations that differ essentially from Embodiment 1 are found in the adaptive control unit 211j, explanation is provided for the adaptive control unit 211j in the present embodiment.

(Structure of Adaptive Control Unit 211d)

Figure 47:
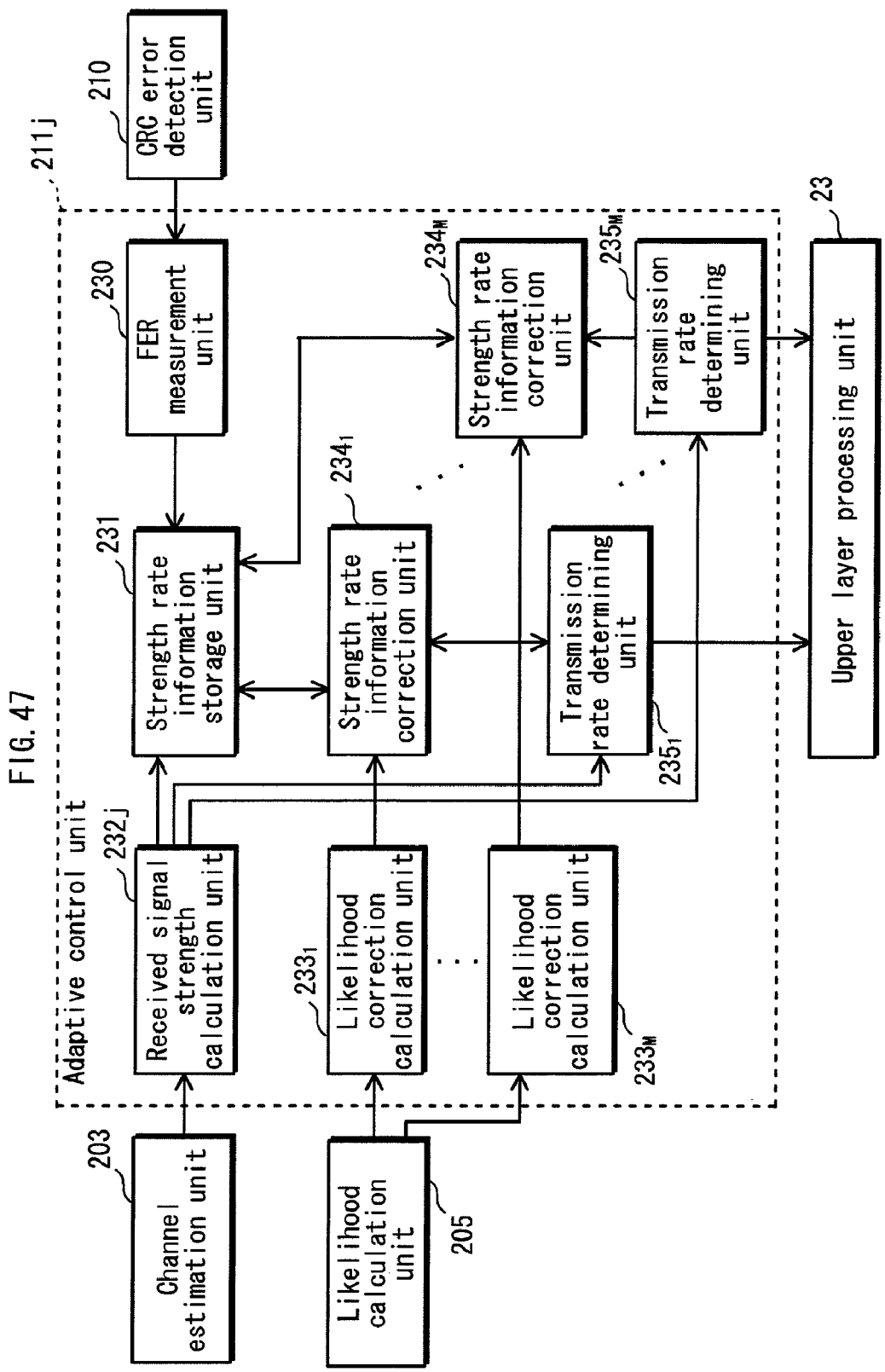
FIG. 47 is a block diagram of the adaptive control unit 211j in Embodiment 11.

The following is an explanation of the adaptive control unit 211j with reference to FIG. 47, which is a block diagram of the adaptive control unit 211j in the present embodiment. Note that for structural elements in the present embodiment that are essentially the same as in Embodiment 1, the same labels have been used, and since the explanation of these elements also applies to the present embodiment, such explanation is not repeated.

The adaptive control unit 211j includes an FER measurement unit 230, a strength rate information storage unit 231, a received signal strength calculation unit 232j, likelihood correction calculation units $233_1$-$233_M$, strength rate information correction units $234_1$-$234_M$, and transmission rate determining units $235_1$-$235_M$. Note that the transmitter 10 includes M antennas, and therefore the number of likelihood correction calculation units, strength rate information correction units, and transmission rate determining units that the adaptive control unit 211j includes is indicated as M.

The received signal strength calculation unit 232j performs essentially the same processing as the received signal strength calculation unit 232 and outputs the received signal strength for the packet frame to the strength rate information storage unit 231.

For each transmission stream, the received signal strength calculation unit 232j calculates the received signal strength for each carrier using the channel matrix H input from the channel estimation unit 203 and adds up the calculated received signal strength for each carrier. The received signal strength calculation unit 232j then outputs this sum for each transmission stream as the received signal strength for the transmission stream to the corresponding transmission rate determining unit among the units $235_1$-$235_M$.

Likelihood information including the likelihood for a transmission stream is input into each of the likelihood correction calculation units $233_1$-$233_M$ from the likelihood calculation unit 205. For the corresponding transmission stream, each of the likelihood correction calculation units $233_1$-$233_M$ adds up the likelihoods for each of the carriers included in the likelihood information input from the likelihood calculation unit 205 and divides the resulting sum by the number of carriers. Each of the likelihood correction calculation units $233_1$-$233_M$ then calculates the likelihood correction value from the value resulting from this division and outputs the calculated likelihood correction value to the corresponding strength rate information correction unit among the units $234_1$-$234_M$. Note that the approach to calculation of the likelihood correction value by the likelihood correction calculation units $233_1$-$233_M$ is substantially the same as the approach to calculation of the likelihood correction value in the likelihood correction calculation unit 233 described in Embodiment 1.

The strength rate information correction units $234_1$-$234_M$ each correct the strength rate information stored in the strength rate information storage unit 231 based on the likelihood correction value input from the corresponding likelihood correction calculation unit from among the units $233_1$-$233_M$.

The transmission rate determining units $235_1$-$235_M$ each determine, by referring to the strength rate information corrected by the corresponding strength rate information correction unit among the units $234_1$-$234_M$, the transmission rate for the received signal strength for the transmission stream input from the received signal strength calculation unit 232j as the transmission rate to be notified to the transmitter 10. Then, the transmission rate determining units $235_1$-$235_M$ each output the determined transmission rate to the upper layer processing unit 23.

In the above-described embodiment, it is possible, for example, to control the number of transmission streams by not using transmission streams with a low likelihood for the next wireless communication from the transmitter 10 to the receiver.

Embodiment 12

The following is an explanation of Embodiment 12 of the present invention, with reference to the attached drawings.

In Embodiment 11, the adaptive control unit 211j used the received signal strength as is, referred to the strength rate information, and determined the transmission rate. In the present embodiment, on the other hand, the adaptive control unit 211k corrects the received signal strength with the likelihood correction value, uses the corrected received signal strength, and determines the transmission rate by referring to the strength rate information. Note that since the structure and operations of the adaptive control unit 211k differ essentially from Embodiment 11, explanation is provided for the adaptive control unit 211k in the present embodiment.

(Structure of Adaptive Control Unit 211k)

Figure 48:
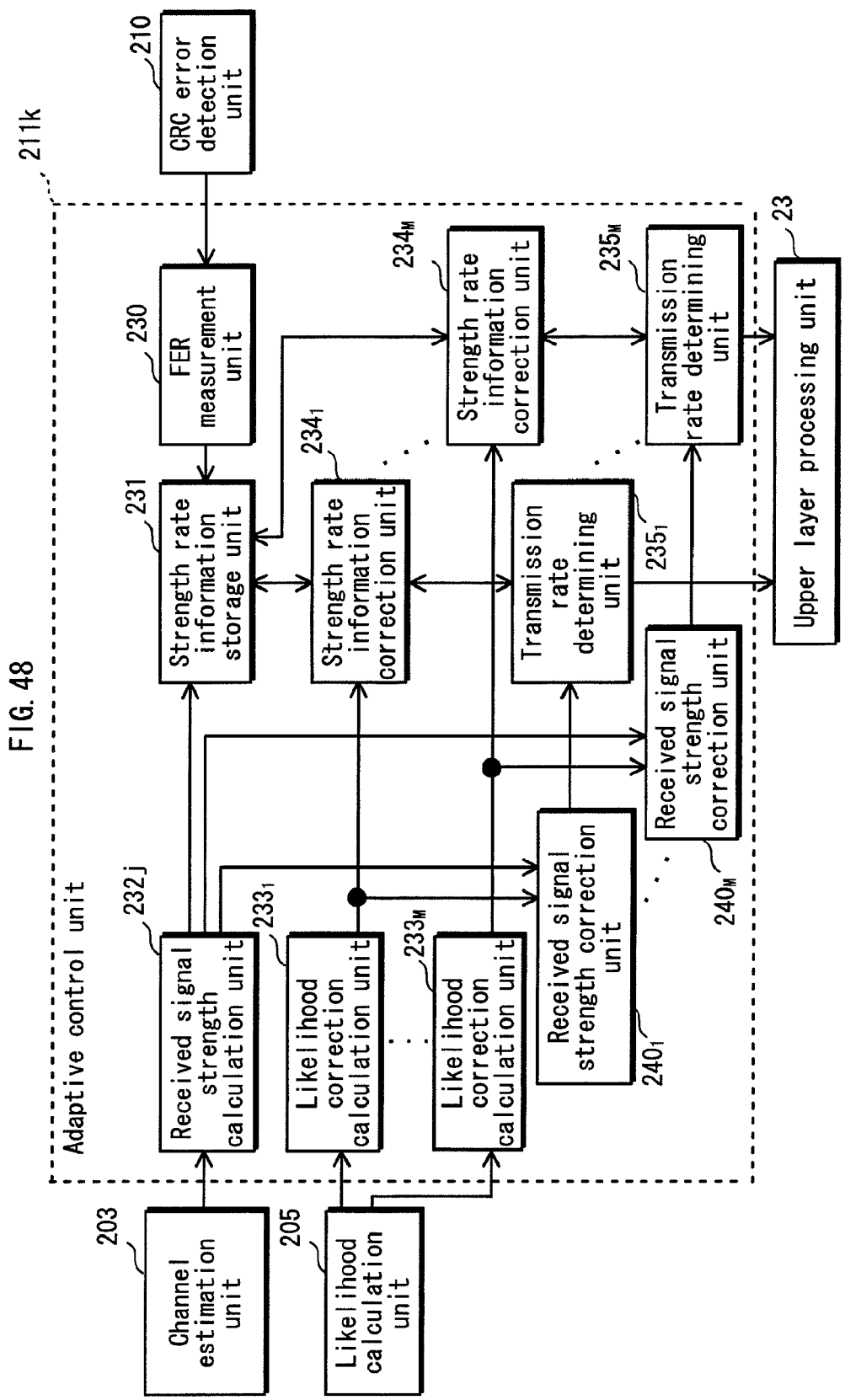
FIG. 48 is a block diagram of the adaptive control unit 211k in Embodiment 12.

The following is an explanation of the adaptive control unit 211k in the present embodiment with reference to FIG. 48, which is a block diagram of the adaptive control unit 211k in the present embodiment. Note that for structural elements in the present embodiment that are essentially the same as in Embodiments 1 and 11, the same labels have been used, and since the explanation of these elements also applies to the present embodiment, such explanation is not repeated.

In addition to the structural elements in the adaptive control unit 211j in Embodiment 11, the adaptive control unit 211k includes received signal strength correction units $240_1$-$240_M$. Note that the transmitter 10 includes M antennas, and therefore the adaptive control unit 211k includes M received signal strength correction units.

Based on the likelihood correction value input from the corresponding likelihood correction calculation unit among the units $233_1$-$233_M$, each of the received signal strength correction units $240_1$-$240_M$ corrects the received signal strength for the corresponding transmission stream input from the received signal strength calculation unit 231j and outputs the resulting corrected received signal strength (corrected strength value) to the corresponding transmission rate determining unit among the units $235_1$-$235_M$. The approach to calculation of the corrected value for received signal strength by the received signal strength correction units $240_1$-$240_M$ is substantially the same as the approach to correction of the received signal strength by the received signal strength correction unit 240 as described in Embodiment 2.

Instead of using the received signal strength input from the received signal strength calculation unit 231j, each of the transmission rate determining units $235_1$-$235_M$ in the present embodiment uses the corrected strength value input from the corresponding received signal strength correction unit among the units $240_1$-$240_M$. Each of the transmission rate determining units $235_1$-$235_M$ (i) determines, by referring to the strength rate information corrected by the corresponding received signal strength correction unit among the units $240_1$-$240_M$, the transmission rate for the received signal strength that matches the corrected strength value input from the corresponding received signal strength correction unit among the units $240_1$-$240_M$ as the transmission rate to be notified to the transmitter 10, and (ii) outputs the determined transmission rate to the upper layer processing unit 23.

Embodiment 13

The following is an explanation of Embodiment 13 of the present invention, with reference to the attached drawings.

The receiver 20 in Embodiment 1 generates the weight matrix W and calculates the likelihood matrix k without taking undesirable signals into consideration. The receiver 20l in the present embodiment, on the other hand, takes undesirable signals into consideration when generating the weight matrix W and calculating the likelihood matrix k. Note that since the structure and operations of the receiver 20l differ essentially from Embodiment 1, explanation is provided for the receiver 20l in the present embodiment.

<Receiver 20l>

Figure 49:
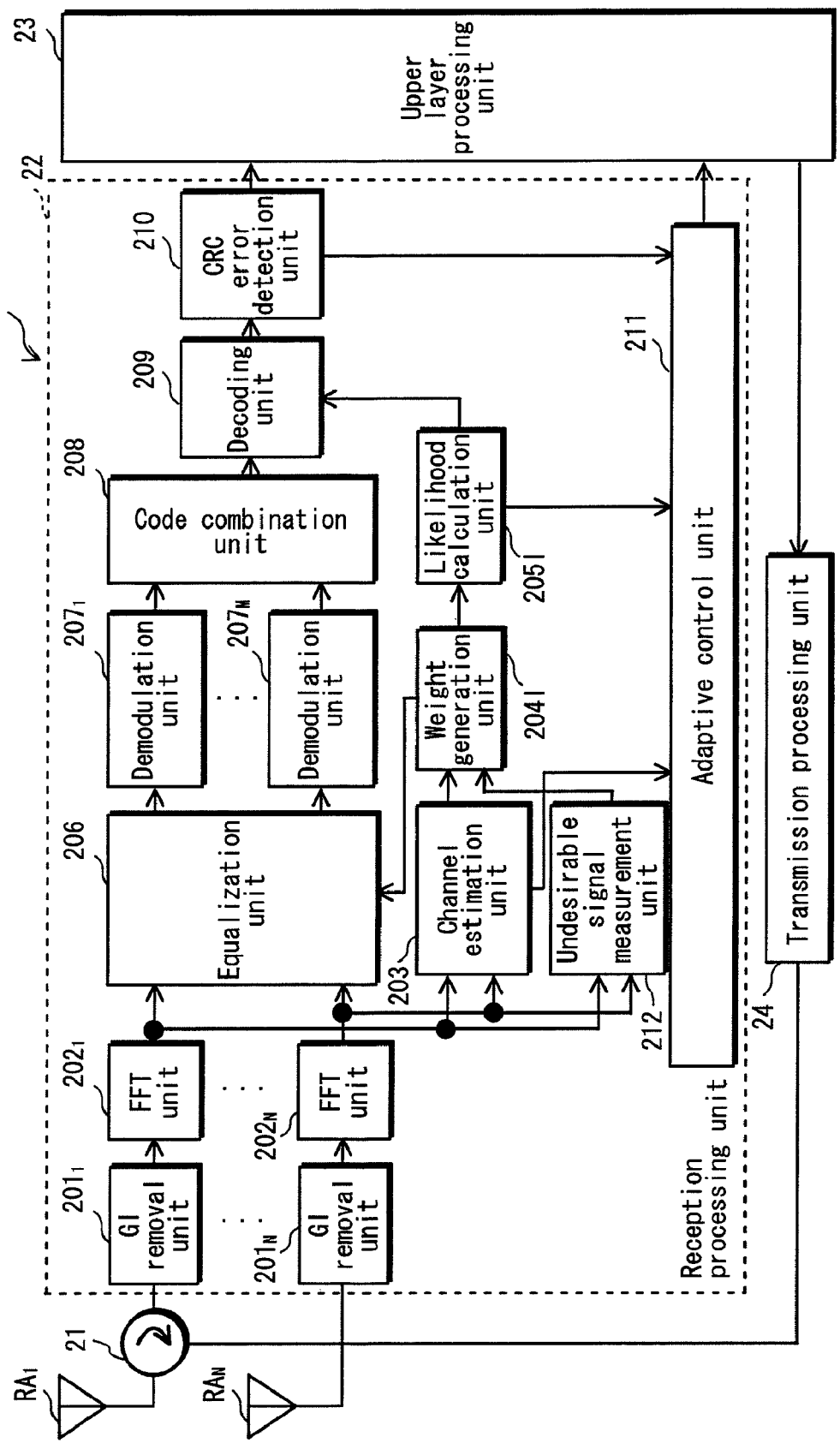
FIG. 49 is a block diagram of the receiver 20l in Embodiment 13.
Figure 50:
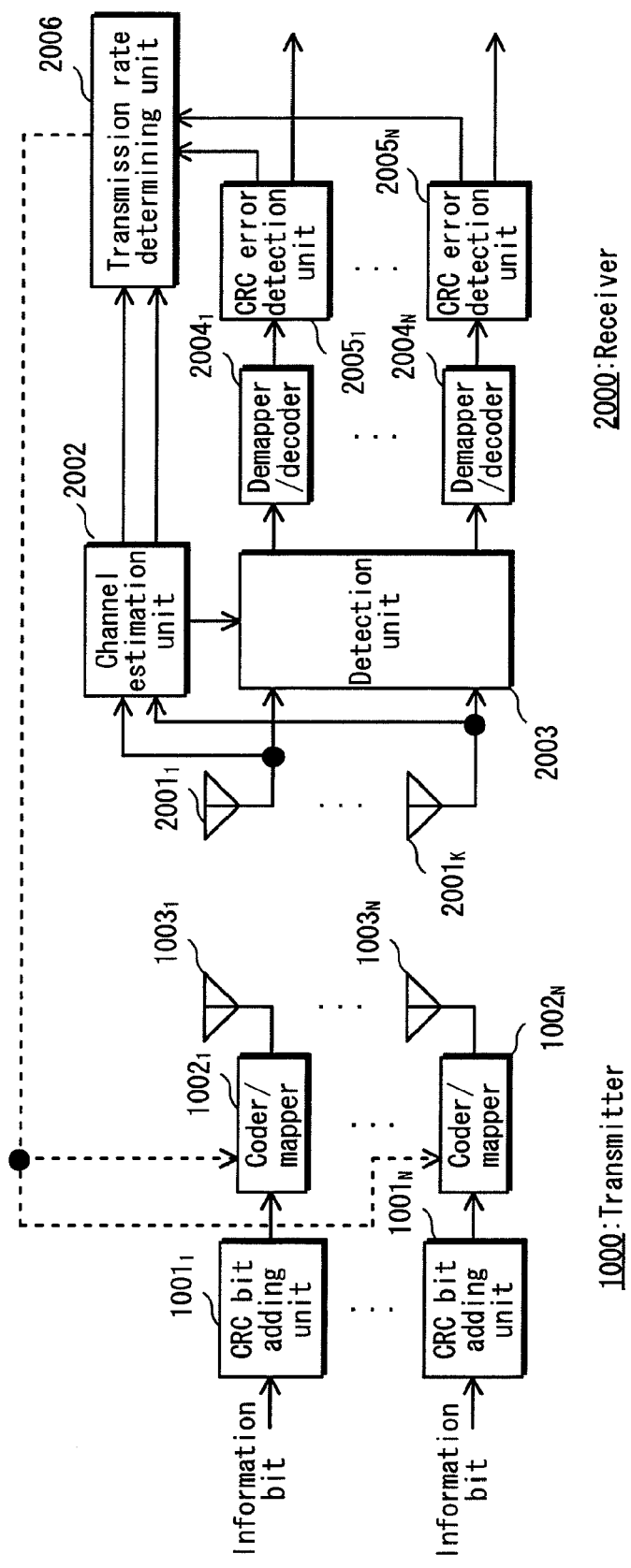
FIG. 50 shows an example of conventional adaptive modulation technology.

The following is an explanation of the receiver 20l in the present embodiment with reference to FIG. 49, which is a configuration diagram of the receiver 20l in the present embodiment. Note that for structural elements in the present embodiment that are essentially the same as in Embodiment 1, the same labels have been used, and since the explanation of these elements also applies to the present embodiment, such explanation is not repeated.

Instead of the weight generation unit 204 and the likelihood calculation unit 205 in the receiver 20 Embodiment 1, the receiver 20l includes a weight generation unit 204l and a likelihood calculation unit 205l and further includes an undesirable signal measurement unit 212.

Before receiving a signal from the transmitter 10, the undesirable signal measurement unit 212 measures the undesirable signals received by each of the antennas $RA_1$-$RA_N$ for each carrier, based on the signal input from the FFT units $202_1$-$202_N$, and generates an undesirable signal matrix U of N rows and one column having as elements the vectors of the measured undesirable signals for each of the antennas $RA_1$-$RA_N$. The undesirable signal measurement unit 212 then calculates the time-average covariance matrix $R_{UU}$, a time-average of the covariance matrix of the undesirable signal matrix U generated previously, by substituting the undesirable signal matrix U in the equation $R_{UU}=E[UU^H]$ and outputs the time-average covariance matrix $R_{UU}$ thus calculated to the weight generation unit 204l. Note that $U^H$ is a complex conjugate transpose matrix of the undesirable signal matrix U, and $E[UU^H]$ expresses the time-average of $UU^H$. Undesirable signals are, for example, signals produced by a wireless transmission apparatus other than the transmitter 10 with which the receiver 20l is communicating wirelessly.

For each carrier, the weight generation unit 204l calculates the weight matrix W used by the equalization unit 206 for weighting calculation of the received signal (the signal input from the FFT units $202_1$-$202_N$) by substituting the channel matrix H input from the channel estimation unit 203 and the time-average covariance matrix $R_{UU}$ input from the undesirable signal measurement unit 212 into Equation 6 below. The weight generation unit 204l then outputs the calculated weight matrix W to the equalization unit 206 and the likelihood calculation unit 205l.

$$W=H^H(HH^H+R_{UU})^{-1} \qquad \text{Equation 6}$$

In Equation 6, $H^H$ expresses the complex conjugate transpose matrix of H, and $(HH^H+R_{UU})^{-1}$ expresses the inverse matrix of $HH^H+R_{UU}$.

For each carrier, the likelihood calculation unit 205l calculates the likelihood matrix k by substituting the channel matrix H and the weight matrix W input from the weight generation unit 204l into Equation 7 below and outputs likelihood information that includes the diagonal elements of the calculated matrix k as the likelihood for each transmission stream to the decoding unit 209 and the adaptive control unit 211.

$$k=1/\sqrt{I-WH} \qquad \text{Equation 7}$$

I expresses an identity matrix.

Instead of using the likelihood information input from the likelihood calculation unit 205, the adaptive control unit 211 in the present embodiment uses the likelihood information input from the likelihood calculation unit 205*l* to determine the transmission rate.

With the above-described embodiment, even in an environment with undesirable signals, such as interference signals transmitted by another wireless transmission device, a transmission rate appropriate for the channel characteristics for each channel between the transmitter 10 and the receiver 20*l* can be determined.

<<Supplementary Remarks>>

The present invention is not limited to the above-described embodiments, and also includes, for example, the following.

(1) The above embodiments were described using the example of OFDM (Orthogonal Frequency Division Multiplexing) transmission, which uses a plurality of carriers that are orthogonal to each other. However, the present invention is not applicable only to OFDM transmission, and can also be applied, for example, to multi-carrier transmission that uses a plurality of carriers not orthogonal to each other, or to single carrier transmission.

(2) In Embodiments 4 through 10, throughput refers to the throughput in the MAC layer level, but throughput is not limited in this way, and the throughput in the TCP (Transmission Control Protocol) level or the throughput in the UDP (User Datagram Protocol) level could for example be used.

(3) The present invention is not applicable only to the standards for wireless LANs in IEEE802.11n, but can also be applied, for example, to W-CDMA (Wideband Code Division Multiplex Access), LTE (Long Term Evolution), Mobile WiMAX (World Interoperability for Microwave Access), UMB (Ultra Mobile Broadband), etc. It is further applicable to wireline communications that embrace the concept of transmission rate, such as HD-PLC (High Definition Power Line Communication (registered trademark).

(4) In Embodiments 2 through 12, as well as in each modification, the block containing the channel estimation unit 203, weight generation unit 204, and likelihood calculation unit 205 can, for example, be switched with the block containing the channel estimation unit 203, undesirable signal measurement unit 212, weight generation unit 204*l*, and likelihood calculation unit 205*l* described in Embodiment 13, and for likelihood information, each of the adaptive control units can use likelihood information that takes undesirable signals into consideration (information that includes, as the likelihood for each transmission stream, the values of each diagonal element in the likelihood matrix k obtained from Equation 7).

(5) In Embodiments 1, 2, 11, and 13, the adaptive control unit includes functions to generate and update strength rate information, but the present invention is not limited in this way. For example, predetermined strength rate information can be stored in the strength rate information storage unit 231.

In Embodiments 3 through 10, the adaptive control unit stores predetermined likelihood FER information in the likelihood FER information storage unit, but the present invention is not limited in this way. Likelihood FER information can be generated upon initialization, such as when the power is turned on. One example of a conceivable method for generating likelihood FER information is to adjust the likelihood appropriately while performing functions such as controlling the transmission strength and to measure the FER upon each adjustment, thereby generating likelihood FER information sequentially.

(6) In Embodiments 2 and 12, both the strength rate information and the received signal strength are corrected based on the likelihood correction value, but the present invention is not limited in this way. It is possible to correct only the received signal strength based on the likelihood correction value.

(7) In Embodiments 2 and 12, the received signal strength is corrected with the likelihood correction value, and the corrected strength value obtained via this correction was used when referring to strength rate information. The present invention is not limited in this way, however, and likelihood information input from the likelihood calculation unit 205 can for example be used when referring to strength rate information.

(8) In Embodiment 6, a fixed number of transmission antennas is used for transmitting signals, with only the number of transmission streams being changed, but the present invention is not limited in this way. The number of transmission streams can be changed by changing the number of transmission antennas used for transmission. For example, when two transmission antennas are used for two-stream transmission, and when one of the two likelihoods sought for each transmission stream is extremely small (e.g. when the ratio of one likelihood to the other is equal to or less than a predetermined value), then transmission of the transmission stream with the smaller likelihood can be stopped.

(9) In Embodiment 7, the likelihoods for each of the bandwidths with a lower value than the bandwidth currently being used for wireless communication from the transmitter 10 to the receiver are estimated, but the present invention is not limited in this way. For example, the likelihoods for each of the bandwidths other than the bandwidth currently being used for wireless communication from the transmitter 10 to the receiver can be estimated, and adaptive control processing that includes bandwidths with a higher value than the bandwidth currently being used for wireless communication from the transmitter 10 to the receiver can be performed.

(10) In Embodiments 9 and 10, the estimated FER value estimated based on the likelihood is compared with the estimated FER value estimated based on the received signal strength, and the higher of the estimated FER values is used to calculate throughput. The present invention is not, however, limited in this way; for example, the lower of the estimated FER values may be used to calculate throughput, or throughput may be calculated using the mean value of the two estimated FER values.

(11) Calculation of throughput based on the higher estimated FER value after comparing the estimated FER value estimated based on the likelihood with the estimated FER value estimated based on the received signal strength, as explained in Embodiments 9 and 10, may also be applied to Embodiments 3 and 5 through 8. Note that in this case, as described above in (10), instead of selecting the higher of the estimated FER values, the lower of the FER values, or the mean value of the two estimated FER values, may for example be used.

(12) The combinations of parameters selected in Embodiments 3 through 10 are simply examples, and the present invention is not limited to these. During wireless communication from the transmitter to the receiver, for example, it is possible to control only one of the following parameters, or to control any two or more of them: coding rate, modulation method, guard interval length, bandwidth, number of transmission streams, and frame aggregation number.

(13) In Embodiments 3 through 7, 9, and 10, the transmission rate for wireless communication from the transmitter to the receiver is controlled for the whole transmitter, and in Embodiment 8, the transmission rate and the frame aggregation number for wireless communication from the transmitter to the receiver is controlled for the whole transmitter. The present invention is not, however, limited in this way. For example, using the likelihood for each transmission stream, the transmission rate, or the transmission rate and frame aggregation number, can be controlled for individual transmission streams. Also, using the likelihood for each carrier, the transmission rate or the transmission rate and frame aggregation number can be controlled for individual carriers.

(14) In Embodiment 8, the frame aggregation number used for the next wireless transmission from the transmitter 10 to the receiver is determined, but the present invention is not limited in this way. For example, the frame length used for the next wireless transmission from the transmitter 10 to the receiver may be determined.

(15) In each of the above-described embodiments, the adaptive control unit uses FER, but the present invention is not limited in this way. For example, the adaptive control unit can be constructed so as to use a different signal error ratio such as PER (Packet Error Rate), BER (Bit Error Rate), etc.

(16) The correction function for likelihood FER information described in Embodiment 10 may be applied to Embodiments 3 through 8.

(17) In each of the embodiments and modifications, the receiver (i) uses either likelihood information or likelihood information and the channel matrix H to determine the transmission rate, or (ii) uses likelihood information to determine the transmission rate and the frame aggregation number. However, the present invention is not limited in this way.

For example, in Embodiments 1, 2, and 11 through 13, the receiver may notify the transmitter of likelihood information calculated by the likelihood calculation unit 205 or 205*l*, and the transmitter may determine the transmission rate based on the likelihood information received via this notification, transmitting the next signal to the receiver in accordance with this determined transmission rate. In Embodiments 3 through 8, the receiver may notify the transmitter of the likelihood information calculated by the likelihood calculation unit 205, and the transmitter may determine the transmission rate based on the likelihood information received via this notification, or determine the transmission rate and the frame aggregation number based on the likelihood information, transmitting the next signal to the receiver in accordance with this determined transmission rate and frame aggregation number. In Embodiments 9 and 10, the receiver may notify the transmitter of likelihood information calculated by the likelihood calculation unit 205 and of the channel matrix H, and the transmitter may determine the transmission rate based on the likelihood information and the channel matrix H received via this notification, transmitting the next signal to the receiver in accordance with this determined transmission rate. In this case, the transmitter rather than the receiver would include the functions of the adaptive control units described in Embodiments 1 through 13, and the transmitter would execute substantially the same processing steps as the adaptive control processing unit provided in the receiver in Embodiments 1 through 13 and determine the transmission rate or the transmission rate and the frame aggregation number.

Furthermore, in Embodiments 3 through 6 and 8, the receiver may notify the transmitter of information including likelihood calculated by the likelihood computation unit 252, and the transmitter may determine the transmission rate or the transmission rate and the frame aggregation number based on the likelihood, as calculated by the likelihood computation unit 252, of which it was notified by the receiver, transmitting the next signal to the receiver in accordance with this determined transmission rate or transmission rate and frame aggregation number. In this case, the adaptive control unit in the receiver would include only the likelihood computation unit 252, and the function block excluding the likelihood computation unit 252 in the adaptive control unit as explained in Embodiments 3 through 6 and 8 would be provided in the transmitter. The transmitter would execute the steps in FIG. 16 excluding step S101, the steps in FIG. 19 excluding step S151, the steps in FIG. 24 excluding step S201, the steps in FIG. 28 excluding step S251, and the steps in FIG. 37 excluding step S351.

Furthermore, in Embodiment 7, the receiver may notify the transmitter of information including the likelihood calculated by the likelihood computation unit 252 and the likelihood calculated by the likelihood estimation unit 271*f*, and the transmitter may determine the transmission rate based on the likelihood calculated by the likelihood computation unit 252 and the likelihood calculated by the likelihood estimation unit 271*f* of which it was notified by the receiver, transmitting the next signal to the receiver in accordance with this determined transmission rate. In this case, the adaptive control unit in the receiver would only include the likelihood computation unit 252 and the likelihood estimation unit 271*f*, whereas the transmitter would include the function blocks of the adaptive control unit 211*f* other than the likelihood computation unit 252 and the likelihood estimation unit 271*f*. The transmitter would execute the steps in FIG. 32 excluding steps S301 and S302.

Furthermore, in Embodiment 9, the receiver may notify the transmitter of information including the likelihood calculated by the likelihood computation unit 252 and the received signal strength calculated by the received signal strength calculation unit 282, and the transmitter may determine the transmission rate based on the likelihood calculated by the likelihood computation unit 252 and the received signal strength calculated by the received signal strength calculation unit 282 of which it was notified by the receiver, transmitting the next signal to the receiver in accordance with this determined transmission rate. In this case, the adaptive control unit in the receiver would only include the likelihood computation unit 252 and the received signal strength calculation unit 282, whereas the transmitter would include the function blocks of the adaptive control unit 211*h* other than the likelihood computation unit 252 and the received signal strength calculation unit 282. The transmitter would execute the steps in FIG. 42 excluding steps S401 and S402. Note that instead of receiving notification of the received signal strength from the receiver, the transmitter may use the received signal strength of the ACK frame.

Furthermore, in Embodiment 10, the receiver may notify the transmitter of information including the likelihood calculated by the likelihood computation unit 252, the received signal strength calculated by the received signal strength calculation unit 282, and the FER measured by the FER measurement unit 291. The transmitter may then (i) determine the transmission rate based on the likelihood calculated by the likelihood computation unit 252 and the received signal strength calculated by the received signal strength calculation unit 282 of which it was notified by the receiver, (ii) correct the likelihood FER information based on the likelihood calculated by the likelihood computation unit 252 and the FER measured by the FER measurement unit 291, and (iii) correct the strength FER information based on the received signal strength calculated by the received signal strength calculation unit 282 and the FER measured by the FER measurement unit 291. In this case, the adaptive control unit in the receiver would only include the likelihood computation unit 252, the received signal strength calculation unit 282, and the FER measurement unit 291, whereas the transmitter would include the function blocks of the adaptive control unit 211*i* other than the likelihood computation unit 252, the received signal strength calculation unit 282, and the FER measurement unit 291. By executing the steps in FIG. 42 excluding steps S401 and S402 and the steps in FIG. 46 excluding steps S454 and S455, the transmitter would correct the likelihood FER information and the strength FER information. Note that instead of receiving notification of the FER from the receiver, the transmitter may seek the FER based on the existence of a response for the ACK frame or the number of frames resent from the transmitter.

The information of which the receiver notifies the transmitter for the transmitter to determine the transmission rate or perform other processing is not limited to what was described above, and the structural elements for determining the transmission rate may be divided between the receiver and the transmitter in accordance with the contents of the notification from the receiver to the transmitter.

(18) In each of the above-described embodiments, the circulator 13 (FIG. 2) or the circulator 21 (FIGS. 3, 11, 39, 43, and 49) can, for example, be replaced with a switch that changes the connection destination in accordance with transmission and reception.

(19) A program specifying the processing and equivalent processing steps described for each of the afore-mentioned embodiments and modifications may be stored in memory, and a CPU (Central Processing Unit) or the like may be used to perform processing. Furthermore, the program may be recorded on a recording medium, such as a CD-ROM, readable by a computer or the like.

(20) The transmitter or receiver in each of the above-described embodiments may typically be implemented as an LSI (Large Scale Integration) integrated circuit. Each circuit may be on a separate chip, or all or a portion of the circuits may be included on one chip.

An LSI was referred to above, but according to its degree of integration, it may be called an IC (Integrated Circuit), system LSI, super LSI, or ultra LSI.

The method for integrating the circuit is not limited to LSI, and the circuit can also be implemented via a dedicated circuit or a generic processor. An FPGA (Field Programmable Gate Array) that can be programmed after production of the LSI, or a reconfigurable processor in which the connections and settings of the circuit cells in the LSI can be reconfigured, could also be used.

Furthermore, if integrated circuit technology that replaces LSIs via advances in semiconductor technology or the emergence of other technology appears, then of course the function block can be integrated using that technology. The application of biotechnology, etc. is conceivable.

INDUSTRIAL APPLICABILITY

The present invention can be used to control the transmission rate from a transmitter to a receiver via the MIMO method.

The invention claimed is:

1. A reception device for wireless communication with a transmission device that transmits one or more signals associated with transmission streams in accordance with a notified transmission rate, the reception device comprising:
  a channel estimation unit operable to estimate channel characteristics of each channel in accordance with one or more training signals included in signals received by each of a plurality of antennas;
  a likelihood calculation unit operable to calculate, without using a CRC bit sequence, a likelihood indicating a degree of certainty of a code corresponding to each of the transmission streams transmitted by the transmission device, in accordance with estimated values of channel characteristics for each channel as estimated by the channel estimation unit; and
  an adaptive control unit operable to (i) determine a transmission rate to notify to the transmission device in accordance with the likelihood calculated by the likelihood calculation unit and (ii) notify the transmission device of the transmission rate thus determined.

2. The reception device in claim 1, further comprising, when a channel matrix having as elements the estimated values of channel characteristics for each channel as estimated by the channel estimation unit is expressed as H, and a likelihood matrix having as diagonal elements likelihoods corresponding to each transmission stream is expressed as k,
  a weight generation unit operable to generate a weight matrix W by substituting the channel matrix H into $(H^H H)^{-1} H^H$, wherein
  the likelihood calculation unit calculates a likelihood matrix k by substituting the weight matrix W generated by the weight generation unit into Equation 1, $$k = 1/\sqrt{WW^H}. \quad \text{[Equation 1]}$$

3. The reception device in claim 1, further comprising, when a channel matrix having as elements the estimated values of channel characteristics for each channel as estimated by the channel estimation unit is expressed as H, a likelihood matrix having as diagonal elements likelihoods corresponding to each transmission stream is expressed as k, and an identity matrix is expressed as I,
  an undesirable signal measurement unit operable to calculate a covariance matrix $R_{UU}$ for an undesirable signal matrix U having undesirable signals received by each of the antennas as elements; and
  a weight generation unit operable to generate a weight matrix W by substituting the channel matrix H and the covariance matrix $R_{UU}$ calculated by the undesirable signal measurement unit into $H^H (HH^H + R_{UU})^{-1}$, wherein
  the likelihood calculation unit calculates the likelihood matrix k by substituting the channel matrix H and the weight matrix W generated by the weight generation unit into Equation 2, $$k = 1/\sqrt{I - WH}. \quad \text{[Equation 2]}$$

4. The reception device in claim 1, wherein the adaptive control unit includes
  a storage subunit storing strength rate information indicating a transmission rate for a received signal strength;
  a likelihood correction calculation subunit operable to calculate, in accordance with the likelihood calculated by the likelihood calculation unit, a likelihood correction value for correcting the strength rate information;
  a correction subunit operable to correct, in accordance with the likelihood correction value calculated by the likelihood correction calculation subunit, the strength rate information stored by the storage subunit;
  a received signal strength calculation subunit operable to calculate received signal strength in accordance with estimated values of channel characteristics for each channel as estimated by the channel estimation unit; and
  a transmission rate determining subunit operable to (i) determine, by referring to strength rate information corrected by the correction subunit, the transmission rate to notify to the transmission device in accordance with the received signal strength calculated by the received signal strength calculation subunit, and (ii) notify the transmission device of the transmission rate thus determined.

5. The reception device in claim 1, wherein the adaptive control unit includes
a storage subunit storing strength rate information indicating a transmission rate for a received signal strength;
a received signal strength calculation subunit operable to calculate a received signal strength in accordance with estimated values of channel characteristics for each channel as estimated by the channel estimation unit;
a likelihood correction calculation subunit operable to calculate, in accordance with the likelihood calculated by the likelihood calculation unit, a likelihood correction value for correcting the received signal strength;
a correction subunit operable to correct, in accordance with the likelihood correction value calculated by the likelihood correction calculation subunit, the received signal strength calculated by the received signal strength calculation subunit; and
a transmission rate determining subunit operable to (i) determine, by referring to strength rate information stored by the storage subunit, the transmission rate to notify to the transmission device in accordance with the received signal strength corrected by the correction subunit, and (ii) notify the transmission device of the transmission rate thus determined.

6. The reception device in claim 1, wherein
a signal is transmitted in accordance with a notified frame aggregation number, and
the adaptive control unit further (i) determines the frame aggregation number to notify to the transmission device in accordance with the likelihood calculated by the likelihood calculation unit and (ii) notifies the transmission device of the frame aggregation number thus determined.

7. The reception device in claim 1, wherein the adaptive control unit includes
a likelihood storage subunit storing likelihood error rate information indicating frame error rates for likelihoods for each transmission rate in a plurality of transmission rates;
a likelihood FER estimation subunit operable, by referring to the likelihood error rate information stored by the likelihood storage subunit, to estimate a frame error rate for each transmission rate in accordance with the likelihood calculated by the likelihood calculation unit; and
a transmission rate determining subunit operable to (i) determine the transmission rate to notify to the transmission device to be a transmission rate with a highest speed among transmission rates having a frame error rate, as estimated by the likelihood FER estimation unit, equal to or less than a predetermined value and (ii) notify the transmission device of the transmission rate thus determined.

8. The reception device in claim 1, wherein the adaptive control unit includes
a likelihood storage subunit storing likelihood error rate information indicating frame error rates for likelihoods for each transmission rate in a plurality of transmission rates;
a likelihood FER estimation subunit operable, by referring to the likelihood error rate information stored by the likelihood storage subunit, to estimate a frame error rate for each transmission rate in accordance with the likelihood calculated by the likelihood calculation unit;
a throughput calculation subunit operable, for each transmission rate, to calculate throughput in accordance with the frame error rate estimated by the likelihood FER estimation subunit; and
a transmission rate determining subunit operable to (i) determine the transmission rate to notify to the transmission device to be a transmission rate with a highest throughput calculated by the throughput calculation unit and (ii) notify the transmission device of the transmission rate thus determined.

9. The reception device in claim 8, wherein
the adaptive control unit further includes a likelihood estimation subunit operable to estimate a likelihood, used by the likelihood FER estimation subunit, for a different number of transmission streams than a number of transmission streams currently being used for transmission of a signal by the transmission device, in accordance with the likelihood calculated by the likelihood calculation unit.

10. The reception device in claim 8, wherein
the adaptive control unit further includes a likelihood estimation subunit operable to estimate a likelihood, used by the likelihood FER estimation subunit, for a different bandwidth than a bandwidth currently being used for transmission of a signal by the transmission device, in accordance with the likelihood calculated by the likelihood calculation unit.

11. The reception device in claim 8, wherein the adaptive control unit further includes:
a strength storage subunit storing strength error rate information indicating frame error rates for received signal strengths for each transmission rate in a plurality of transmission rates;
a received signal strength calculation subunit operable to calculate a received signal strength in accordance with estimated values of channel characteristics for each channel as estimated by the channel estimation unit;
a strength FER estimation subunit operable to estimate, by referring to the strength error rate information stored by the strength storage subunit, a frame error rate for each transmission rate in accordance with the received signal strength calculated by the received signal strength calculation subunit; and
an FER determining unit operable to determine, for each transmission rate, a frame error rate used by the throughput calculation subunit in calculating throughput, in accordance with the frame error rate estimated by the likelihood FER estimation subunit and the frame error rates estimated by the strength FER estimation subunit.

12. The reception device in claim 11, wherein
the FER determining unit determines a frame error rate with a largest value among the frame error rate estimated by the likelihood FER estimation subunit and frame error rates estimated by the strength FER estimation subunit to be the frame error rate used by the throughput calculation subunit in calculating throughput.

13. The reception device in claim 1, further comprising
an equalization unit operable to perform equalization processing to estimate a transmission signal in each transmission stream from a signal received by each of the antennas, in accordance with estimated values of channel characteristics for each channel as estimated by the channel estimation unit;
a demodulation unit operable to (i) demodulate the transmission signal in each transmission stream obtained as a result of equalization processing by the equalization unit and (ii) output a code;

a code combination unit operable to (i) combine codes for each transmission stream output by the demodulation unit and (ii) output a combined code;

a decoding unit operable to decode the combined code output by the code combination unit in accordance with the likelihood calculated by the likelihood calculation unit; and an error detection unit operable to perform error detection on a bit sequence obtained as a result of decoding by the decoding unit, wherein the adaptive control unit determines the transmission rate to notify to the transmission device in accordance with the likelihood calculated by the likelihood calculation unit and results of error detection by the error detection unit.

14. The reception device in claim 1, wherein the adaptive control unit determines the transmission rate to notify to the transmission device for each transmission stream.

15. A transmission device for transmitting a signal to a reception device, the transmission device comprising:

a receiving unit operable to (i) estimate channel characteristics of each channel in accordance with one or more training signals included in signals received by each of a plurality of antennas, (ii) calculate a likelihood indicating a degree of certainty of a code corresponding to each transmission stream in accordance with estimated values of channel characteristics for each channel, and (iii) receive a signal from the reception device, which determines a transmission rate based on the calculated likelihood, the signal containing the transmission rate; and a transmission unit operable, upon the next wireless communication to the reception device, to transmit a signal with one or more transmission streams in accordance with the transmission rate included in the signal received by the receiving unit.

16. An adaptive transmission rate control method used in a reception device for wireless communication with a transmission device that transmits one or more signals associated with transmission streams in accordance with a notified transmission rate, the adaptive transmission rate control method comprising the steps of:

estimating channel characteristics of each channel in accordance with one or more training signals included in signals received by each of a plurality of antennas;

calculating a likelihood indicating a degree of certainty of a code corresponding to each of the transmission streams transmitted by the transmission device, in accordance with estimated values of channel characteristics for each channel as estimated by the channel estimation step; and (i) determining a transmission rate to notify to the transmission device in accordance with the likelihood calculated by the likelihood calculation step and (ii) notifying the transmission device of the transmission rate thus determined.

17. An adaptive transmission rate control method used in a transmission device for transmitting a signal to a reception device, the adaptive transmission rate control method comprising the steps of:

(i) estimating channel characteristics of each channel in accordance with one or more training signals included in signals received by each of a plurality of antennas, (ii) calculating a likelihood indicating a degree of certainty of a code corresponding to each transmission stream in accordance with estimated values of channel characteristics for each channel, and (iii) receiving a signal from the reception device, which determines a transmission rate based on the calculated likelihood, the signal containing the transmission rate; and upon the next wireless communication to the reception device, transmitting a signal with one or more transmission streams in accordance with the transmission rate included in the signal received by the receiving step.

* * * * *